United States Patent
Sherwood et al.

(10) Patent No.: US 11,463,319 B2
(45) Date of Patent: *Oct. 4, 2022

(54) SYSTEM AND METHOD FOR THE COLLECTION, GENERATION, AND DISTRIBUTION OF SYNTHETIC METRICS FOR COMPUTER SYSTEM MANAGEMENT

(71) Applicant: ScienceLogic, Inc., Reston, VA (US)

(72) Inventors: Jeremy Sherwood, Beaverton, OR (US); Matthew Luebke, Front Royal, VA (US)

(73) Assignee: ScienceLogic, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,970

(22) Filed: Apr. 13, 2021

(65) Prior Publication Data

US 2021/0234766 A1 Jul. 29, 2021

Related U.S. Application Data

(63) Continuation of application No. 16/911,634, filed on Jun. 25, 2020, now Pat. No. 10,992,542.

(60) Provisional application No. 62/908,262, filed on Sep. 30, 2019, provisional application No. 62/866,438, filed on Jun. 25, 2019.

(51) Int. Cl.
*H04L 41/14* (2022.01)

(52) U.S. Cl.
CPC .................................. *H04L 41/14* (2013.01)

(58) Field of Classification Search
CPC ...... H04L 41/14; H04L 41/5048; H04L 43/08
See application file for complete search history.

(56) References Cited

U.S. PATENT DOCUMENTS

| | | | |
|---|---|---|---|
| 8,352,608 B1 | 1/2013 | Keagy | |
| 9,077,611 B2 | 7/2015 | Cordray et al. | |
| 9,235,442 B2 | 1/2016 | Kampas | |
| 9,842,017 B1* | 12/2017 | Zhang | G06F 11/079 |
| 9,983,871 B1* | 5/2018 | Edwards | G06F 11/302 |
| 10,432,483 B1 | 10/2019 | Thompson | |
| 2003/0051021 A1 | 3/2003 | Hirschfeld et al. | |
| 2005/0065805 A1 | 3/2005 | Moharram | |
| 2007/0043860 A1 | 2/2007 | Pabari | |
| 2012/0331127 A1* | 12/2012 | Wang | G06F 9/45558 709/224 |
| 2013/0254383 A1* | 9/2013 | Wray | H04L 47/70 709/224 |
| 2016/0014042 A1 | 1/2016 | Kampas | |
| 2016/0164754 A1 | 6/2016 | Gukal | |

(Continued)

OTHER PUBLICATIONS

Notification of Transmittal of the International Search Report and the Written Opinion of the International Searching Authority PCT/US2020/039498 (dated Oct. 2, 2020).

*Primary Examiner* — Mohamed A. Wasel
(74) *Attorney, Agent, or Firm* — Nixon & Vanderhye P.C.

(57) ABSTRACT

A system defines, creates, uses, and distributes information about other entities by collecting network information, recombining and synthesizing new network metrics from the collected network information, and then publishing one or more synthetic metrics datum describing the operation of the synthetic device, using a facading processing system. The technology herein has applications e.g., in the areas of network and computer systems management.

26 Claims, 20 Drawing Sheets

(56) References Cited

U.S. PATENT DOCUMENTS

| | | | |
|---|---|---|---|
| 2017/0142591 A1* | 5/2017 | Vrzic | H04W 16/02 |
| 2017/0155569 A1 | 6/2017 | Chinnaswamy | |
| 2017/0242560 A1* | 8/2017 | Goldstein | G06T 11/206 |
| 2017/0262304 A1* | 9/2017 | Williams | G06F 11/34 |
| 2019/0104022 A1 | 4/2019 | Power et al. | |
| 2019/0141542 A1 | 5/2019 | Ganapathi | |
| 2019/0250950 A1* | 8/2019 | Huang | G06F 11/3452 |
| 2019/0294995 A1 | 9/2019 | Pastor Perales | |

* cited by examiner

Indirect Source

Direct and Indirect Sources with Blending

Indirect Source With Machine Learning

SYSTEM AND METHOD FOR THE COLLECTION, GENERATION, AND DISTRIBUTION OF SYNTHETIC METRICS FOR COMPUTER SYSTEM MANAGEMENT

CROSS-REFERENCE TO RELATED APPLICATIONS

This application is a continuation of application Ser. No. 16/911,634 filed Jun. 25, 2020, which claims benefit of U.S. Provisional Patent Application No. 62/866,438, filed Jun. 25, 2019, and U.S. Provisional Patent Application 62/908,262, filed Sep. 30, 2019. Each of these prior-filed applications are incorporated herein by reference in their entirety.

1 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2020, ScienceLogic.

2 BACKGROUND OF THE TECHNOLOGY

2.1 Field of the Technology

The exemplary, illustrative, technology herein relates to a system for defining, creating, using, and distributing information about electronic devices by collecting information from or corresponding to the electronic devices, recombining and synthesizing, and/or generating new information based on the collected information, and then publishing one or more types of information related to the electronic devices; for example, generated data describing the aspects of operation of the electronic devices or aspects of the electronic devices themselves. In addition the system predicts the availability of collected and generated data, and then publishes information identifying predicted-to-be available data. The system also publishes projections predicting future data values. The technology herein has applications in the areas of network and computer systems management.

2.2 The Related Art

Existing network management systems (NMS) collect measurement data from multiple sources that represent differing, uncorrelated views of a single computer system or computer system component that is under the management of the NMS. As used in this application, the terms "component" and "system" are intended to refer to a computer-related entity, either hardware, a combination of hardware and software, software, or software in execution. For example, a component can be, but is not limited to being, a processor, a process running on a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

A metric of interest, for example, a measure of system or network performance, is provided by, or inferred from, measurements made from multiple different sources, at least some of which are operating on different systems or are operating at different levels of visibility within a single computer system. Each of the multiple sources also has different reporting or polling schedules, data formats, availability/uptime, and accuracy. It is a challenge to a-priori determine, at any particular point in time, which data source provides the most current and accurate metric data descriptive of the operation of the computer system or computer system component. A further challenge includes the tracking of metrics of interest when the data sources that provide the metrics provide them using different reporting techniques or metric attributes (e.g. frequency, metric scale/range, measured aspect), or where the data sources are not reliably available or are only available intermittently.

A prior art network management system includes one or more network management devices (NMDs), each configured to collect data from one or more computer systems connected to the network. As depicted in FIG. 1, an exemplary NMD (1080) is a network appliance computing device made up of dedicated hardware and software systems that work together to monitor and manage a network and the computer-controlled devices that are connected to it. The depicted NMD monitors components of a virtual hosting system (1400) at differing levels of reporting, specifically monitoring the hypervisor (1420) and a plurality of virtual machines (1430a-1430n) that are running within the hypervisor. Prior art NMDs typically monitor separate components of network connected devices as independent entities. For example, the NMD (1080) is configured to monitor a virtual hosting system (1400), further comprising monitoring of the CPU usage of a hypervisor (1420) and the virtual CPU usage of each of a plurality of hosted virtual machines (1430a, 1430b, . . . , 1430n). The hypervisor CPU reporting could be measured periodically (e.g., in 1 minute increments), and provides % of CPU usage for the hypervisor and each of the running virtual machines. In such systems, each virtual machine is typically allocated a certain percentage of the host CPU's processing bandwidth, but presents itself as having 100% of processing bandwidth to the application(s) running on that virtual machine. The virtual machines each report the % of CPU usage for that respective virtual machine, e.g., in 5 minute increments, and scaled to the amount of host CPU bandwidth that is allocated to that virtual machine (e.g., if a virtual machine is allocated 10% of the host CPU's processing bandwidth, the virtual machine reports its CPU usage as 0-100% of its allocated 10% (e.g., 0-10% of the host CPU bandwidth). This discrepancy means that users of the reporting information must have access to often unreported data such as the amount of CPU allocated to each virtual machine in order to effectively use the collected metrics. Thus, each of the different "devices" monitored by the NMD is actually an aspect of the overall virtual hosting system (1400), but does not provide an accurate picture of system usage. Note that prior art NMDs have many well-known challenges with handling this type of duplicative and uncorrelated reporting of metrics, e.g. with the virtual host's reporting the CPU usage normalized to the configuration of the VM, and with the hypervisor's reporting CPU usage relative to all available CPU bandwidth. This leads to misreported information, or in some cases, conflicted reports. In some cases, the prior art NMDs self-configure by auto-discovering network connected devices, their attributes, and performance metrics once the NMD is connected to a network using both passive and active techniques to detect, identify, configure, and monitor other network connected devices. Auto-discovery makes the existing system problem with pluralities of detection and reporting paths worse, as each auto-discovered reporting component is treated as a separate reporting entity by the NMD.

Computer networks and other arrangements of electronic devices often include multiple management devices, including network management devices, and other information sources, each of which provide data that includes a variety of information about one or more aspects of a network, about devices that function as network components, about devices that network components interact with and collect data from, for example Internet of Things (IoT) devices that that network connected devices are connected to, and about non-network electronic devices, for example IoT devices that are not connected as network connected devices but that communicate or otherwise make available data to one or more management devices. It is laborious and difficult for a network administrator or other data consumer to discover what information sets are available from these disparate data sources, to retrieve information from these sources, and to determine additional information that is derivable and/or calculatable from the available information sets. The system and methods described herein alleviate these and other challenges.

3 SUMMARY OF THE TECHNOLOGY

Some example non-limiting embodiments provide a processing device comprising: a processor; a network interface operably connected to the processor; and a memory operatively coupled to the processor, the memory storing (a) a first specification template that specifies the processing device configuration in order to adapt the processing device to provide specified generated data, e.g., synthetic metric values, in accordance with a specification contained within the first specification template, and (b) a second specification template that defines a processing device configuration to facade as a virtualized synthetic device; the processor being configured to generate one or more instances of generated data attributable to the virtualized synthetic device constructed in accordance with instructions provided by the first specification template, the processor being further configured to publish, via the network interface, a facade of the virtualized synthetic device, wherein the published facade of the virtualized synthetic device reports one or more instances of the generated data.

In some example non-limiting embodiments:

there is provided a second interface, which is used by the processor to collect one or more external datum points as collected data;

the second interface is not connected to a network;

the second interface comprises a or the network interface;

the first specification template comprises a processing device configuration template, wherein the configuration template configures the processing device to operate in order to collect one or more external datum points using a network interface operably connected to a network attached device, producing at least one network collected metric value;

the first template comprises a processing device configuration template, wherein the configuration template configures the processing device to collect one or more metric values using an interface operably connected to a non-network connected device, producing at least one non-network collected metric value;

the processing device operates to periodically collect one or more collected metric values in accordance with a specification in the first specification template;

the first specification template specifies the processing device operation to generate one or more synthetic metric values based upon at least one collected metric value and a synthetic metric generation specification that is part of the first specification template;

the first specification template is loaded into the processing device from an external source;

the second specification template configures the processing device as a facaded device in accordance with the specifications in the second specification template;

the second specification template specifies the mapping of one or more synthetic metric values provided by the processing device to the published facade;

the second specification template is loaded into the processing device from an external source; and/or the processor creates at least one synthetic metric value in accordance with a specification of the first specification template prior to providing the at least one synthetic metric value.

Other example non-limiting embodiments provide a processing method comprising: storing (a) a first specification template that specifies the processing device configuration in order to adapt the processing device to provide specified synthetic metric values in accordance with a specification contained within the first specification template, and (b) a second specification template that defines a configuration to facade as a virtualized synthetic device; generating one or more synthetic metric values attributable to the virtualized synthetic device constructed in accordance with instructions provided by the first specification template; and publishing, via a network interface, a facade of the virtualized synthetic device that reports one or more of the generated synthetic metric values.

Some example non-limiting embodiments further provide:

using a second interface to collect one or more external datum points as collected metric values;

the second interface is not connected to a network;

the second interface comprises a communication interface or the network interface;

the first specification template comprises a processing device configuration template, and further includes using the configuration template to configure the processing device to operate in order to collect one or more metric values using a network interface operably connected to a network attached device, to produce at least one network collected metric value;

the first template comprises a processing device configuration template, and further comprises using the configuration template to configure collection of one or more metric values with an interface operably connected to a non-network connected device, to produce at least one non-network collected metric value;

periodically collecting one or more collected metric values in accordance with a specification in the first specification template;

specifying, with the first specification template, processing device operation to generate one or more synthetic metric values based upon at least one collected metric value and a synthetic metric generation specification that is part of the first specification template;

loading the first specification template into the processing device from an external source;

configuring, based on the second specification template, a facaded device in accordance with the specifications in the second specification template;

specifying, with the second specification template, the mapping of one or more synthetic metric values provided by the processing device to the published facade;

loading the second specification template into the processing device from an external source; and/or generating at least one synthetic metric value in accordance with a specification of the first specification template prior to providing the at least one synthetic metric value.

Other example non-limiting embodiments provide a method of operating a facaded processing device comprising: collecting, in accordance with a template comprising a first collection specification, one or more collected metric values; generating, in accordance with a template comprising a first generation template, one or more synthetic metric values, and publishing, in accordance with a facading specification and using the one or more collected metric values, one or more synthetic metric values.

Example non-limiting embodiments further provide:

the synthetic metric value generating further comprises combining one or more collected metric values to produce at least one synthetic metric value;

the synthetic metric value generating further comprises combining a collected metric value with a previously generated synthetic metric value;

collecting the collected metric values comprises collecting from a network connected device;

collecting the collected metric values comprises collecting from a non-network connected device;

collecting the collected metric values only once; and/or repeatedly collecting the collected metric values to produce a set of time series collected values.

Other example non-limiting embodiments provide a system for providing a synthetic metric value, comprising: a network interface connected to a network, the network interface being configured to establish a connection with a facaded interface for publishing synthetic metric types and values, wherein the facaded interface is represented to be a type or class of simulated hardware device, and the synthetic metric types and values are represented to be performance values of that simulated hardware device, the facaded interface being provided for synthetic metric values generation that collects actual metric values from one or more hardware devices and calculates one or more synthetic metric values in accordance with a specification, the network interface being further configured to receive one or more synthetic metric values from the facaded interface; a processor operatively coupled to the network interface, the processor identifying metric type information associated with the one or more synthetic metric values received from the facaded interface; the processor associating the received synthetic metric values with one or more collection/generation attributes and providing generated data in response to at least some of the received one or more synthetic metric values, the identified metric type information and the associated one or more collection/generation attributes; a memory operatively coupled to the processor, the processor storing the generated data in the memory; and display hardware operatively coupled to the memory, the display hardware controlling a local display to display the stored generated data.

Other example non-limiting embodiments provide a method for providing a synthetic metric value, comprising: establishing a connection with a facaded interface provided for data generation and receiving one or more synthetic metric values from the facaded interface; using a processor, identifying metric type information associated with the one or more synthetic metric values received from the facaded interface, associating the received synthetic metric values with one or more collection/generation attributes and providing generated data in response to at least some of the received one or more synthetic metric values, the identified metric type information and the associated one or more collection/generation attributes; storing the provided generated data in a memory; and using display hardware to control a local display to display the stored generated data.

Other example non-limiting embodiments provide a system for providing a synthetic metric value, comprising: a network interface connected to a network, the network interface being configured to establish a connection with a database storing one or more synthetic metric values; a processor operatively coupled to the network interface, the processor identifying a synthetic metric value and metric type stored in the database; the processor associating the identified synthetic metric value with one or more collection/generation attributes and providing generated data in response to at least some of the identified synthetic metric values, the identified metric type and the associated one or more collection/generation attributes; a memory operatively coupled to the processor, the processor storing the provided generated data in the memory; and display hardware operatively coupled to the memory, the display hardware controlling a local display to display the stored generated data.

Other example non-limiting examples include a method for providing a synthetic metric value, comprising: establishing a connection with a database storing one or more synthetic metric values; with a processor, identifying a synthetic metric value and metric type stored in the database, associating the identified synthetic metric value with one or more collection/generation attributes, and providing generated data in response to at least some of the identified synthetic metric values, the identified metric type and the associated one or more collection/generation attributes; storing the provided generated data in a memory; and controlling a local display to display the stored generated data.

Other example non-limiting embodiments provide a method performed by a processor for presenting received data from a facaded device interface comprising: a) receiving one or more data elements from a defined facaded device interface, the defined facaded device interface having a specified facade type, b) storing the received one or more data elements in a memory, c) transforming the one or more received data elements in accordance with a predefined format instruction associated with the specified facade type, and d) further processing the received and/or transformed data elements in accordance with at least one specification that defines how the data elements are to be processed.

Examples further include displaying the transformed one or more received data elements; comparing the transformed one or more received data elements to a threshold and conditionally generating an alert based on the comparing; transferring the transformed data to a further processor; saving the transformed data to a database; providing the specified facade type comprising a type of device that the data is presented as being from; and/or defining the specified facade type in a specification that defines the facade interface.

Still other example non-limiting embodiments provide a system for providing a synthetic metric value, comprising: a network interface connected to a network, the network interface being configured to establish a connection with a facaded interface for publishing synthetic metric types and values, wherein the facaded interface is represented to be a type or class of simulated hardware device, and the synthetic metric types and values are represented to be performance values of that simulated hardware device, the facaded interface being provided for generated data generation that collects actual monitored metric values from one or more hardware devices and calculates one or more synthetic metric values in accordance with a specification, the network interface being further configured to receive one or more synthetic metric values from the facaded interface; a processor operatively coupled to the network interface, the processor identifying metric type information associated with the one or more synthetic metric values received from the facaded interface; the processor associating the received synthetic metric values with one or more collection/generation attributes and providing generated data in response to at least some of the received one or more synthetic metric values, the identified metric type information and the associated one or more collection/generation attributes; a memory operatively coupled to the processor, the processor storing the provided generated data in the memory; and display hardware operatively coupled to the memory, the display hardware controlling a local display to display the stored generated data.

Still other example non-limiting embodiments provide a method for providing a synthetic metric value, comprising establishing a connection with a facaded interface provided for generated data generation and receiving one or more synthetic metric values from the facaded interface; using a processor, identifying metric type information associated with the one or more synthetic metric values received from the facaded interface, associating the received synthetic metric values with one or more collection/generation attributes and providing generated data in response to at least some of the received one or more synthetic metric values, the identified metric type information and the associated one or more collection/generation attributes; storing the provided generated data in a memory; and using display hardware to control a local display to display the stored generated data.

In some example embodiments, the data is obtained from another source where the data is "pushed" to the collecting processor.

In still other example non-limiting embodiments, a system for providing a synthetic metric value comprises: a network interface connected to a network, the network interface being configured to establish a connection with a database storing one or more synthetic metric values; a processor operatively coupled to the network interface, the processor identifying a synthetic metric value and metric type stored in the database; the processor associating the identified synthetic metric value with one or more collection/generation attributes and providing generated data in response to at least some of the identified synthetic metric values, the identified metric type and the associated one or more collection/generation attributes; a memory operatively coupled to the processor, the processor storing the provided generated data in the memory; and display hardware operatively coupled to the memory, the display hardware controlling a local display to display the stored generated data.

In still other example non-limiting embodiments, a method for providing synthetic metric values, comprises establishing a connection with a database storing one or more synthetic metric values; with a processor, identifying a synthetic metric value and metric type stored in the database, associating the identified synthetic metric value with one or more collection/generation attributes, and providing generated data in response to at least some of the identified synthetic metric values, the identified metric type and the associated one or more collection/generation attributes; storing the provided generated data in a memory; and controlling a local display to display the stored generated data.

These and other aspects and advantages will become apparent when the Description below is read in conjunction with the accompanying Drawings.

4 BRIEF DESCRIPTION OF THE DRAWINGS

Features of the present technology will best be understood from a detailed description of the technology and example embodiments thereof selected for the purposes of illustration and shown in the accompanying drawings of which:

5 DESCRIPTION OF SOME EMBODIMENTS OF THE TECHNOLOGY

5.1 Overview

Figure 1:
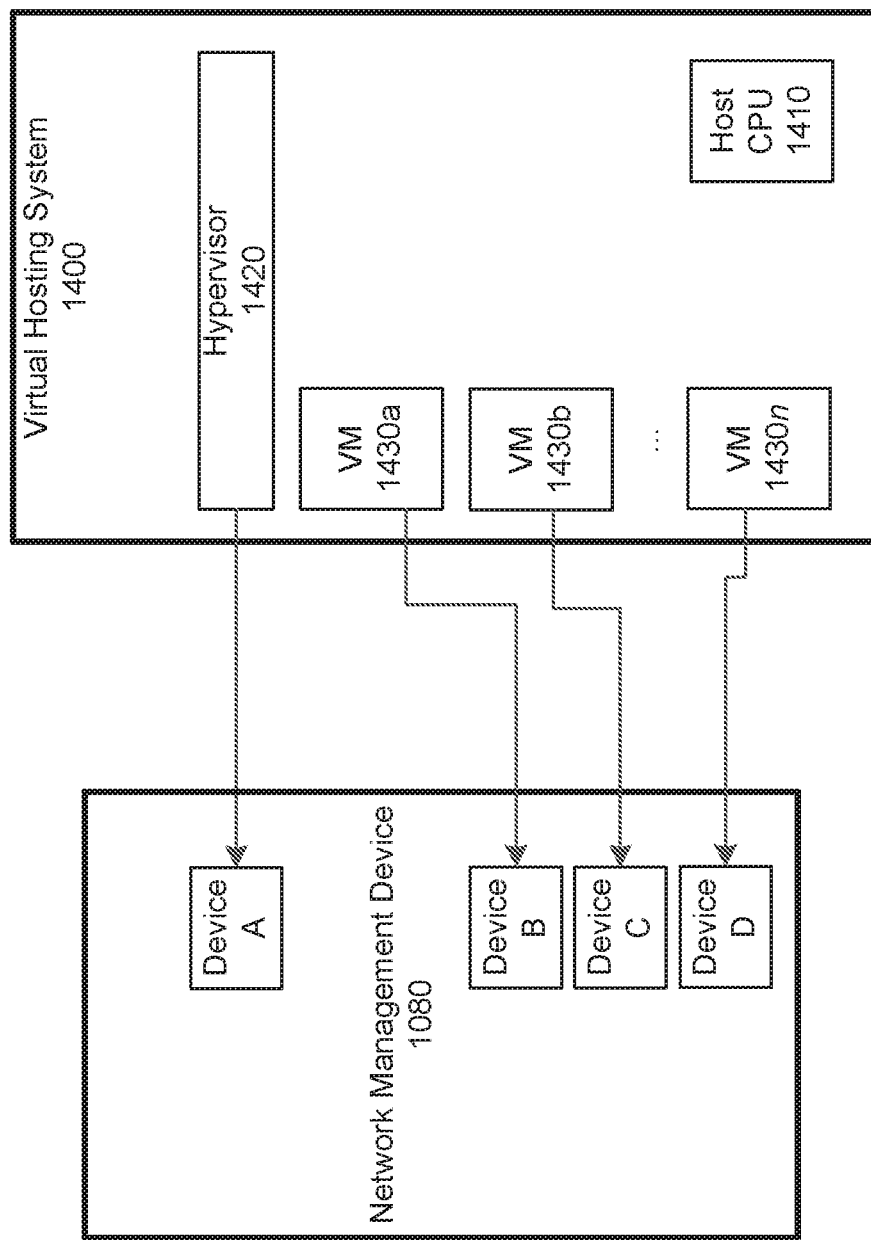
FIG. 1 depicts an exemplary prior art network management device measuring differing aspects of a connected device.

A "CRATE" processing device (e.g. stand-alone CRATE processor, CRATE-enabled NMD, or network management system (NMS)) configured in accordance with the illustrative technology herein comprises one or more specialty programs that comprise a CRATE processor. A CRATE processor is configured to collect external data from a variety of network accessible devices, e.g. monitored data comprising connected device performance metrics data collected from one or more connected devices or NMDs, sensor data (e.g., temperature or power usage data) collected from one or more connected sensors or IoT devices. The CRATE processor is configured to collect external data directly from one or more data sources, including directly from connected devices, from one or more data stores, e.g. recently generated data or historical data that has been stored in the one or more datastores. The CRATE processor is further configured to create and publish generated data, e.g. one or more synthetic metrics values generated based on collected external data and attributed to a synthetic device, and to report upon and manage synthetic metrics values as if they were collected from an actual computing device connected on the network. In some exemplary embodiments, a CRATE processor publishes data that includes one or more collected datum point values, one or more alerts, notifications, and feeds generated or collected by the CRATE processor, as well as synthetic datum point values. The CRATE processor also publishes information using facaded interfaces, as described herein.

A "synthetic device" is a virtualized construct representing a connected device that is represented by generated data, e.g. a virtual device from which synthetic metric values are collectable by one or more other monitoring and collection devices. In some non-limiting embodiments, a synthetic device creates new (synthetic) information for use in reporting and device management from information reported by other managed devices. In some example non-limiting embodiments, a synthetic device does not report information about its own operation as, for example, a virtualized device such as a virtual machine does. In this way, disparate reporting views, periods, and report types are integrated into a set of simplified synthetic device metrics that enable simplified, consistent management and reporting of aspects of one or more connected devices. An exemplary synthetic device is defined by a synthetic device specification that defines the composition, operation, and publishing of a synthetic device and its computational results.

A "data generation process" is a process that collects external collected data including actual, current, monitored data from one or more hardware devices or other data sources, and in some embodiments historical monitored data corresponding to the one or more hardware devices or other data sources, and calculates or otherwise creates one or more synthetic metric values or other generated data in accordance with a specification. In some embodiments, the generated data has a different type or reporting period than the current or historical monitored data.

A "facaded interface" is an interface for publishing generated data types and values, where the facaded interface is represented to be a type or class of simulated hardware and/or software device. A façaded interface is a dynamically defined interface which is configured according to at least one façaded device and/or interface specification. The at least one façaded device specification defines information about a synthetic device that the interface presents and the at least one façaded interface specification defines the networking protocols to be provided by the interface, generated data, (notifications, alerts, and text-based feeds) to be provided by the interface, mapping of collected data and generated synthetic metric information to the interface, a locale of a synthetic device presented by the interface, and generated data units and/or language corresponding to the locale. The generated data types and values published by a façaded interface do not represent performance or characteristics of a CRATE processing device that presents the façaded interface. Instead, the generated data types and values are generated by the CRATE processing device using collected data metric types and values of multiple types and/or received by the CRATE processing device from multiple separate devices. The generated data types and values are represented to be performance values of the type or class of simulated hardware and/or software device(s) specified by the one or more façaded device specifications. The facaded interface differs from a VM interface in that the VM interface publishes actual data from a single emulated device and the facaded interface publishes generated data, aggregated data, and/or projected data.

In example non-limiting embodiments, a CRATE processor instantiates one or more synthetic device specifications by loading a synthetic device specification from a data store, configuring the collection of external collected data specified by those synthetic device specifications, configuring the storage of collected data and of generated data according to one or more synthetic metrics specifications defined by the synthetic device specification, and configuring aspects of one or more façaded interfaces for publication of the generated data. The CRATE processor further instantiates the one or more synthetic metrics specifications; for example the one or more synthetic metrics specifications specified by the synthetic device specification, by loading the synthetic metrics specification(s) and collection methods specifications from a data store, generating and/or collecting metric data in accordance with the specifications, and configuring the storage and publishing the resulting metric data according to one or more façaded device specifications defined by the synthetic device specification and according to one or more façaded interface specifications.

The CRATE processor executes a synthetic metrics specification specified by a synthetic device specification by collecting the specified collected data in accordance with parameters of the synthetic device specification, creating generated data in accordance with the synthetic metrics specification(s), and then storing and/or publishing the newly created generated data in accordance with the synthetic device and synthetic metrics specification(s). The collected data comes from other network-connected devices, from non-network connected devices, from one or more network management systems (or parts thereof), or from previously collected monitored data stored in a network-accessible data store(s).

The CRATE processor thus, in some non-limiting embodiments, functions as a representation of one or more other connected devices. The CRATE processor facades one or more virtualized devices or other entities (which are or are not remote, and are or are not connected to the network) by appearing to a network management system as a queryable connected device. By way of analogy, the CRATE processor is like the facade of a building on a movie studio lot. There is no actual building behind the façade—the facade creates the illusion of a real building by masquerading as a real building, but exists only as a front wall the camera sees from a street vantage point. From behind, the facade is revealed to be mere scaffolding holding up a single front wall with no structure behind it. Similarly, the CRATE processor masquerades as an actual network device to a network management system and publishes generated data, responds to discovery challenges, etc. just as a real network device would, but the synthetic metrics values comprising the generated data that the CRATE processor provides to the network management system are typically, at least in part, derived from and/or measuring some source(s) other than the CRATE processor itself. Rather, the CRATE processor is like an actor or imposter who gives all the right answers to questions posed by the network management system, but in some embodiments is being used merely as a conduit to convey, to the network management system, information derived from information collected from some other source(s), e.g., a device, devices, or other entities that cannot communicate directly with and/or be discovered by the network management system and are not connected to the (same) network. Such other device(s) or other entities are co-located with the CRATE processor, or it (they) are located remotely from the CRATE processor. Such other device(s) or other entities communicate with the CRATE processor via the same network the NMD (1080) manages, via a different network, or via some other communication media (e.g., hardwired connections, optical connections, wireless connections, telephone or cellular connections, aural connections, sensors, or any other type of communications). Such facading allows the network management system such as the NMD (1080) to obtain information from one or more devices or other entities which are or are not directly accessible, manageable, and/or discoverable by the NMD, just as if the CRATE processor were a typical non-virtualized network connected device that could be discovered on the network and queried by the network management system. In some example embodiments, the device(s) or other entities the CRATE processor facades for are also directly accessible and queryable by the NMD (1080), and the CRATE processor is used to publish generated data for that/those and possibly another device(s) or other entities (e.g., to synthesize summary or other metrics for a plurality of virtual or actual machines that no individual virtual or actual machine necessarily publishes or supplies on its own).

In some exemplary, non-limiting, embodiments, a CRATE processor publishes actual monitored metrics values collected by the CRATE processor, or by one or more other CRATE processors and or one or more network management devices, and that are modified in one or more ways and/or aggregated with other data, and packaged for publication on one or more façaded interfaces. A facaded interface differs from a proxied interface in that the proxied interface is a pass-through for actual data values while the facaded interface publishes generated data generated by processing actual collected data values to create entirely new data values and new values based on the actual collected data values before publication. For example, the CRATE processor publishes actual monitored metric values collected from more than one source, actual monitored metric values of more than one type modified according to a synthetic metrics specification to produce a first generated data, actual collected data values augmented with additional information or combined with historical or projected metric data values to produce a second generated data, or notifications and alerts collected from one or more network devices. In some exemplary embodiments, the CRATE processor publishes generated data using a façaded interface in accordance with at least one facaded interface specification that represents the device that the CRATE processor collected the actual monitored metrics values, notifications, and/or alerts from.

In an example non-limiting embodiment, a CRATE processing device creates prospective publishing information (PPI) which includes indication of types of collected and synthetic data values that the CRATE processing device predicts will be available. The CRATE processing device advertises the predicted availability of the data values included in the PPI by publishing the PPI to data consumers, and then updates the PPI if the predicted availability changes, e.g. if the CRATE processing device determines that a source of collected data that it predicted would be available becomes unavailable or if it otherwise determines that data will not be available or that data not formerly predicted to be available becomes available. In an exemplary embodiment, a data consumer accesses the PPI and requests generated data that is predicted to be available based on the PPI. When the data consumer requests the generated data, the CRATE processing device instantiates one or more dynamic applications to collect or generate the requested generated data and establishes connections with one or more sources of collected data corresponding to the requested generated data. This saves on overhead by not performing collection/generation until the generated data is requested.

5.2 Definitions

The following definitions are used throughout, unless specifically indicated otherwise:

| TERM | DEFINITION |
|---|---|
| Monitored data | Information collected from a network connected or non-network connected device (collectively, connected device (s)) including performance information corresponding to the device. Monitored data includes monitored metrics values, which are numerical values representing performance information of the device. |
| Historical data | Data that has been collected in the past and data that has been generated by a CRATE processing device in the past. |
| Collected data | Actual data that the CRATE processing device has already acquired, or is capable of acquiring, from one or more sources, for use in creating generated data. Collected data includes monitored data (e.g., monitored metrics values collected from devices on a periodic basis), historical data pulled from a data store, projected data which could be collected from a ML CRATE processor, Dynamic Learning Anomaly Detector (DLAD) processing device or DLAD processor, or pulled from a data store; other types of generated data |

| TERM | DEFINITION |
|---|---|
| | generated by another CRATE processor; alerts, feeds, etc. from other devices; metadata; sensor data; and configuration data. Collected data has immediate or delayed availability. |
| Generated data | Data produced by the CRATE processing device by processing collected data. Generated data includes synthetic data (metrics values and other synthetic data), projected data, and PPI. |
| Immediately available (collected and generated) data | Immediately available data is data that has already been collected by a CRATE processing device, generated data produced by processing the collected data, and collected or generated data that the CRATE processing device predicts will be available with a short lead time (e.g., within a specification provided number of seconds.), such as during an interval between collecting data and formatting the data for export. Exemplary immediately available data includes as-yet uncollected data from connected devices that the CRATE processing device is currently collecting data from and data from other connected devices that the CRATE processing device is in communication with and configured to collect data from. |
| Delayed availability (collected and generated) data | Delayed availability data includes delayed availability collected data that the CRATE processing device predicts it will be able to collect and provide in the future. Delayed availability data also includes delayed availability generated data that the CRATE processing device predicts it will be able to generate and provide in the future. Delayed availability collected and generated data includes data that the CRATE processing device predicts it will be able to provide in the future although it is not available at the time it creates PPI. Delayed availability data includes data that, although not currently available to the CRATE processing device, is predicted to be available for the CRATE processing device to ingest and package, or generated data that the CRATE processor predicts it will be able to generate in the future. Delayed availability data predictions include general metadata, such as projected data, date/time availability estimate, notification on availability, availability, intervals of confidence, etc. Exemplary delayed availability data includes data from one or more connected devices that the CRATE processing device predicts that it will be able to collect data from at a later time or that it will be able to prospectively collect information from. |
| Prospective publishing information (PPI) | An indication of types of data that the CRATE processing device predicts it will be able to collect or generate from one or more facaded interfaces. PPI includes one or more of immediately available data, delayed availability data, and generated data (e.g. synthetic metrics data) or a combination thereof. |
| Projected data | Values of collected information or synthetic data that the CRATE processing device predicts will occur in the future, i.e. estimates or projections of values of collected or generated metrics at one or more future time points. Projected data values are generated by dynamic applications and/or machine learning algorithms. Projected data values are also generated by external devices including DLAD processors. |
| Published data | Data that the CRATE processing device formats and makes available to a data output stream, facaded interface, and/or data store. Published data includes data that is presented or shared by a CRATE processing device. Published data includes historical data, current collected data, projected data and other generated data, or PPI. |
| Synthetic metrics values | Data values representing one or more performance characteristics of a synthetic device. Synthetic metrics values are generated by a CRATE processing device based on collected data values. |
| Synthetic information | Published synthetic metrics data, including synthetic metrics values and other information including alerts, notifications, and feeds related to synthetic metrics data, which the CRATE processing device makes available on a facaded interface. |
| Dynamic application | A self-contained application that is only installed and instantiated when needed. A dynamic application includes specifications that describe what the application requires to operate and what the application can do (e.g., what network devices the application can discover and/or collect data from and what types of data it can collect). Information collection applications and data collection applications are examples of dynamic applications. |
| Proxied interface | Passes actual data straight through the interface without alteration. The dataset presented by the proxy differs depending on level of user access permissions or applied filters, but the data itself is not altered. |
| Facaded interface | Assembles data of different modalities into a single unified view. Aggregates two or more datasets into a single dataset, or separates a single dataset or data from a single monitored device into two or more datasets. |
| Aggregated data | Data combined from two or more data sources, and/or data combined from two or more data types from one or more data sources. |
| Data consumers | Data consumers include connected devices and end users that receive data published by one or more CRATE processing devices. In some embodiments, data consumers receive PPI generated by a CRATE processing device, select from the PPI generated and/or collected data predicted to be available by the CRATE processing device, and request the selected data from the CRATE processing device. Exemplary data consumers include network administrators that receive data from a CRATE processing device, applications and network management devices that request data from the CRATE processing device, and data consumers that subscribe to a data feed published by a CRATE processing device. |

5.3 Architecture 5.2.1 CRATE Processing Device

In one example non-limiting embodiment, a CRATE processing device comprises at least one CRATE processor implemented on a stand-alone network-connected computer, a component of a larger network-connected computer, or as a service instance running in a virtualized or containerized environment. In some embodiments, the CRATE processing device is integrated with one or more NMS-based collector or remote collector arrangement(s) in order to receive collected data, for example, monitored metric values, from those collectors, while in other embodiments, the CRATE processing device supports its own data collection infrastructure that operates to collect monitored metric values and other information (e.g., alerts and notifications) from connected devices and data stores and report upon specific physical metrics that are collected.

In some embodiments, the CRATE processing device creates synthetic metric values based on the monitored metric values, and/or creates projected publication information (PPI) about data that it predicts it will be able to collect or generate, for example at a future time point (i.e. PPI regarding data the CRATE processing device may be able to obtain or generate, but currently does not until it is configured to do so).

In some embodiments, the CRATE processing device formats and publishes, via one or more façaded interfaces, collected data, generated data, and PPI, and optionally publishes metadata related to the other published data. The generated data includes aggregated data and data generated based on collected data, e.g. projected data, inferred data, and interpolated data. In still other embodiments, the CRATE processing device is integrated with a network data store containing collected data, e.g., monitored metric values, collected by or generated by another network management system. In some exemplary embodiments, the CRATE processing device collects, and publishes as generated data, data generated by another CRATE processing device or by other connected device. In a particular exemplary embodiment, the CRATE processing device collects, and publishes as generated data, one or more of projected metric values, Dynamic Learning Anomaly Detector (DLAD) data values, alerts, and events generated by a DLAD processing device or DLAD processor, as described in previously filed U.S. patent application Ser. No. 16/856,905 filed Apr. 23, 2020 and incorporated here by reference.

Figure 2:
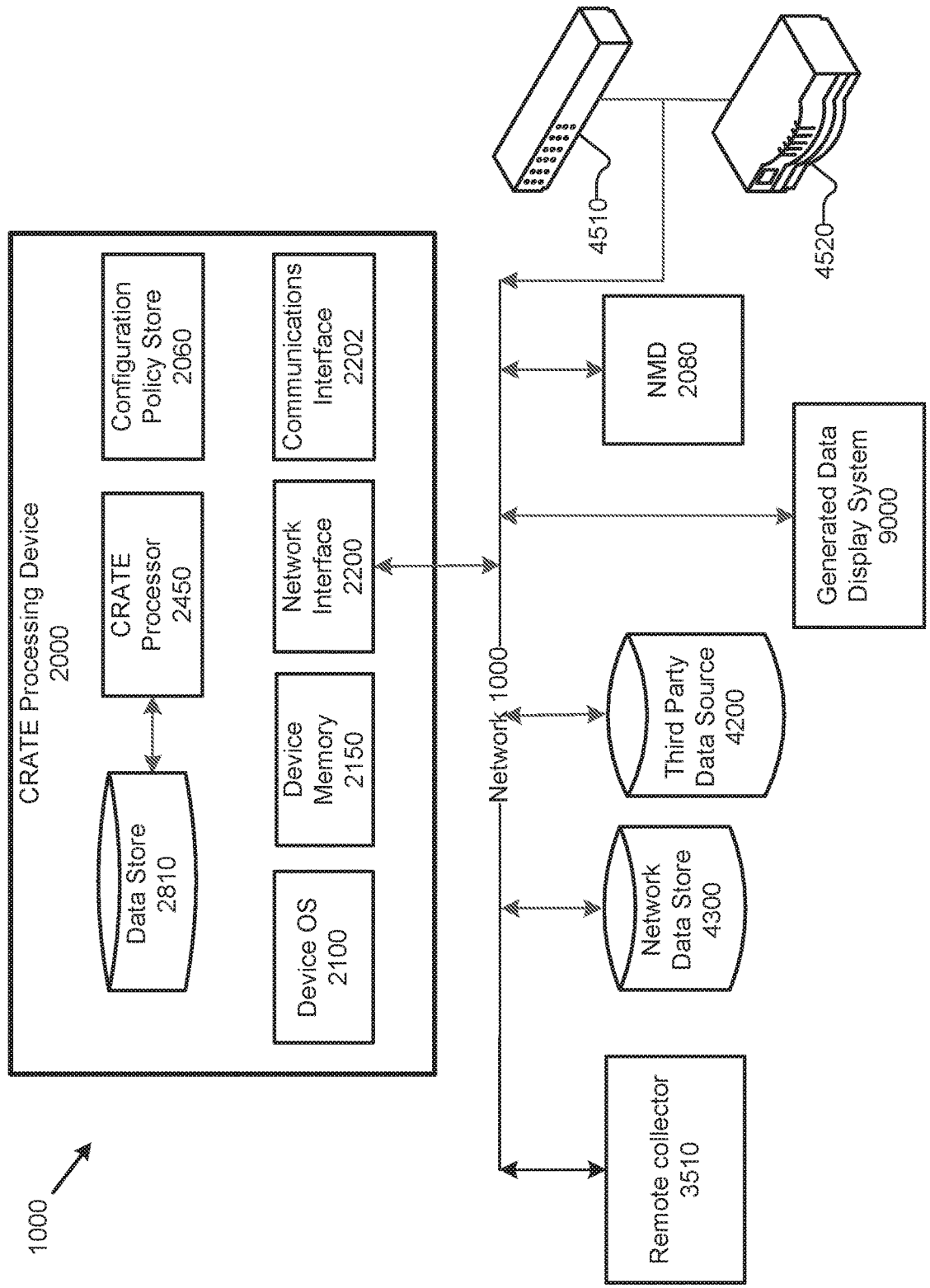
FIG. 2 depicts an exemplary CRATE processing device, in accordance with the illustrative technology herein.

As depicted in FIG. 2, an exemplary CRATE processing device (2000) is configured to collect external collected data including monitored metric values from the monitored network-connected and/or non-network-connected devices and data stored in one or more data stores (4300, 4200), generate synthetic metrics values, and then publish these generated synthetic metric values as a stand-alone device. i.e. a synthetic device, on a computer network (1000). The publish interface is facaded to simulate one or more other devices distinct from the CRATE processing device.

The CRATE processing device (2000) comprises one or more CRATE processor(s) (2450) which are discussed in further detail below. The CRATE processing device further comprises device memory (2150) and a device operating system (OS) (2100) of standard construction known to those having skill in the art, such as, for example without limitation, the WINDOWS operating system (Microsoft Corporation, Redmond, Wash.), UNIX, LINUX, or MACOS (Apple Computer, Cupertino, Calif.). Still other implementations do not have an operating system per se, but instead provide an environment for executing coded instructions or interpreted programs (e.g., Java programs). In such cases, the execution environment is considered to be acting as the operating system. The CRATE processing device further comprises at least one network interface (2200) that provides a mechanism for communicating data with one or more network-connected devices on the network using a communications protocol. The network interface is a hardware interface, for example a network interface card (NIC) that includes one or more serial interfaces (e.g., one or more Ethernet, FireWire, USB, or RS-232 interfaces) or wireless interfaces (e.g., one or more of Wi-Fi, BlueTooth, or LTE interfaces), or a software network interface, for example an IPv4 or IPv6 loopback interface. The network interface implements wired-or wireless communications protocols. A non-limiting example of a wired communications protocol is TCP/IP, operating over Ethernet. A non-limiting example of a wireless protocol is TCP/IP over 802.11g.

The CRATE processing device also comprises one or more additional communications interfaces (2202) that permit the CRATE processing device to communicate with one or more non-network-connected device(s). Such additional communications interfaces are optical, aural, wireless, wired, etc. using any type of communications protocols such as 802.11, Zigbee, Bluetooth, ZWAVE, Thread, Ethernet, or other. In some example embodiments, such communications interfaces allow the CRATE processing device to communicate with one or more sensors that sense parameters or metrics concerning the operation of device(s) or entities for which the CRATE processing device is façading.

The CRATE processing device further comprises a configuration policy store (2060). The configuration policy store stores configuration information for the CRATE processing device, and is implemented as a file, or a part of a more comprehensive data store as described below. A configuration policy specifies the aspects of synthetic device and synthetic metrics processing to be performed by a specific instance of a CRATE processor, by specific CRATE processing device(s), or by other systems that the CRATE processing device is connected to over the network.

Data stores are implemented as a commercial database such as a commercial database provided by mySQL, Oracle (by Oracle Corporation), or SQLServer (by Microsoft Corporation), or even as a file system of stored files. Network data store (4300) stores synthetic device specifications. The CRATE processing device data store (2810) stores configuration policies, synthetic metrics specifications, information collected from the CRATE-connected devices, generated data generated by the CRATE processor (2450), and CRATE processor events. In some implementations, data store is an instance of a network data store. Each instance of a data store is located upon one or more CRATE processing device(s), on external network management device(s), or on a stand-alone network accessible data store. Data stores may be configured and/or replicated in order to improve access and redundancy to the information stored in them. Depending upon the specifics of each data store's underlying data storage mechanism, data store replication is implemented using multiple master, master-slave, or caching-based technologies. Data store information may also be cached in order to promote higher availability and throughput.

The example network (1000) comprises a network data store (4300), a network switch (4510), a router (4520), a network management device (NMD) (2080), a third party data source (4200), and a remote collector (3510) which are all communicatively coupled to a CRATE processing device (2000) using standard networking techniques. The CRATE processor communicates with each of the connected devices in order to read collected data that pertains to one or more aspects of the connected device's performance. In additional exemplary embodiments, CRATE processing device (2000) communicates with an NMD to provide or exchange data, such as one or more monitored metrics values and synthetic metrics values calculated by the CRATE processor (2450) with the NMD. In still further exemplary embodiments, the CRATE processing device communicates with a generated data display system (9000) for displaying generated data.

5.2.2 CRATE Processing Device(s) and Network Data Stores

Figure 3:
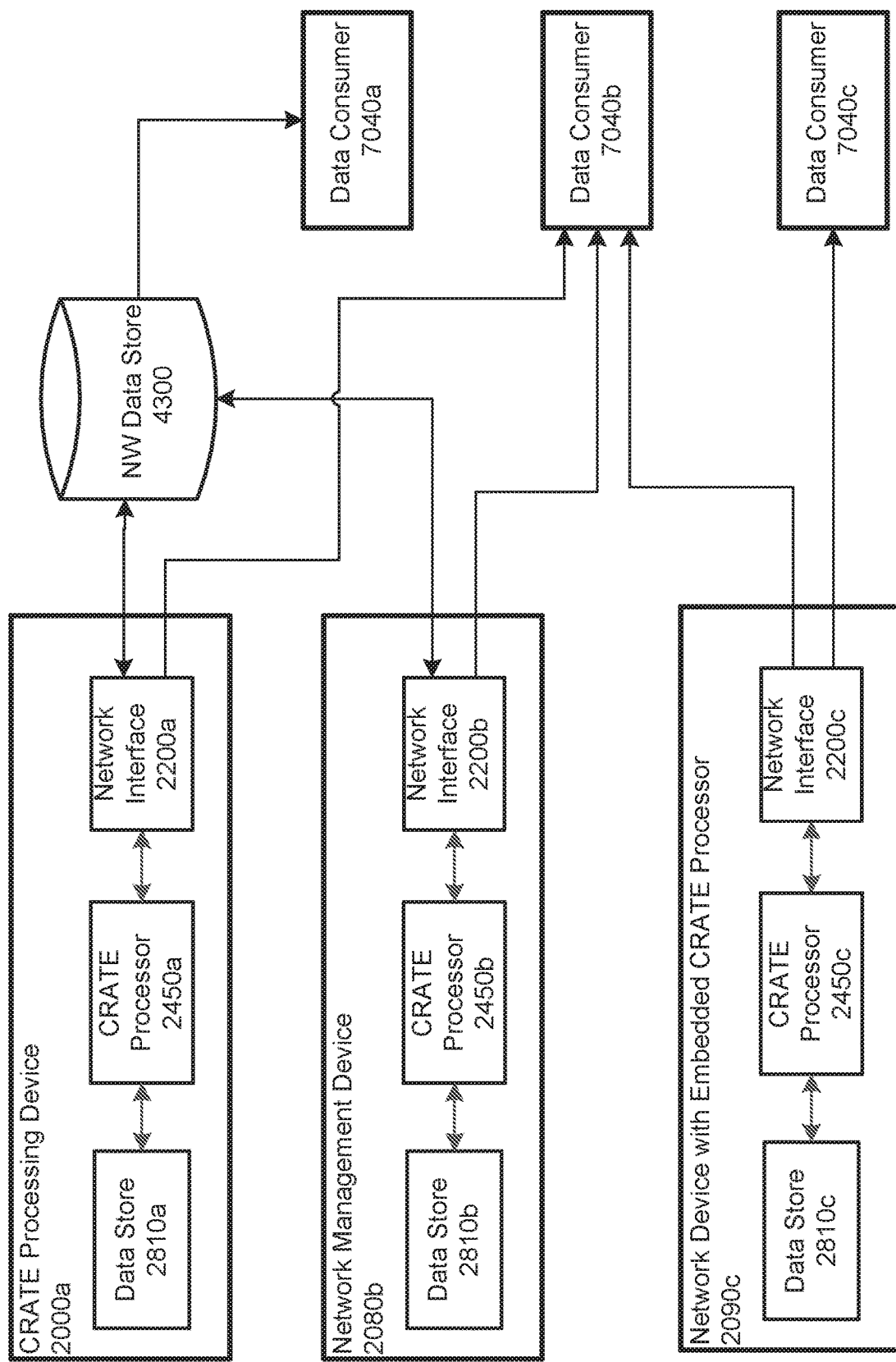
FIG. 3 depicts an exemplary arrangement including a data store used to store aggregated data produced by multiple CRATE processing devices for integrating and publishing data for multiple data consumers.

FIG. 3 depicts an exemplary arrangement that includes multiple CRATE processing devices including CRATE processing device (2000*a*) which includes first CRATE processor (2450*a*) (and which, in some embodiments, is a stand-alone CRATE processor), a network management device (2080*b*) that includes a second CRATE processor (2450*b*), and a network device (2090*c*) (e.g. a server, router, firewall, network server, or switch) that includes a third, embedded, CRATE processor (2450*c*). Each CRATE processor (2450*a*, 2450*b*, 2450*c*) is configured to collect external collected data, e.g., monitored metrics data, create generated data (e.g., synthetic metrics values, aggregated data, projected data and PPI), and to publish any of these data using one or more façaded interfaces. The arrangement includes a network data store (4300) that stores all types of data produced by the one or more CRATE processing devices.

In an exemplary configuration, the CRATE processing devices, or aspects of a CRATE processing engine, each produce collected and generated data and provide it to the network data store (4300) through the network interface (2200*a-c*). In an exemplary embodiment, a first CRATE processing device (2000*b*) retrieves, from network data store (4300), data that was produced, and published to the data store, by second CRATE processing device (2000a). The first CRATE processing device creates aggregated data that includes data produced by the first and second CRATE processing devices, and then stores the generated data to a data store (e.g. 4300), which is accessible to data consumers (e.g. 7040a) or makes it available, via one or more network interfaces (2200b), to data consumers (e.g., 7040b, 7040c).

In a first exemplary use case, a first CRATE processor (2450a) creates, and publishes to data store (e.g. 4300), synthetic metrics values corresponding to a first group of sensors (not shown), for example to a first group of temperature sensors. A second CRATE processor (2450b) publishes, to the network data store, synthetic metrics values corresponding to a second set of sensors (not shown). The second CRATE processor retrieves, from the network data store, synthetic metrics values generated by the first CRATE processor and aggregates them with synthetic metrics values generated by the second CRATE processor. The second CRATE processor updates corresponding synthetic device specification (6050 of FIG. 5) and synthetic metrics specification (6100 of FIG. 6), including a data source/collection methods specification (e.g. 6150a of FIG. 5) and facaded interface specification (6170 of FIG. 6), to reflect selection of, and publishing of, aggregated synthetic metrics values corresponding to the first and second groups of temperature sensors. The second CRATE processor also updates corresponding generated data metadata to indicate the availability, from the second CRATE processor, of the aggregated synthetic metrics values corresponding to the first and second groups of temperature sensors. As illustrated in FIG. 3, in an exemplary embodiment CRATE processor (2450a), publishes generated data to network data store (4300) and data consumer (7040b). Network management device (2080b) and CRATE processor (2450c), which is embedded in network device (2090c), also provide generated data to data consumer (7040b) on an N:1 arrangement. In further arrangements, CRATE processor, embedded in network device, provides generated data to a single data consumer (7040c) in a 1:1 arrangement and to multiple data consumers in a 1:N arrangement (not shown). In further arrangements, not shown, network management device (2080b) provides generated data to a single data consumer in a 1:1 arrangement and to multiple data consumers in a 1:N arrangement.

In a second exemplary use case, a CRATE processing device aggregates synthetic metrics values generated based on collected data (e.g. projected data values) with one or more of historical and current collected data. In an exemplary embodiment, one or more CRATE processing devices generate and publish, to a data store (e.g. 4300), projected synthetic metrics values, for example projected CPU usage. A CRATE processing device subsequently collects, or receives from another CRATE processing device, collected metrics values that correspond to the projected synthetic metrics values, for example actual CPU usage metric values from the time for which projected CPU usage was previously generated. The CRATE processing device retrieves, from a data store, the projected synthetic metric values and compares them to the collected metrics values.

In a third exemplary use case, a CRATE processing device collects or otherwise receives current collected metric values, creates one or more synthetic metrics values, including inferred metric values, interpolated metric values, or projected metric values, based on collected metric values, and retrieves historical collected metric values from a data store. The CRATE processing device aggregates historical, current, inferred or interpolated, and projected metric values and publishes them as a single dataset corresponding to a façaded device. In a particular example use case, the façaded device corresponds to a network router that includes a network interface and that is connected to a network that is monitored by the CRATE processing device (e.g. referring to FIG. 2, router (4520) of network (1000)). The CRATE processing device retrieves, for example, from a data store, historical monitored metrics values regarding the router that were previously written to the data store, and collects current monitored metrics values from the router, and then creates synthetic metric values including interpolated missing monitored metrics values and projected future monitored metrics values. In an alternative embodiment another network entity, for example a DLAD processing device (not shown) creates projected future monitored data corresponding to the router (e.g. projected monitored metric values and predicted events). The CRATE processing device aggregates the multiple types of data from multiple different systems, and publishes integrated data comprising historical, current, interpolated missing, and projected future data via a façaded interface that represents the router's workload and headroom (for past, present, and future values). The CRATE processing device makes additional information regarding the router available via the façaded interface including, for example, metadata about the published data and alerts related to the published data (e.g. when projected monitored metric values get updated with actual, collected, monitored metric values that are materially different, e.g. having values that are different by more than a threshold amount).

In a fourth exemplary use case, a CRATE processing device collects data from a single data source (e.g. from a single connected device) and presents the collected data on multiple facaded interfaces. In a first example, the CRATE processing device collects monitored data from a particular router and presents a first modified version of the monitored data on a first façaded interface that represents a first brand of router and a second modified version of the monitored data on a second façaded interface that represents a second brand of router. An exemplary first modified version of the monitored data includes data formatted with units, language, and scaling used by the first brand of router, one or more of which are different than those used by the monitored particular router, and an exemplary second modified version of the monitored data includes data formatted with units, language, and scaling used by the second brand of router, one or more of which is different than those used by the monitored particular router and by the first brand of router. In this manner, the CRATE processing device is able to present data to a data consumer in a format that is tailored for the data consumer; for example, by presenting data on a façaded interface that is configured to represent a brand or type of router that the data consumer is configured to interact with and/or that the data consumer requests. In a second example, the CRATE processing device collects monitored data from a monolithic device that includes multiple sub-components or multiple functions; for example, from a home or office networking device that includes a WAN modem, a firewall, an ethernet switch or hub, and a Wi-Fi radio or a sensor array device having multiple different sensors. The CRATE processing device creates multiple façaded interfaces, each representing a single sub-component or function of the monolithic device or an aggregate of two or more sub-components or functions of the monolithic device, and creates, based on the on collected monitored data, individual or aggregated data streams corresponding to the sub-components or functions, and publishes a single or aggregated data stream on each façaded interface.

5.2.3 CRATE Processor

Figure 4:
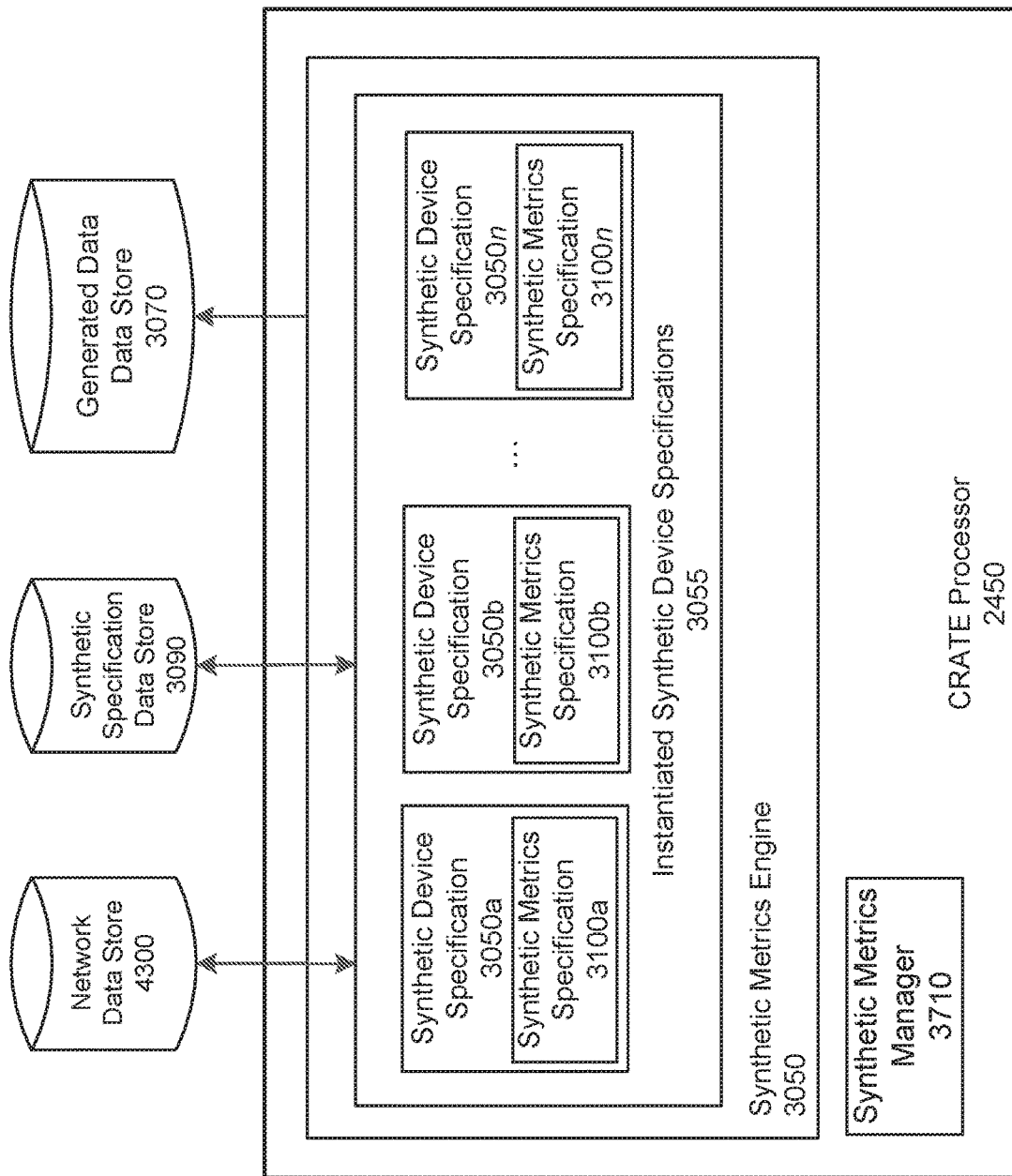
FIG. 4 depicts an exemplary CRATE processor for processing synthetic metrics specifications, in accordance with the illustrative technology herein.

An exemplary implementation of a CRATE processor (2450) component is depicted in FIG. 4. A CRATE processor further includes a synthetic metrics engine (3050) program, which instantiates one or more synthetic device specifications (3050) and corresponding synthetic metrics specifications (3100). In an embodiment, each individual instantiation of a synthetic metrics specification is represented as a discreet process, thread, or a set of states within a state machine within the CRATE processor, and having its own collection, calculation, and publishing rules defined by the synthetic device specifications (3050*a*, 3050*b*, . . . , 3050*n*) and by its own individual synthetic metrics specification (3100*a*, 3100*b*, . . . 3100*n*). The CRATE processor program(s) execute in accordance with each of the instantiated synthetic device and corresponding synthetic metrics specifications in order to generate and publish generated data.

The CRATE processor uses a configuration policy (2060 of FIG. 8) to determine which synthetic device specifications and synthetic metrics specifications are authorized to be instantiated by the CRATE processor. A synthetic device specification is instantiated when it is processed by the CRATE processor and executed when the process(es), thread(s), or state machine states that implement the synthetic device and corresponding synthetic metrics specification(s) in order to create generated data. Generally, a data store is used to store synthetic device and other specifications. The data store may be present locally on a device, or may be network based. In a particular embodiment, the network data store (4300) is used to store synthetic device specifications and the synthetic specification data store (3090) is used to store synthetic metrics specifications, local versions of synthetic device specifications, and current processing state(s), and one or more data stores (e.g. 3070) is used to store generated data, although any configured data store may be used for any data in accordance with the configuration.

Synthetic metrics manager (3710) manages the synthetic device and synthetic metrics processing provided by the CRATE processor. The synthetic metrics manager manages the instantiation of synthetic device specifications and synthetic metrics specifications.

Referring to FIGS. 2, 3, 5, 6, 8, and 9, the synthetic metrics manager reads the synthetic device specification's data source/collection methods specification (6150) to determine the sources of collected data that are to be used for processing one or more synthetic metrics specifications comprising a synthetic device specification. The synthetic metrics manager then determines which collection interface(s) (i.e. one or more network interfaces (2200), communication interfaces (2202) collector plug-ins (2730) and/or receive interfaces (2610)) are capable of collecting and providing, to the CRATE processor (2450, 3450) collected data, for example one or more of monitored metric values, metadata, sensor data, historical data, synthetic metrics data generated by one or more other CRATE processors, and configuration data, for use in generating the synthetic metrics information.

In operation, the CRATE processor (2450) loads one or more synthetic device and synthetic metrics specifications, together or separately, from a data store (e.g. 2810, 3090, 4300), determines collected data required to process the synthetic device specifications, and configures one or more collection interfaces to receive the required collected data. For example, the CRATE processor configures a network interface (2200) to collect the specified collected data directly from one or more network connected devices and configures a communication interface (2202) to collect the specified collected data from one or more non-network connected devices. Alternatively, the CRATE processor configures one or more external components (e.g. collectors, remote collectors, NMDs, external data stores, and third party data sources) in order to obtain the specified collected data.

In some exemplary embodiments, the CRATE processor also interacts with one or more "remote collectors," (not shown) e.g. stand-alone remote collectors or collectors operating as part of an NMS, in order to obtain specific monitored metric data as required by the CRATE processor. For example, the CRATE processor informs a collector that it requires VM CPU usage and virtual machine CPU and memory usage data for a specific host. The collector determines if one or more plug-ins capable of collecting the monitored data requested by the CRATE processor are running (or can be executed by the collector) and, if so, passes monitored data collected by the plug-ins to the CRATE processor. The collector executes one or more collector plug-ins (e.g. dynamic applications) to collect the data requested by the CRATE processor.

The synthetic metrics manager establishes a timer, polling schedule, or other data retrieval schedule for receiving monitored data from the identified collector plug-ins, data collection applications, and/or receive interfaces according to the synthetic metrics specification's reporting update frequency specification (6140). The synthetic metrics manager starts a timer or polling process in which it retrieves or otherwise receives collected data from one or more data collection applications and/or network interfaces.

Upon completion of processing, the synthetic metrics manager outputs the newly generated data, in accordance with the synthetic metrics specification. At the start of its execution, the synthetic metrics manager is configured using the synthetic metrics specification to create generated data in one or more desired formats, such as formats that is readable and usable by external network management systems and other network components. For example, the synthetic metrics specification specifies output synthetic metrics values in a format that conforms to monitored metric values collected from a direct source. The CRATE processor configures one or more output interfaces for publishing the generated data. Output interfaces include one or more network interfaces (2200) for outputting data and control information to network connected devices or communication interfaces (2202) for outputting data and control information to non-network connected devices. Output interfaces may be facaded, as described below.

In some implementations, the CRATE processor includes a synthetic metrics event manager (3740) that provides a service for defining, dispatching, processing, and managing generated data-based events. In one exemplary implementation, each event causes the execution of a specific well-defined action or method of the synthetic metrics specification. Generally, events are created when a synthetic metrics engine determines, or another application determines based on synthetic metrics values, that one or more data tests have indicated that other network management device applications or operators need to be notified. Events define an arbitrary action to be taken by the CRATE processor or a network management device.

A synthetic metrics event rule specification includes one or more conditions or occurrences that trigger the creation of an event as well as actions or methods and actions that are triggered when the event is created. Exemplary occurrences that trigger the synthetic metrics event manager to create an event in accordance with one or more synthetic metrics event rule specifications include, for example:

- Performance metric measured by synthetic metrics value is out of bounds defined by threshold;
- Performance metric measured by synthetic metrics values shows performance degradation (e.g., goes below a threshold value or shows decreasing values over a specified number of update cycles as specified in (6140));
- One or more monitoring metrics collected data parameters are not available for more than a threshold amount of time;
- Only low quality monitored metrics sources (e.g. indirect sources) are available for more than a threshold amount of time; and
- The selected synthetic metrics specification produces synthetic metrics values outside of "reasonable" range (e.g. 150% CPU usage, −25% memory usage).

Exemplary actions or methods that are specified for event processing include one or more of the following:

- Send notification using an external notification mechanism, e.g.: user interface popup, instant messaging, email, pager, and/or SMS;
- Execute a predefined dynamic application;
- Modify the state of a data store item;
- Ping the collector to resolve data availability issues;
- Initiate fallback data source;
- Select a portion of the current synthetic metrics specification to process the event; and
- Select a different synthetic metrics specification or part of a synthetic metrics specification (e.g. a specified executable code or application, with the same or different input sources) to provide additional synthetic metrics values (i.e. replace faulty synthetic metrics with new synthetic metrics).

In a first exemplary implementation, the CRATE processor receives the required collected data as processed collected data from information collection applications that are part of the CRATE processing device. In a second exemplary implementation, the CRATE processor receives collected data directly from an external remote collector network as described below. In a third exemplary implementation, the CRATE processor receives the collected data from one or more NMSs.

Without regard to source, the CRATE processor receives the collected data on a collection interface and processes the collected data according to one or more synthetic metrics specification rules (6160) and specifications. The received collected data is passed to synthetic metrics specifications that require it, as specified by a synthetic device specification. If a rule is present to instantiate an additional synthetic metrics specification for additional processing, the additional synthetic metrics specification is instantiated, and the collected data is passed to it.

The CRATE processor (or one of its components) processes the collected data to create updated generated data and then stores and/or publishes the newly created generated data, to one or more data stores (e.g. data store (3070), (2810), or (4300)) and/or via a facaded interface. At a subsequent point in time, the same or a different CRATE processor can retrieve, from the data store or facaded interface, one or both of previously stored collected data and previously stored synthetic metrics values for use as historical data, for example for use as historical collected metrics values.

Alternatively or in addition, the CRATE processor causes the generated data to be published (as part of a façaded interface) using various well known network publishing protocols, for example, FTP/SFTP, HTTP/SHTTP, LDAP, and TCP/IP. In an alternative exemplary implementation, the CRATE processor causes the generated data to be communicated to one or both of network management device (2080) and remote collector (3510) which, in some further exemplary implementations, further communicate the generated data to one or more additional network measurement devices or other network management system components (not shown).

5.2.4 Synthetic Device Specifications

A synthetic device specification defines how a CRATE processor is configured as a synthetic device for generation and presentation of generated data including synthetic metrics values and other data. A synthetic device specification defines one or more of each of

- Data source/collection methods specifications;
- Synthetic metrics specifications;
- Façaded device specifications;
- Data store specifications.

An exemplary synthetic device specification defines characteristics of a synthetic device that are represented by a CRATE processor as an actual device for the purpose of presenting or publishing generated data.

Figure 5:
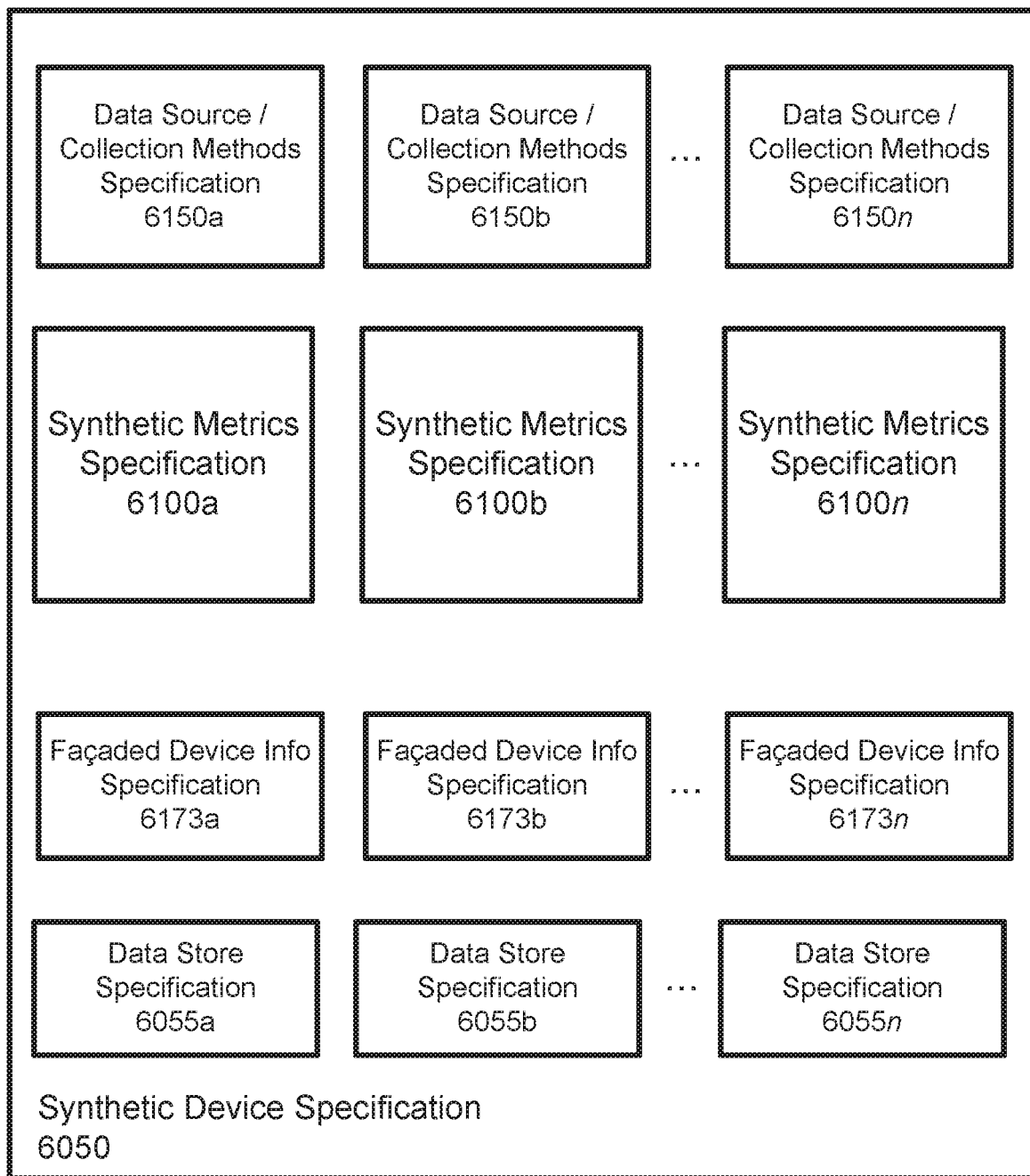
FIG. 5 depicts an exemplary synthetic device specification and its subparts, in accordance with the illustrative technology herein.

Referring to FIG. 5, the system defines a synthetic device specification (6050) comprising:

- One or more data source/collection methods specification(s) (6150) of collected data (e.g., monitored metrics values, historical collected metric values, and synthetic metric values) that are used in the creation of generated data, including sources and methods for obtaining the collected data. These data source and collection methods define what and how information is collected. The system uses these specifications when matching against discovered data sources as described below. The data sources include other CRATE processors or NMSs, network and local data stores, direct sources (i.e. one or more sources of data that directly measure one or more monitoring metrics values associated with a hardware or software system or subsystem), and indirect sources that provide monitored metrics values that have been previously calculated about one or more direct source values. For example, a direct source monitored metrics value could be the value of CPU utilization for a specific processor, and an indirect source monitored metrics value is the historical running average and standard deviation of the CPU utilization value. Multiple levels of indirection/sequential calculation are used for indirect source values. The specification includes references to one or more types of data sources, and includes connection protocol specifications, references to executable code fragments or programs, and authentication materials that are used to connect to each defined data source. In some embodiments, a synthetic device specification includes multiple data source/collection methods specifications (6150a, 6150b, etc.), each corresponding to one of multiple synthetic metrics specifications (6100a, 6100b, etc.) while in other embodiments, a data source/collection methods specification defines one or more data sources and collection methods for multiple synthetic metrics specifications (i.e. a particular data source/collection methods specification defines sources and collection methods for collected data that will be processed by two or more individual synthetic metrics specifications (e.g. 6100a, 6100b) to create generated data). In a exemplary embodiment, a single data source/ collection methods specification is used to specify collected data, sources, and collection methods for all synthetic metrics specifications included in a synthetic device specification.

One or more synthetic metrics specification(s) (6100), each comprising a specification that defines how generated data is created, updated, stored, and published. A synthetic device specification includes one or more synthetic metrics specifications, each of which is associated with at least one data source/collection methods specifications (6150) and a façaded device information specification (6173). In some embodiments a synthetic device specification includes multiple synthetic metrics specifications (6100a, 6100b, . . . , 6100n) while in other embodiments a synthetic device specification includes a single synthetic metrics specification (e.g., 6100a). Synthetic metrics specifications are described in further detail below.

One or more façaded device information specification(s) (6173), each comprising a specification including information corresponding to a virtualized synthetic device that is represented by one or more façaded interfaces. In some implementations, the specifications take the form of interface templates which are used by the facaded device interface to collect and populate previously stored data in a specific format or structure. The device information in the specification includes, for example, device type, device manufacturer, device ID, and device capabilities. A synthetic device specification includes one or more facaded device definitions, each of which defines properties of a synthetic device corresponding to some or all of the data utilized by a CRATE processor. In this manner, the CRATE processor presents multiple façaded interfaces that each represent a different aspect of the same synthetic device.

One or more data store specification(s) (6055), each comprising a specification of one or more data stores used by a CRATE processor to store collected data and generated data. In some embodiments, a synthetic device specification includes multiple data store specifications, each of which can specify one or more data source specifications (e.g., for defining storage of collected data) and/or corresponding to one or more synthetic metrics specifications (e.g., for defining storage of generated data).

5.2.5 Synthetic Metrics Specifications

Synthetic metrics specifications define how synthetic metrics information is created, updated, and published. The specification defines one or more of:

Differing polling frequencies;
Differing reporting frequencies;
Differing types of monitored metrics and other monitored data;
Differing rules for processing collected data;
Differing units of measure;
Differing data types An exemplary synthetic metrics specification defines synthetic metrics values representing a variation of a measurement of an actual monitored metrics value such as CPU utilization, memory usage, or network utilization, and then adjusts or alters that measurement in a defined way in order to create the synthetic metrics value.

Another exemplary synthetic metrics specification defines synthetic metrics values representing a blending of two or more actual performance parameters, where monitored metrics representing the actual performance parameters are collected at differing time intervals, and the synthetic metrics value is a blending of these different monitored metrics values, e.g. the most current collected monitoring metric value of three asynchronously collected monitoring metric values is provided as the current synthetic metrics value.

Yet another exemplary synthetic metrics specification defines synthetic metrics values which are inferred from a collected monitored metric value, such as the percentage of CPU utilization for a virtual machine based upon provisioned and actual hypervisor CPU parameters.

Figure 6:
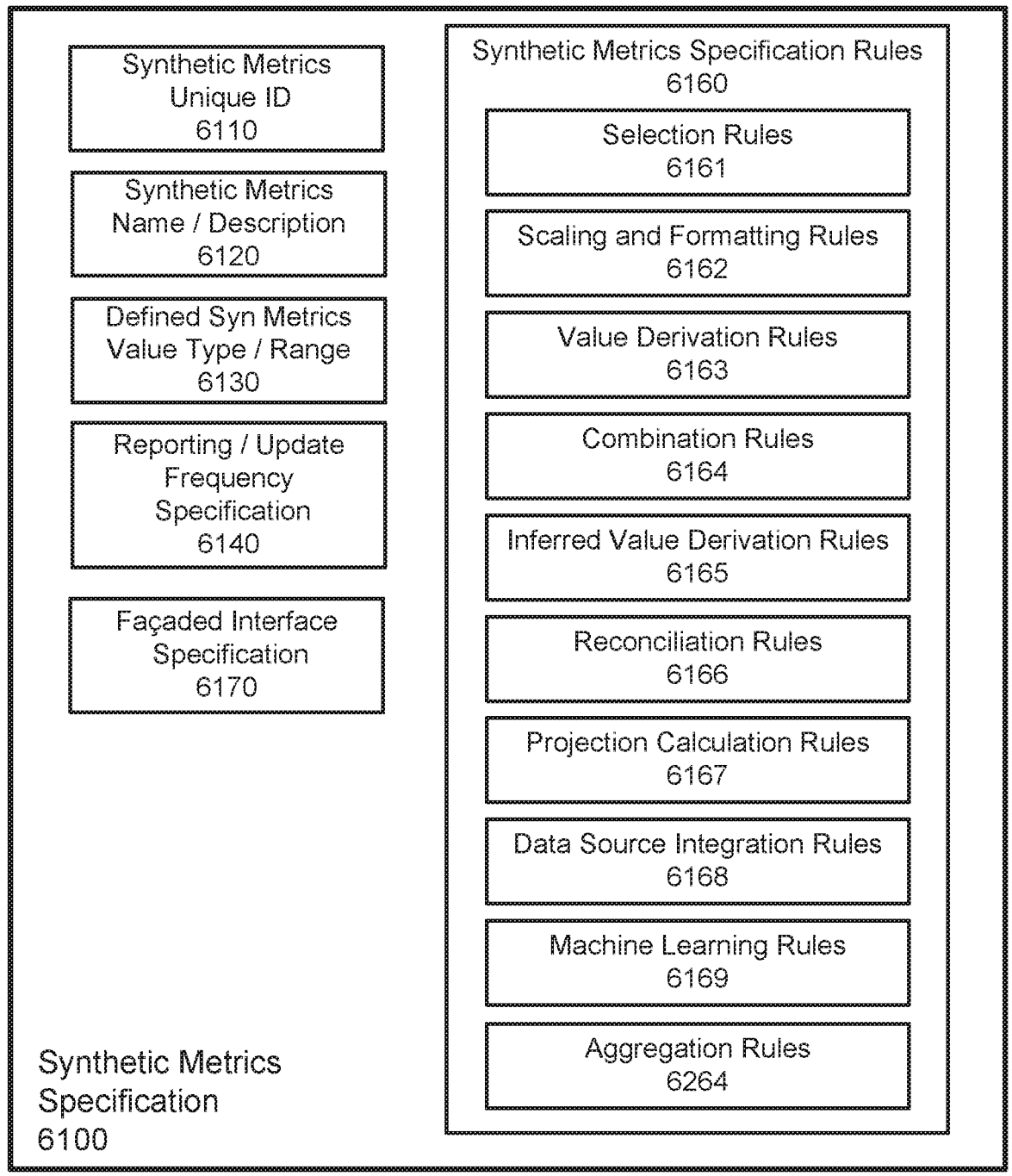
FIG. 6 depicts an exemplary synthetic metrics specification and its subparts, in accordance with the illustrative technology herein.

Referring to FIG. 6, the system defines a synthetic metrics specification (6100) comprising:

A synthetic metrics unique ID (6110). This ID is used by the system to uniquely identify individual synthetic metrics specification instances.

A synthetic metrics name and/or description (6120). These provide user-readable name and description when integrating the synthetic metrics specification into another system, such as a network management system.

A defined synthetic metrics value type and range (6130). This is used to facilitate display of the synthetic metrics values when integrating the synthetic metrics specification into other systems, and when converting the synthetic metrics value as part of other synthetic metrics.

A reporting/update frequency specification (6140). This defines the frequency at which the generated synthetic metric value is updated, and is used to limit overhead by applications that poll the synthetic metric. This definition may be used to define the publishing and/or collection timer values.

A set of synthetic metrics specification rules (6160) that define how the synthetic metrics values are to be selected and calculated from the collected data. The rules define how monitored metrics values from direct and indirect sources are combined to generate synthetic metrics values. The rules take several forms, which are used independently or in combination.

A façaded interface specification (6170), comprising a specification for one or more data stores, interfaces, and templates/specifications that control publishing of metrics values defined for the CRATE processor.

Further, as described above, the synthetic metrics specification rules (6160) have the following forms:

A first form of rule (6161) comprises selection rules that define how collected data are selected for use. For example, most current, most accurate, etc. Alternative forms of these rules include selection by matching characteristics against one or more patterns or templates.

A second form of rule (6162) comprises scaling and formatting rules, for example, rules that change the scale, range, or type of a collected metrics value. For example, a rule that converts collected metrics values reported by a source in Mbits/second to synthetic metrics values represented in Mbytes/hour.

A third form of rule (6163) comprises rules for deriving synthetic metrics values from other values, for example from historical metrics values, monitored metrics values, synthetic metrics values, or a combination thereof, to determine a new synthetic metrics value that is a fixed or variable percentage of one or more of the other values. This form of rule references one or more executable programs or program fragments that implement the synthetic metrics value calculations.

A fourth form of rule (6164) comprises combination rules that define how selected collected metrics values, e.g. monitored metrics values, are combined and/or mathematically aggregated to generate synthetic metrics values comprising new, combined, metrics values. The combined metrics values include, for example, a ratio of two values, a weighted average, etc. Combination rules include, for example, best fit, averages, interpolation, and weighting. Weighting is based on factors such as collection protocol, frequency of collection, and last collection time. This form of rule is useful for determining what collected metrics values are combined to generate a synthetic metrics value; for example, based on known relationships and naming conventions. This form of rule references one or more executable programs or program fragments that implement the synthetic metrics value calculations.

A fifth form of rule (6165) comprises rules for deriving inferred synthetic metrics values from other values, e.g. from monitored metrics values or synthetic metrics values. The inferred synthetic metrics value is an estimate of a value of a parameter measured by a direct source that is inferred from a value of another parameter that is measured by an indirect source. This form of rule references one or more executable programs or program fragments that implement the synthetic metrics value calculations.

A sixth form of rule (6166) comprises rules for reconciling heterogeneous source reporting or polling intervals, such as selecting the most currently reported monitored metrics value from a set of three different values reported at differing intervals. In a particular example, synthetic metrics values are derived from monitored metrics values collected from various sources, such as: the synthetic metrics value calculated from a monitored metrics value generated by a first direct source during a first time period, a monitored metrics value generated by a second direct source during a second time period, and a value inferred from monitored metrics value generated by an indirect source during a third time period. In a second example, the synthetic metrics value is calculated by blending monitoring metrics values collected from two or more sources at intermediate or other time periods.

A seventh form of rule (6167) comprises rules that define how projected values are calculated. As an example, a projected value rule produces a projected time series of values based upon one or more algorithms, and provides these projected values over time. Projected values include estimates, made by the CRATE processing device, of a metric's value at one or more future time points. This form of rule references one or more executable programs or program fragments that implement the synthetic metrics value calculations. In an exemplary embodiment, a projected value rule specifies a trained ML model to be used to generate projected values. Projected values are useful for calculating trends in utilization.

An eighth form of rule (6168) comprises rules for the integration of collected data from external data sources that comprise non-IT assets; for example, stock market prices or aspects of the current weather such as temperature.

A ninth form of rule (6169) comprises machine learning rules that learn relationships between sources and collected metric values and create new or modified rules that support these learnings. The created rules are added to one or more synthetic metrics specifications or are used to create new synthetic metrics specifications. For example, a machine learning rule operates on multiple data sources and monitoring metrics values and learns relationships between monitored metrics values collected from direct sources and monitored metrics values collected from indirect sources and encode these in synthetic metrics specification rules. For example, during time periods when monitored metrics values from an indirect source and monitored metrics values from one or more direct sources are available, the system learns relationships between indirect source monitored metrics values and direct source monitored metrics values. During periods when direct source monitored metrics values are not available, the system calculates an estimated synthetic metrics value from indirect source monitored metrics values. In other examples, the system calculates estimated or interpolated synthetic metrics values by blending combinations of monitored metrics values from various sources; for example by blending two direct source monitored metrics values, or blending an indirect source monitored metrics value with one or more direct source monitored metrics values. Specifically, synthetic metrics machine learning rules specify that the synthetic metrics value is provided monitored metrics values from one of the direct sources, an inferred value calculated based on an indirect source monitored metrics value, a plurality of monitored metrics values provided by a single direct and/or indirect source, or a synthetic metrics value calculated using an algorithm that incorporates monitored metrics values provided by two or more direct and/or indirect sources.

A tenth form of a rule (6264) comprises aggregation rules that define how selected collected data values of two or more types, from two or more sources, or comprising a combination of multiple types and sources are aggregated to generate a unified data stream of synthetic metrics values. This form of a rule is useful for generating a synthetic metrics data stream that includes a combination of different data types, each of which may be collected by the CRATE processing device from a different data source. An exemplary aggregation rule specifies a synthetic metrics data stream that includes historical collected metrics data retrieved by the CRATE processing device from a data store (e.g. 3070, 4300), current collected metrics values obtained by the CRATE processing device from a connected device, and projected synthetic metrics values generated by the CRATE processing device based on the current collected metric values.

Figure 7:
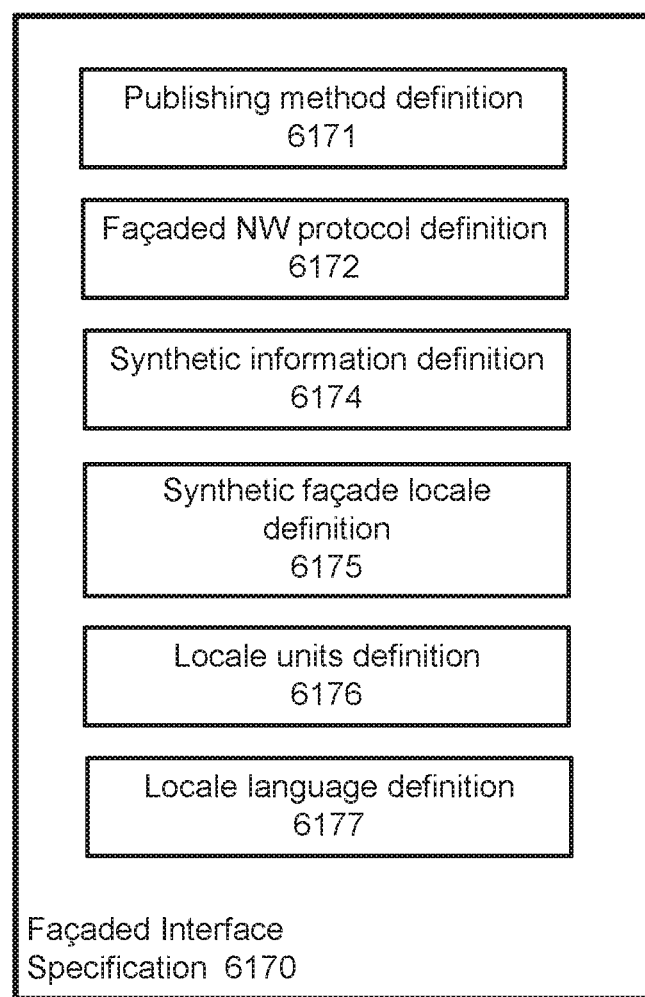
FIG. 7 depicts an exemplary façaded interface specification and its subparts, in accordance with the illustrative technology herein.

Referring to FIG. 7, the system defines a façaded interface specification (6170) comprising:

A publishing method definition (6171). The publishing method definition specifies how synthetic metrics values generated according to the synthetic metrics specification are presented or shared by a CRATE processing device including one or more of: published to a data store and/or interface identified by the publishing method specification. or by a data store specification (6055) that is referenced by the publishing method definition, communicated to one or both of network management device (2080) and remote collector (3510), or presented by a façaded interface, for example as data that is available upon request from a façaded interface configured to present as a particular network device or by subscribing to a feed available from a façaded interface configured to present as a device that is a source of a feed such an RSS feed.

A façaded interface network protocol definition (6172). The network protocol definition specifies network publishing protocols provided by a façaded interface. Exemplary network protocols specified by this definition include FTP/SFTP, HTTP/SHTTP, LDAP, TCP/IP, SMS, and RSS. The façade network protocol definition defines the protocols either by reference to a dynamic application that provides the protocol or by reference to a well-known protocol. If the protocol is an XML-based API, the façade network protocol also references a DTD/XML schema that defines the API.

A definition of generated data provided by a façaded interface (6174). The generated data provided by a façaded interface as if it were information generated by the operation of a device represented by the façaded interface, i.e. information provided by a device that the façaded interface is masquerading as. The specification (template) for the generated data provided by a façaded interface includes synthetic metric data value source specifications that are used as input by the façaded interface. These include one or more data store specifications, locally generated metric values, or processing pipelines that generate the synthetic metric values, filtering specifications, and a mapping of these values to a facaded device presentation.

In a first exemplary embodiment, a definition of generated data provided by a façaded interface (6174) references one or more data stores (e.g. 3070) in which synthetic metric data values for presentation on the façaded interface are stored. The synthetic metrics values include first metric values provided by at least a first CRATE processing device (first values), and may include synthetic metrics values generated by a second CRATE processing device that are aggregated with the first metric values.

In a second exemplary embodiment, a definition of generated data provided by a façaded interface (6174) references external processing systems that generate and publish synthetic metrics values on an interface.

In a third exemplary embodiment, a definition of generated data provided by a façaded interface (6174) includes a presentation definition of how one or more synthetic metric values are to be filtered and/or presented by the facaded interface.

A synthetic façade locale definition (6175). The locale definition specifies a location of a virtualized synthetic device presented by a façaded interface, as perceived by an external device that queries or subscribes a feed provided by the façaded interface, or a location of the external device. Exemplary locales include a particular country, for example France, England, or the United States. In an alternative exemplary embodiment, a publication specification does not include a synthetic façade locale definition. In this embodiment, an exemplary CRATE processing device determines a locale based on information, for example a country code or IP address, received as part of a query for information from a particular façaded interface.

A definition of synthetic metric units associated with a locale (6176). This definition includes a formatting specification that defines units and precision of synthetic metric values reported by a façaded interface. The synthetic metric units correspond to a locale specified by a synthetic metrics locale definition or determined by a CRATE processing device. An exemplary synthetic metrics unit definition includes specification of Imperial units for locales including the United States of America and the United Kingdom (UK) and International System of Units (SI) units for locales that include European countries other than the UK. In an exemplary embodiment the synthetic metrics unit definition includes one or more conversion formulas for use by a CRATE processing device or façaded interface to convert synthetic metric values to units specified by the definition.

A definition of language associated with a locale (6177). This definition specifies a language corresponding to a locale, in which generated data is to be presented on a façaded interface, for example English for a UK façaded interface locale and French for a façaded interface locale of France. The definition includes specification of a translation service to be used to translate generated data; for example, an identification of a language translation API.

Other forms of rules are incorporated into the synthetic metrics specification without deviating from the scope herein. For example, one or more rules are defined that include executable code fragments, that reference executable code fragments, or that reference well known executable applications that are to be used. The rules further define one or more execution conditions, which are the conditions under which a specific application or code fragment is executed. In this way, the synthetic metrics specification is optimized for delivery by only including the portions of the code that are needed on a specific CRATE processor or CRATE-enabled device.

A synthetic metrics specification further comprises specifications that define when, where, or under what conditions the synthetic metrics specification is instantiated (e.g. a synthetic metrics instantiation condition). These conditions are used by a CRATE processor in order to determine if a specific synthetic metrics specification is permitted to be instantiated on that CRATE processor.

In an alternative embodiment, the synthetic metrics specification includes rules (not shown) that define one or more synthetic metrics events, the event triggering conditions, event dispatch specifications, and event handling specifications. Event triggering conditions are the conditions which cause an event to be generated, and are typically evaluated by a CRATE processor or one of its components. Event dispatch specifications define how an event is handled by the CRATE processor, and which components (or external systems) receive the event. Event handling specifications define how a CRATE processor or one of its components processes a received event.

5.2.5.1 Synthetic Metrics Conversion

In some embodiments, a CRATE processing device optionally converts one or more aspects of generated data to correspond to the specification of a particular façade interface. In an embodiment, the CRATE processing device normalizes value of units presented on a dynamically defined interface to correspond to units reported by a particular façade interface. In an exemplary embodiment, the CRATE processing device determines a locale of the façaded interface based on a definition of a locale (6175) and units specific to the locale from a definition of synthetic metric units (6176) corresponding to the locale. For example, if a CRATE processing device creates synthetic metric values using collected metric values of pressure having units of pounds per square inch, it converts synthetic metric values to Pascal (Pa) for inclusion on a façade interface that represents a synthetic device having an identified locale for which pressure units are defined to be reported in SI units.

In some exemplary embodiments, a façade interface is configured to dynamically convert synthetic metric value units to units specified for the façade interface. In an exemplary embodiment, a CRATE processing device retrieves unit conversion formulas from a definition of synthetic metric units included in a façaded interface specification and configures the façaded interface with the one or more unit conversion formulas. For example, if a façade interface that includes synthetic metric values with SI-based pressure units receives, from a CRATE processor, synthetic metric values with units of atm, the façade interface converts the units to Pa before making the data available.

In a similar manner, the CRATE processing device or façade interface converts other aspects of generated data, for example language, precision, or scale, to correspond to one or more reporting requirements of a particular façade interface. For example, if a CRATE processing device creates generated data that includes English language formatted alerts, the CRATE processing device translates the alerts from English to Spanish for presentation on a Spanish language façaded interface.

5.2.6 Distribution Formats

The synthetic device and synthetic metrics specifications are typically implemented using a markup language such as XML, or a combination of a markup language and one or more pieces of executable program that implement the synthetic metrics processing. In alternative exemplary implementations, synthetic device specifications and synthetic metrics specifications are implemented in one or more alternative formats; for example, as stand-alone applications, plug-ins for other programs, libraries, objects, etc. as required for a particular environment. In some exemplary implementations, one or more synthetic metrics specifications are integrated as components of a synthetic device specification. In other exemplary implementations a synthetic device specification includes identification of one or more non-integrated synthetic metrics specifications which are implemented as separate components which can be distributed in differing formats and/or from differing sources.

Figure 8:
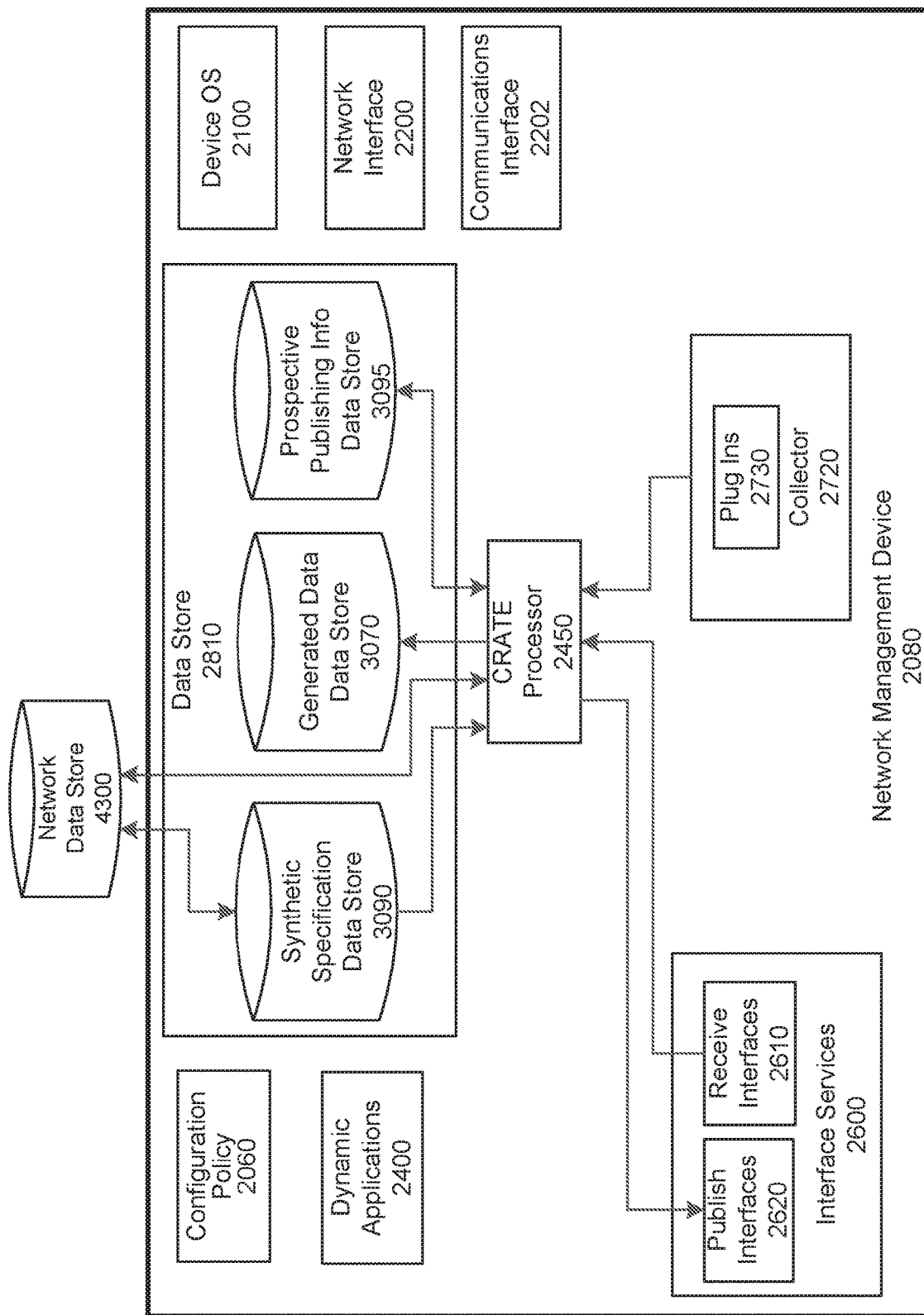
FIG. 8 depicts an exemplary network management device including a CRATE processor and other components in accordance with the illustrative technology described herein.

In a first exemplary format, as illustrated in FIG. 8, synthetic device specifications are deployed as dynamic applications (2400) that each include or reference at least one synthetic metrics specification (e.g. 3100*a*, 3100*b*) and one or more application components that are executed to perform one or more aspects of the synthetic metrics data collection, calculation, or publishing processes. In a second exemplary format, synthetic device specifications and synthetic metrics specifications are implemented as virtualized dynamic applications running on a virtual service guest operating system that includes a virtualized NMD. In a third exemplary format, synthetic device and synthetic metrics specifications are implemented as individual programs that are executed inside lightweight software-defined virtualized container environments, similar to an application container such as a Docker application container. The application components are uniquely identified by an Application ID to facilitate reuse.

5.2.7 Facaded Interface

An exemplary façaded interface is represented to be a queryable synthetic device, e.g., a simulated hardware and/or software network component wherein synthetic metric values represent values of performance metrics of the synthetic device.

A first exemplary façaded interface is represented to be a queryable synthetic connected device having a known type of device, for example a known network device such as a VM, switch, or router. The publishing interface presents synthetic metric values as if they were measurement values of performance metrics of the actual connected device. The publishing interface publishes the synthetic metric values that the CRATE processing device creates using values of collected data metrics obtained from one or more source connected devices. The synthetic connected device reacts in the same way as one or more of the actual connected devices, only presenting the generated data instead of actual performance data. Alternatively, the synthetic device represents a known network device that is of a type different from all of the source connected devices. In a first exemplary embodiment, the CRATE processor calculates an average of vCPU usage of each of multiple virtual machines and publishes the average vCPU as vCPU usage metric values of a synthetic virtual machine. In a second exemplary embodiment, the CRATE processor creates a synthetic metric value for an inferred vCPU usage from a hypervisor physical CPU usage and publishes the inferred vCPU usage as a vCPU usage of a synthetic VM.

A second exemplary façaded interface is represented to be a queryable synthetic device having a previously unknown type of connected device. In an exemplary embodiment, the publishing interface presents synthetic metric values as if they were performance measurement metric values corresponding to a group of features, interfaces, or the like that are not found in combination on any known type of connected device. In this manner, the publishing interface represents a synthetic connected device that includes an unknown, on an actual physical connected device, combination of characteristics or functions of one or more source devices and/or synthetic characteristics or functions generated based on metric values collected from one or more source devices. In another exemplary embodiment, the publishing interface presents synthetic metric values representing metrics or other information that are not generated by or do not correspond to any known connected device.

In a third exemplary embodiment, a CRATE processing device obtains collected data from multiple sources and creates generated data using the collected data. The CRATE processing device publishes the generated data as part of multiple façaded interfaces wherein each façaded interface is represented to be one of multiple individual synthetic connected devices, each giving the same or differing device types. In an alternative embodiment, two or more of the façaded interfaces each represent a different interface of the same connected device. In this manner, the CRATE processing device masquerades as a single synthetic device having multiple façaded interfaces. In a further exemplary embodiment, the CRATE processing device publishes the generated data as part of façaded interfaces representing a combination of one or more synthetic devices (each publishing generated data), source devices (each publishing collected data obtained from a source), and combination devices (each publishing a combination of collected data and generated data).

In a fourth exemplary embodiment, a CRATE processing device publishes generated data including events, alerts, and notifications to an alert interface such as a façaded interface that is represented to be a pseudo-SNMP agent or RSS feed source. In an exemplary embodiment, the CRATE processing device reformats events, alerts, and notifications into RSS format and publishes them as part of a façaded interface that is represented to be a RSS interface. In another exemplary embodiment, the CRATE processing device publishes events, alerts, and notifications as part of a façaded interface that is represented to be a pseudo-SNMP agent.

In a fifth exemplary embodiment, a CRATE processing device creates and publishes, on a façaded interface, synthetic metrics values that include collected metric values generated by a device to one or more façaded interfaces that each represent an actual or a logical subcomponent of the device that generated the collected metric values. In this manner, metric values corresponding to a subcomponent of the device, for example corresponding to a firewall or hub subcomponent of a router or corresponding to a temperature sensor subcomponent of a multi-sensor measurement device, are presented on one or more façaded interfaces that are each represented to be a queryable synthetic version of the subcomponent (i.e. a subcomponent façaded interface). In some exemplary embodiments, each subcomponent facaded interface is represented as a known type of device, for example as a standalone firewall device or as a standalone temperature sensor, that is configured to publish synthetic metric values comprising collected metric values corresponding to the corresponding subcomponent. In other exemplary components, at least one subcomponent façaded interface publishes data that includes collected metric values corresponding to at least one subcomponent combined with metric values of another type or collected from another device or subcomponent. For example, in one embodiment, collected metric values that include temperature metric values collected from a temperature sensor subcomponent are aggregated with synthetic metric values that include inferred temperatures metric values generated by a CRATE processing device based on collected data from a different device, e.g. based on instantaneous processing load metric values collected from a server computer proximate to the temperature sensor subcomponent, and a unified data stream comprising the collected and synthetic temperature metric values is published on a single façaded interface. In some embodiments, subcomponent synthetic metric values are formatted by a CRATE processing device, according to a facaded interface specification (6170), for publishing on a façaded interface using units and/or language specified by the facaded interface specification.

In some exemplary embodiments, the CRATE processing device publishes to an interface, or otherwise makes available, PPI. The PPI is updated periodically, for example in accordance with a timer, or when new or updated PPI is available.

5.2.8 CRATE-Enabled Network Management Device

CRATE processing is added to existing network management devices in order to improve their processing capabilities. As depicted in FIG. 8, an exemplary network management device (2080) is configured to process synthetic device specifications and synthetic metrics specifications and to generate generated data. The device is deployed as a standalone management device appliance, in which at least one device component is deployed operating within a network appliance, as server software installed on extant servers, as one of many instances of the device, or as virtualized instances of the device.

Interface services (2600) of a network management device (2080) provide application service-level interfaces for publishing (2620) and receiving (2610) information to and from one or more interfaces. The interface services applications provide input and output using well-known networking protocols.

Data store (2810) includes one or more repositories, including synthetic specification data store (3090), generated data data store (3070), and PPI data store (3095). Synthetic specification data store (3090) includes synthetic metrics specifications, synthetic metrics dynamic applications and, in some embodiments, synthetic device specifications. Generated data data store (3070) (a data store for storing generated data) includes synthetic metrics values, including inferred and projected values, generated by a CRATE processor (2450). Collector (2720) loads (or downloads from an external source) and executes one or more collector plug-in dynamic applications (2730) in order to process collected data, for example monitored metrics data. The collector plug-ins processes collected data received from the receive interfaces and passes the collected data to one or more dynamic applications (2400), one or more data stores (3070, 3090), a publish interface (2620), and/or to the CRATE processor (2450). Collector plug-ins include, for example, a DNS collector plug-in, SMTP collector plug-in, SNMP collector plug-in, IEEE 488 collector plug-in, dedicated bus collector plug-in, and a data store collector plug-in.

A configuration policy (2060) specifies which synthetic device specifications, synthetic metrics specifications, and dynamic applications are eligible to operate on a particular NMD. For example, the configuration policy specifies which synthetic metrics specifications are processed by the CRATE processor of the NMD. The configuration policy also specifies which dynamic applications are used by the collector (2720) in response to a CRATE processor request for specific data types.

The CRATE processor (2450) interacts with the collector (2720), for example with a classifier component of the collector, to inform the collector that specific data is required by the CRATE processor for input to a synthetic metrics application that is executed by the CRATE processor. For example, the CRATE processor informs the collector that it requires VM CPU usage and virtual machine CPU and memory usage data. The collector determines if one or more plug-ins (2730) are collecting the data requested by the CRATE processor, and if so, passes data collected by the plug-ins to the CRATE processor.

In some exemplary implementations, the collector determines that data it has collected should be passed to a CRATE processor. For example, the collector includes a classifier plug-in that is configured to recognize collected data that includes generated data collected by other collector plug-ins and to determine that the collected data should be passed to the CRATE processor. The classifier plug-in recognizes a pattern of information that matches a synthetic device or metrics specification instantiation condition and informs the CRATE processor (for example, using an event) that one or more synthetic device and/or synthetic metrics specifications should be instantiated and related synthetic metrics processing programs should be executed in order to process the collected data. For example, the classifier recognizes that a direct source of a performance metric has stopped providing data. The classifier causes the CRATE processor to execute one or more programs identified or contained within a synthetic metrics specification in order to process an update to one or more synthetic metrics values.

In an exemplary implementation, synthetic device and synthetic metrics specifications are delivered to the network management device as part of one or more dynamic applications (2400). Synthetic device and synthetic metrics dynamic applications are executed in a manner similar to that for other dynamic applications. The network management system template manager load (or downloads from an external source) synthetic device and synthetic metrics dynamic applications and stores them in the synthetic specification data store (3090). Synthetic device and synthetic metrics dynamic applications are executed and updated under control of the configuration policy (2060).

The CRATE processor (2450) executes one or more synthetic device and synthetic metrics dynamic application(s) (2400) in order to process collected data so as to create one or more generated data. In a first exemplary implementation, the CRATE processor executes one or more synthetic metrics dynamic applications automatically at startup. In a second exemplary implementation, the CRATE processor executes one or more synthetic metrics dynamic applications periodically based on a timer.

Publish Interfaces

Publish interfaces (2620) includes interfaces that provide structured data, such as FTP/SFTP, HTTP/SHTTP, LDAP, RSS, SOAP, SNMP, database, and many others. The list of publish interfaces is extensible by adding new applications to the network management device instance and updating the configuration policy to authorize them to execute. In an exemplary, non-limiting, embodiment, components of the network management device, including applications that are instantiated on the network management device, are described in one or more specifications. Examples of these specifications are described in U.S. Pat. No. 9,077,611. In this exemplary embodiment, adding new applications to the network management device includes adding additional dynamic application specifications and their instantiation conditions to the specification. The extensible publish interfaces permit the CRATE processor to create a plurality of façaded published information represented as separate interfaces, each presenting a different view of the generated data generated by the CRATE processor. Typically, each type of publish interface is provided by a separate application within the CRATE processor.

As described above, the extensible interface mechanism provides publishing interfaces to databases such as Oracle, Sybase, MySQL and SQLServer. Two types of database publish interfaces are envisioned, a first interface type that publishes information from the interface (e.g., generated data or collected data) to a connected database, and a second interface type that is further makes stored procedure calls to the connected database on behalf of the management device.

Publish interfaces also permit non-traditional delivery of event and alert information. Exemplar publish interfaces provide well known delivery mechanisms such as RSS and SMS, to which selected alert and event information are sent. The filtered information is then provided to operators and managers.

Publish and Unpublish Operations:

The Publish and Unpublish operations of the CRATE processor define operations by which a particular specification-defined data is exposed on one or more the publishing interfaces.

5.2.9 CRATE Processor with Machine Learning

Figure 9:
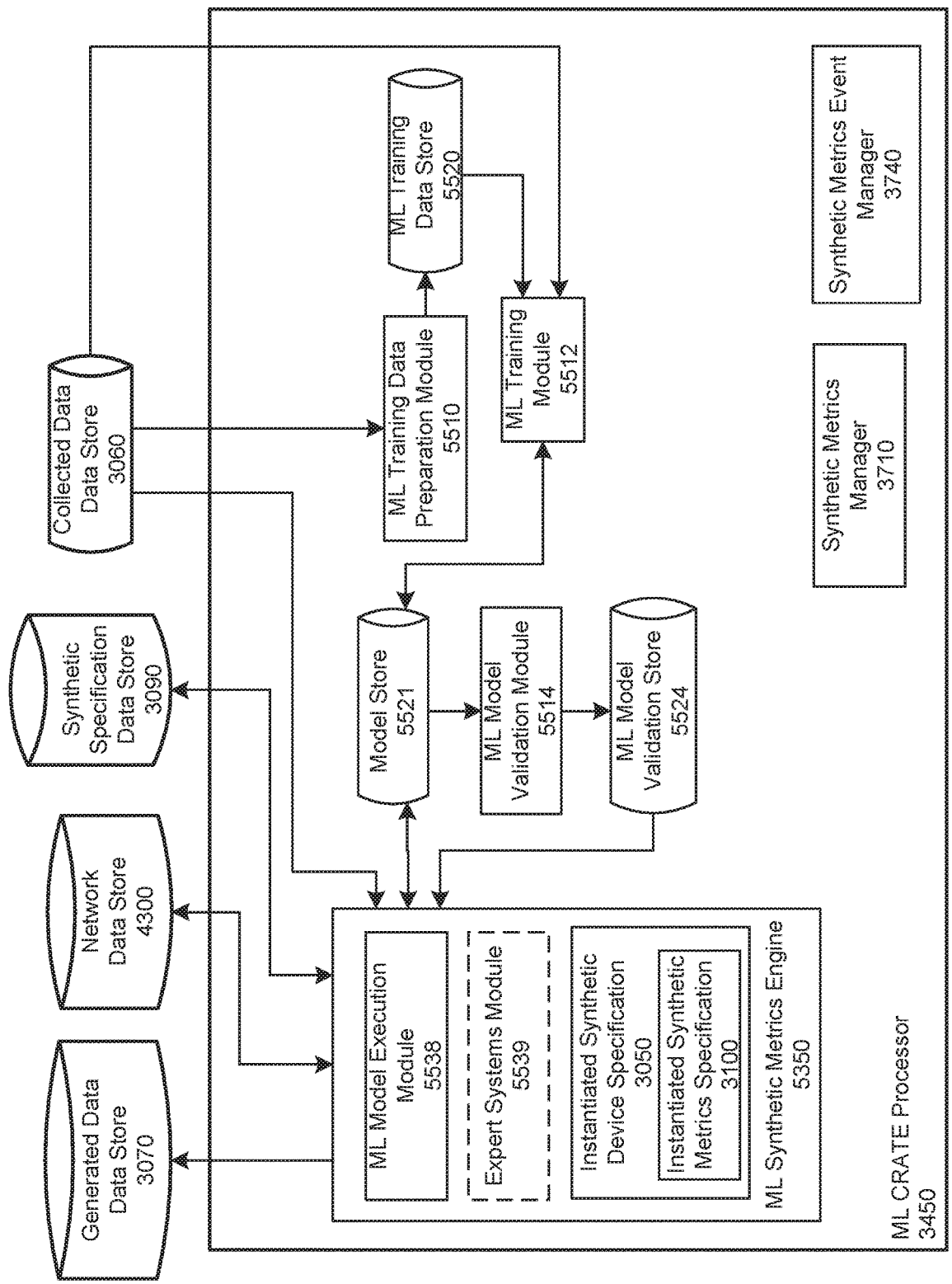
FIG. 9 depicts an exemplary machine learning CRATE processor for processing synthetic metrics specifications including machine learning rules, in accordance with the illustrative technology herein.

As depicted in FIG. 9, an exemplary embodiment of a machine learning-enabled (ML) CRATE processor (3450) is configured to create generated data using one or more machine learning models. The ML enabled CRATE processor executes one or more trained machine learning rules (6169) in order to produce generated data.

In this exemplary implementation, the ML enabled CRATE processor contains a ML synthetic metrics engine (5350) which includes instantiated synthetic device specification (3050) which includes instantiated synthetic metrics specification (3100). The ML synthetic metrics engine further comprises machine learning model execution module (5538) that executes a trained machine learning model using ML model input data to generate ML model output data (e.g. predictions, estimates, or forecasts). ML model input data includes one or more of monitored metrics data, configuration data, metadata and other external data, for example from non-IT asset data sources. The ML CRATE processor reports generated ML model output data as generated data including synthetic metric values.

In an exemplary implementation, instantiated synthetic metrics specification (3055) further comprises one or more machine learning rule(s) (6169) that specifies a type of machine learning model or a specific machine learning model for the ML CRATE processor to use. The ML CRATE processor queries model store (5521) for the specified ML model, and loads it into the ML model execution module (5538). The ML CRATE processor optionally loads a corresponding ML model quality metric from ML model validation store (5524). The ML component of the CRATE processor includes a plurality of ML model execution modules (i.e. 5538a, 5538b, etc. (not shown)) each of which execute a trained ML model. Each online ML execution module is configured to retrieve and execute a particular trained ML model.

The ML component of the ML enabled CRATE processor determines input data for the machine learning model, for example, by querying the synthetic device data source/collection methods specification (6150). The CRATE processor collects and processes machine learning model input data directly from a data source such as an external collector (2720) and/or one or more additional data sources, for example from network data store (4300) or third party data source (4200). In one exemplary implementation, the CRATE processor retrieves machine learning model input data from the collected data data store (3060) (a data store for storing collected data). The network management device stores input data to train machine learning models and to perform data generation executions of machine learning models in the collected data data store.

The CRATE processor controls the ML model execution module (5538) to execute the ML model, using ML model input data that includes collected data, including monitored metric data collected by the CRATE processor and other data retrieved by the CRATE processor from one or more data stores, to produce inferred or projected synthetic metric values as ML output. In a first exemplary embodiment, a ML model creates inferred current vCPU usage metric value(s) based on one or more collected metric values. In a second exemplary embodiment, a ML model creates one or more projected synthetic metric values which are predicted future values of metrics generated by the ML model based on current and/or historical metric values. Exemplary projected metric values include a projected CPU usage value based on current CPU usage values generated by a ML model trained on historical patterns of CPU usage metric values. The ML model execution module associates a quality or certainty metric, retrieved from the ML model validation store (5524), with the ML model output. The ML component of the ML enabled CRATE processor publishes and/or saves the ML model output as generated data.

Additional components of the ML CRATE processor train, validate, update, and store the machine learning models that are executed by the ML component of the ML enabled CRATE processor. ML training data preparation module (5510) performs operations to process and format collected data to generate ML training data that is used to train ML models. ML training module (5512) uses the ML training data to train ML models, thereby generating trained ML models. The ML training module re-trains or updates the training of ML models as the system collects additional data and produces additional estimates, predictions, and forecasts. ML model validation module (5514) performs validation testing on trained ML models to generate metrics that indicate accuracy of predictions generated by the trained models.

The machine learning (ML) training data preparation module (5510) retrieves input data from one or more data sources. The ML training data preparation module processes the retrieved data to generate machine learning model training, validation, and testing data formatted as a data frame suitable for ingestion into one or more ML models. Processing of the retrieved data includes cleaning the data to remove outliers, interpolating or otherwise filling in missing data points, and removing erroneous or otherwise unneeded data and formatting the data in a date frame. In some embodiments, one or more of these data cleaning operations is carried out by one or more collector plug-ins (2730). The ML training data preparation module (5510) creates and makes available for use, or otherwise makes available, filters usable by the collector plug-ins to perform data cleaning and formatting operations. The ML training data preparation module creates training data useful for initial training of a machine learning model and training data useful for retraining or updating a previously trained machine learning model. The ML training data preparation module stores ML training, testing, and validation data in ML training data store (5520).

The ML model store includes algorithms from commercially available ML toolkits as well as custom algorithms and models. Some examples of types of predictive models include (without limitation) regression models (e.g., linear regression, logistic regression), neural network models, classification and regression tree models, multivariate adaptive regression spline models and other machine learning models (e.g., Naïve Bayes, k-nearest neighbors, Support Vector Machines, Perceptron).

The ML training module (5512) retrieves an untrained, partially trained, or previously trained ML model from the ML model store (5521), retrieves ML training data from the ML training data store (5520), and uses the training data to train or retrain the ML model, thereby generating a trained ML model, which it stores back in the ML model store (5521).

The ML model training module re-trains or updates a trained ML model by retrieving the trained model from the ML model store, retrieving training data from the ML training data store, and using the training data to perform additional model training. The ML training module also directly retrieves data corresponding to features of a trained or untrained ML model from a system database. This retrieved data includes newly collected data and the ML training module incrementally improves the training of a model as the newly collected data becomes available. The re-trained or updated ML model is stored in the ML model store. The ML training module also executes a trained ML model to generate and update rules, including rules usable by a complex events processing (CEP) module, which are also stored in the ML model store.

The ML model validation module (5514) retrieves a trained ML model from the ML model store (5521), retrieves evaluation data (i.e. testing and validation data) from the ML training data store (5520), and performs testing and validation operations using the trained model and the retrieved testing and validation data. The ML validation module creates one or more quality metrics, e.g., a model accuracy or performance metric such as variance, mean standard error, receiver operating characteristic (ROC) curve, or precision-recall (PR) curve, associated with the trained ML model. The ML model validation model creates the quality metric by executing the model and comparing predictions generated by the model to observed outcomes. The ML model validation module stores model quality metrics in the ML model validation store (5524), or alternatively, in the ML model store (5521) associated with the trained ML model.

The ML model validation module periodically tests trained ML models using training data derived from collected observation data and recalculates quality metrics associated with the trained ML models. Trained ML models are retrained by the ML training module (5512) if the system determines that associated quality metrics have deteriorated below a threshold amount. Trained ML models also are retrained on a periodic schedule.

In some exemplary implementations, the ML component of the ML enabled CRATE processor further comprises an optional expert systems module (5539) that processes collected data using expert systems methods such as complex events processing (CEP) to generate expert systems output data. The expert systems module retrieves, from model store (5521), data processing rules, retrieves collected data from system databases or data stores (3070, 3090), and uses the rules to process the collected data. In an example embodiment, the expert systems module performs complex event processing (CEP) using the retrieved rules to recognize events and patterns. The expert system module is configured to generate alerts and otherwise communicate results generated by the module to other system processes.

5.3 Creating and Publishing Synthetic Device and Synthetic Metrics Specifications The system creates, stores, and distributes specifications for creating generated data (synthetic device and/or synthetic metrics specifications) (3050a-3050n; 3100a-3100n) and the processing attributes that comprise individual synthetic metrics specification rules (3160a-3160n). Specifications are sometimes referred to as templates, particularly when used in publishing interfaces. The system stores synthetic device and synthetic metrics specifications in one or more data stores, for example in one or more of synthetic specification data store (3090), generic data store (2810), and network data store (4300).

In one embodiment, a data store includes synthetic device specifications, further comprising one or more synthetic metrics specifications, each synthetic metrics specification comprising one or more synthetic metrics specification rules. The synthetic device specifications are indexed by identifiers associated with connected devices, for example by device type, manufacturer, other device attributes or sets of attributes, and/or relationships between devices specified by one or more façaded device information specifications (6173a-6173n). Alternatively, synthetic metrics are indexed based on workloads and behaviors of connected devices. These alternative indexing schemes permit a synthetic device to be automatically associated with newly discovered connected devices.

In an embodiment, a CRATE processor is configured manually to operate using a particular set of synthetic device and synthetic metrics specifications. The synthetic device specification and synthetic metrics specifications used by a specific CRATE processor are defined in a configuration policy associated with that CRATE processor.

A synthetic device is automatically configured to operate when it matches one or more attributes of a network device discovered by an NMD. When a network device is newly connected to a network, the NMD performs device discovery using pre-integrated and dynamic applications to determine attributes of the device, workload and behaviors of the device, and device relationships. As part of the NMD auto-discovery processing, the NMD matches attributes associated with one or more synthetic device specification dynamic applications, and executes the associated dynamic application(s).

The CRATE processor searches the synthetic specification data store (3090) or network data store (4300) for a synthetic device specification corresponding to a combination of one or more discovered attributes, workload, behavior, and relationships. If a matching synthetic device specification is found, the CRATE processor loads the synthetic device specification, associated synthetic metrics specification(s), and associated rules and uses them to generate synthetic metrics values.

If the CRATE processor does not find a synthetic device specification corresponding to the connected device in a data store (e.g. 3090, 4300), the system creates a synthetic device specification, associates it with the connected device, and saves the new synthetic device specification to a data store.

5.3.1 Example Synthetic Device and Synthetic Metrics Specification Creation

An exemplary synthetic device represents a virtual machine (VM) and a corresponding synthetic metrics value represents a measurement of CPU usage by the VM. In this example, the CPU usage of interest is percent usage, by a virtual operating system, of virtual processing resources that are available to the operating system of the VM (i.e., vCPU usage).

A Network Management System (NMS) discovers and characterizes a network device, in this example a VM. The NMS discovers characteristic of the VM including facets of the device that respond to data requests. The NMS also discovers relationships between the VM and other network entities.

During the discovery process, the NMS determines obtainable monitored metrics data including vCPU usage information of the VM from a Windows Management Instrumentation (WMI) component of a Microsoft Windows operating system executing on the VM as well as from a Simple Network Management Protocol (SNMP) agent operating on the VM. The NMS also discovers that the VM is being hosted by a particular hypervisor operating on a host machine and determines obtainable measurements of hypervisor usage of the host machine's physical CPU. The NMS determines, based on discovered relationships between the VM, hypervisor, and host machine, that hypervisor CPU usage is an indirect source of VM vCPU usage in that hypervisor CPU usage is anticipated to change as the subject VM vCPU changes. Hypervisor CPU usage depends on factors other than subject vCPU usage; for example, vCPU usage by other VMs running on the hypervisor, so that a measurement of hypervisor CPU usage alone does not provide vCPU usage of the subject VM. However, the system learns relationships between hypervisor physical CPU usage and VM vCPU usage and creates models or algorithms that are useful for generating vCPU values that are based on hypervisor CPU usage measurements.

In an exemplary method, the system creates a synthetic device representing the subject VM and a synthetic metrics value representing vCPU usage of the subject VM. The synthetic metrics value incorporates monitored data collected from the two direct sources (WMI and SNMP) and from an indirect source (Hypervisor CPU usage). The WMI data source provides monitored metrics values every 5 minutes and the SNMP data source provides monitored metrics values every thirty seconds. The WMI source is known by the system, either as specified by a user or determined by the system by quality testing of collected data, to provide more accurate data than the SNMP source. The hypervisor source provides data as a continual feed or when requested by the system.

The system creates synthetic metrics specification rules that specify how monitored metrics data from the direct and indirect sources are combined to generate the vCPU synthetic metrics values. Synthetic metrics specification rules specify that the synthetic metrics value is the value measured by the WMI source at the time of measurement and for 2 minutes following the measurement after which the synthetic metrics value is the most recent value measured by the SNMP source until a new WMI measurement is available. The rules further specify that the synthetic metrics value is a value inferred from measurements received from the hypervisor source when WMI and SNMP measurement data is not available; for example, when the most recent WMI measurement is more than two minutes old and the most recent SNMP measurement is more than 30 seconds old.

The system uses a machine learning (ML) technique to create a synthetic metrics specification rule for generating synthetic metrics values from hypervisor CPU usage measurements. The system records WMI, SNMP, and hypervisor data over time and trains a machine learning model with hypervisor data and one or more of WMI and SNMP data. When hypervisor CPU measurements are input into the trained ML model, the model creates synthetic metrics values representing inferred vCPU values. The trained model is encoded as a synthetic metrics specification rule that is used to generate synthetic metrics values when WMI and SNMP data is not available.

5.3.2 Example Synthetic Metrics Timing Diagram

Figure 10:
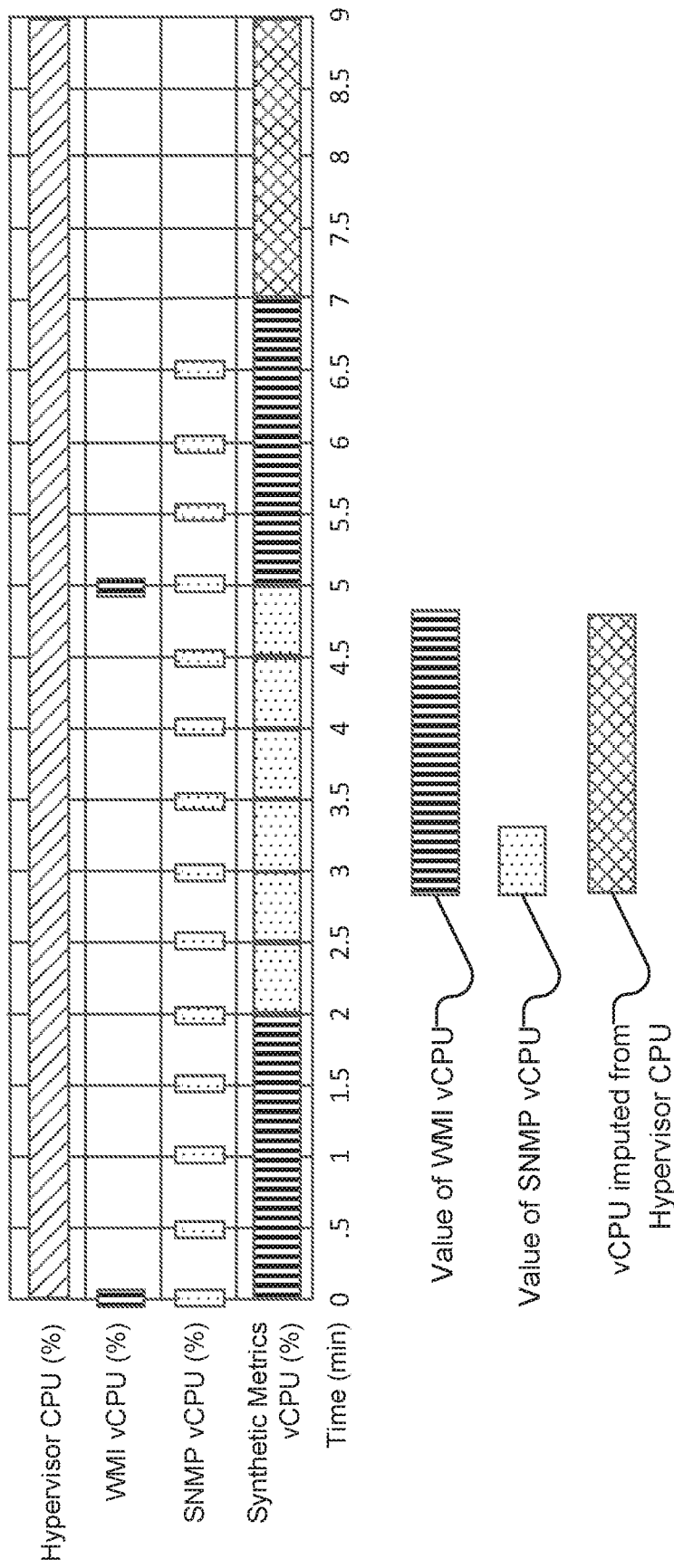
FIG. 10 depicts an exemplary processing timing of an instantiated synthetic metrics specification, in accordance with the illustrative technology herein.

FIG. 10 illustrates an example timing diagram for collecting data from the WMI, SNMP, and hypervisor data sources and a corresponding flow of synthetic metrics data.

Further examples of synthetic metrics specification rules include rules that generate synthetic metrics values (i.e. vCPU) using algorithms or trained ML models with collected data that include combinations of WMI and SNMP measurements and rules that include combinations of hypervisor measurements and one or more of WMI and SNMP measurements.

The system configures the synthetic metrics specification to generate and publish synthetic metrics values representing VM vCPU usage in a format that is readable and usable by the NMS and other system components. For example, the system configures a pseudo-SNMP agent to respond to SNMP requests with synthetic metrics values.

The system creates additional synthetic metrics values to represent other performance metrics associated with and/or related to one or more virtual machines hosted by the hypervisor. Exemplary synthetic metrics values represent, for example, VM memory utilization, and VM disk I/O. Synthetic metrics values also are developed to represent host machine physical resource utilization such as host memory usage and usage of one or more hardware processing units (e.g., cores) or combination of processing units of a host server on which a hypervisor is operating.

Figure 11:
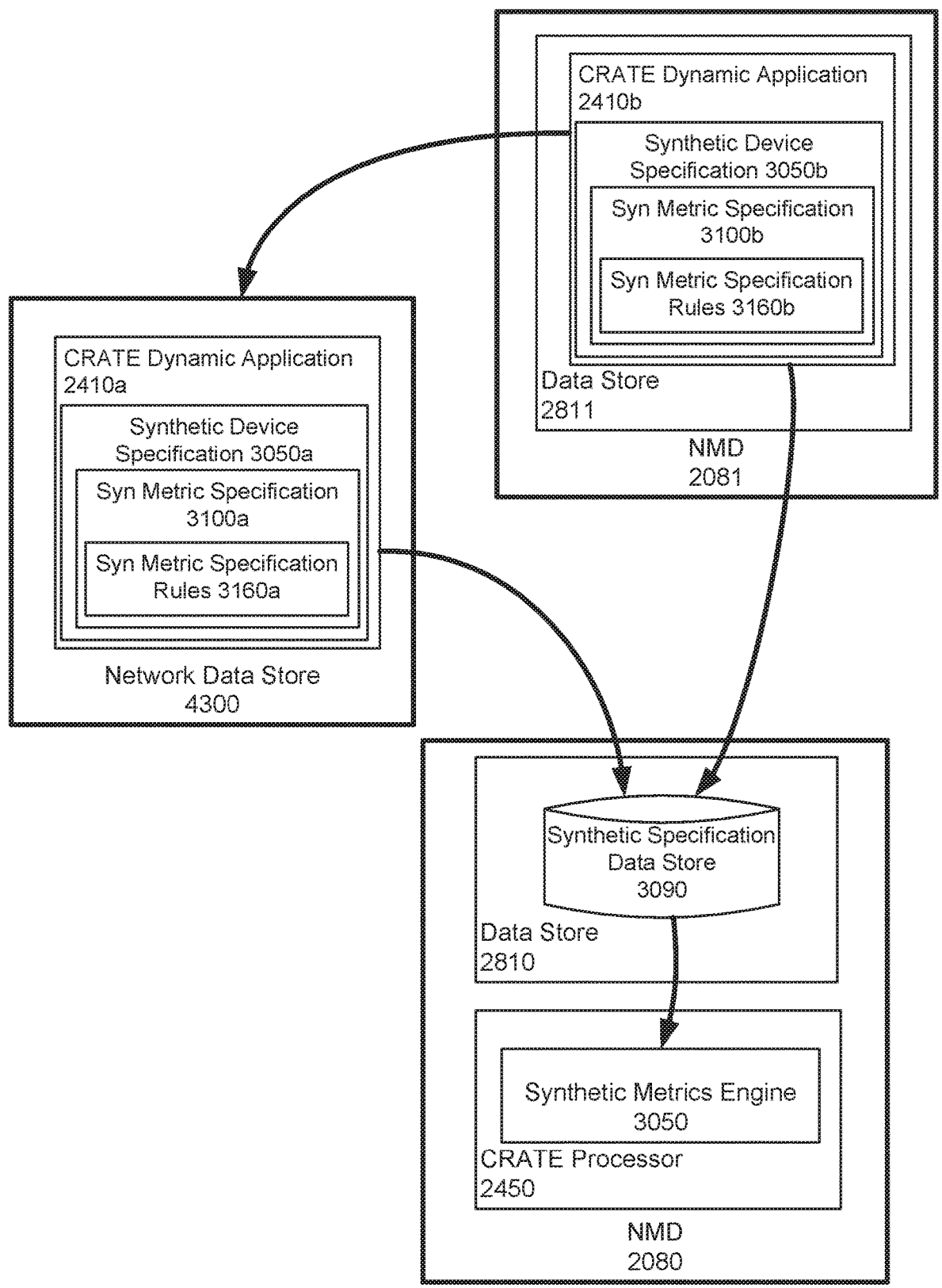
FIG. 11 depicts an exemplary network management system for publishing and distributing synthetic metrics specifications, in accordance with the illustrative technology herein.

5.3.3 Example Distribution of Synthetic Device and Synthetic Metrics Specifications Synthetic device and synthetic metrics specifications are deployed in the context of a network management system (NMS) that is configured to discover and characterize components of one or more computer networks and to collect information, including performance data, about the discovered network components. The network management system includes one or more network management devices (NMDs) similar to (2080), each configured to detect and monitor network components. As depicted in FIG. 11, a network management system comprises a first network management device (2080), and second network management device (2081) and a network data store (4300). The first network management device (2080) further comprises a CRATE processor (2450) that is configured to process one or more synthetic device specifications and one or more corresponding synthetic metrics specifications in order to generate synthetic metrics values. The CRATE processor loads and instantiates one or more synthetic device specifications and synthetic metrics specifications and executes the specified synthetic metrics processing on synthetic metrics engine (3050) in order to generate one or more synthetic metrics value(s). The first network management device stores the generated synthetic metrics values in a local data store (2810) or other specified location.

In some exemplary embodiments, synthetic device and synthetic metrics specifications are included with other network management device software at installation time. In addition, or alternatively, in some exemplary embodiments, synthetic device and synthetic metrics specifications are downloaded and added, or updated, later. Synthetic device and synthetic metrics specifications are downloaded by the first network management device from one or more sources. For example, in one exemplary implementation, the first network management device (2080) loads (or downloads from an external source) a CRATE dynamic application (2410*a*), which further comprises a synthetic device specification (3050*a*) and synthetic metrics specification (3100*a*) including synthetic metrics specification rules (3160*a*) from network data store (4300) or from network locations or data stores.

Network management devices provide synthetic device and synthetic metrics specifications to other network management devices directly and upload synthetic device and synthetic metric specifications to network data stores where they are accessible to other network management devices. For example, a second instance of a network management device (2081) provides CRATE dynamic application (2410*b*), including synthetic device specification (3050*b*), synthetic metrics specification (3100*b*), and synthetic metrics specification rules (3160*b*), to the first network management device (2080). In a first exemplary implementation, the second network management device (2081) stores CRATE dynamic application (2410*b*) in data store (2811) which is replicated to the first network management device (2080). In a second exemplary implementation, synthetic device and synthetic metrics specifications are exported from the second network management device in "normal" form and are manually moved to the first network management device, where they are imported by the first network management device. In a third exemplary implementation, the second network management device (2081) publishes synthetic device and synthetic metrics specifications directly to the first network management device (2080) or to network data store (4300), from which they are downloaded by the first network management device.

Figure 12:
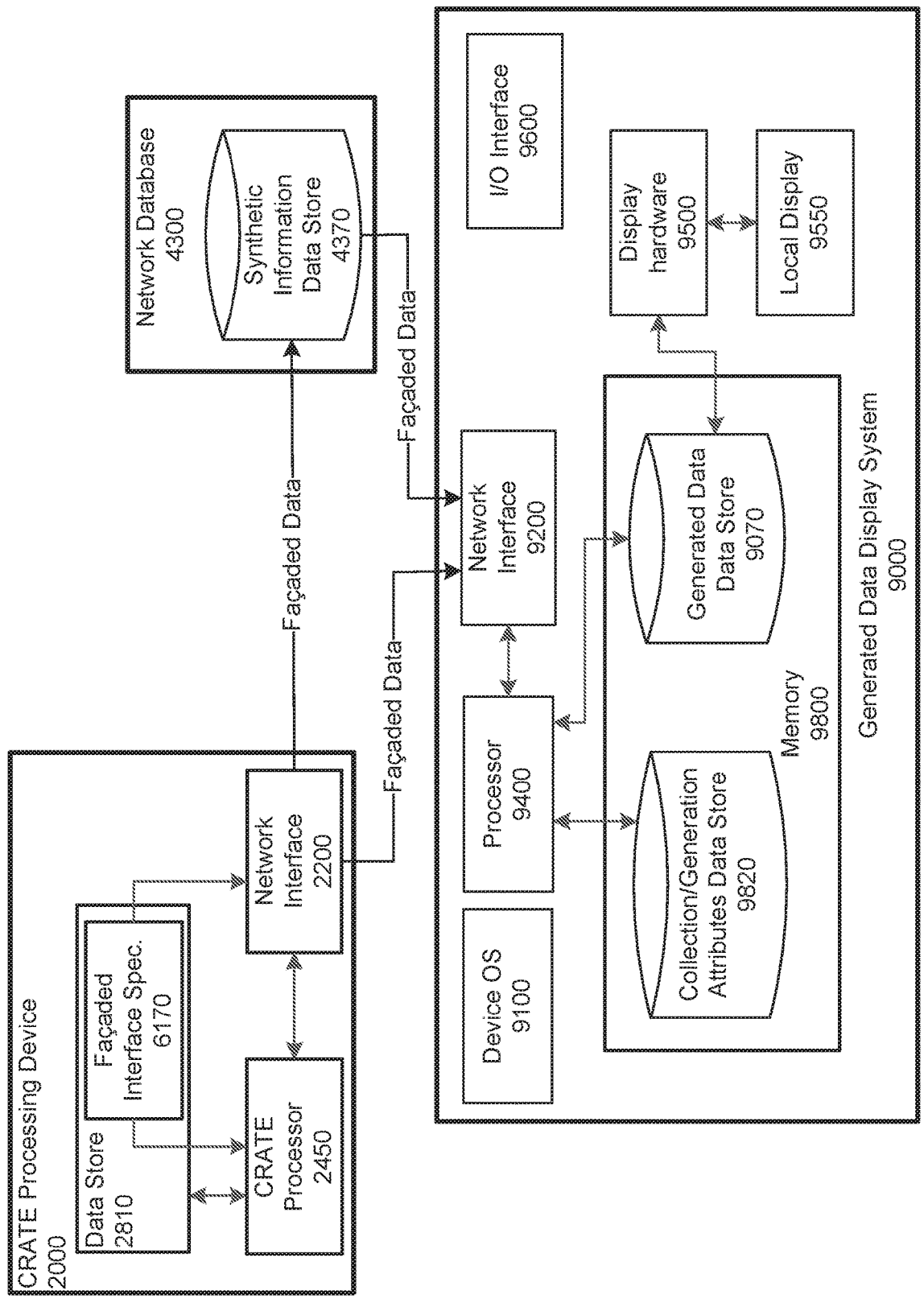
FIG. 12 depicts an exemplary synthetic metrics display system for publishing and displaying synthetic metrics values, in accordance with the illustrative technology herein.

5.3.4 Example Display of Synthetic Metrics Values by a Synthetic Metrics Display System Referring to FIG. 12, a generated data display system (9000) retrieves generated data from one more of a CRATE processing device, illustrated here as CRATE processing device (2000), or from a network data store (4300) that includes a data store (e.g. 4370). The generated data display system retrieves generated data from one or more alternative or additional CRATE processing devices including, referring to FIGS. 4, 8, and 9, from CRATE processor (2450), network management device (2080), or ML CRATE processor (3450). Generated data is represented as façaded data which is defined as generated data that has been selected, filtered, and/or formatted for presentation on, or communication from, a façaded interface.

The CRATE processing device includes CRATE processor (2450) in communication with a data store (2810). Referring to FIGS. 6 and 7, the data store includes one or more synthetic metrics specifications (6100) comprising one or more façaded interface specifications (6170). The CRATE processor is configured to generate synthetic metric values and network interface (2200) is configured as a façaded interface to publish the generated synthetic metrics as façaded data according to façaded interface specification (6170). Referring to FIG. 8, in another exemplary embodiment, one or more interfaces are configured to publish façaded data as a façaded interface according to a façaded interface specification.

The CRATE processing device publishes, via façaded network interface (2200), façaded data to one or more of generated data display system (9000) and data stores (e.g. 4300, 4370). The data store thus includes information published, for example by a "push" operation, to the data store from one or more CRATE processing devices.

Generated data display system (9000) is a network connectable device that is configured to ingest generated data as façaded data from one or more sources and to display the façaded data on one or more local displays. In an exemplary embodiment, the generated data display system is a network management device (e.g., NMD (2080)) or other component of a network management system.

The generated data display system includes a local display device (9550) and display hardware (9500) that controls the local display device. The local display device is a visual display that is operable to display information collected or generated by one or more CRATE processing devices, or combined collected data and generated data aggregated by one or more CRATE processing devices. Information collected by a CRATE processing device and displayed on the local display device includes actual collected information, e.g. collected metrics values, which the CRATE processing device formats for display on a façaded interface, in some embodiments in combination with other data types. Information generated by a CRATE processing device and displayed on the local display device includes generated data (including synthetic metrics values, for example, inferred and projected synthetic metric values) and PPI (e.g., enumeration of available and predicted-to-be available collected and generated data). Information collected and aggregated by a CRATE processing device and displayed on the local display device as aggregated-type synthetic metrics values that include a unitary data stream that includes historical, current, and projected metric values. The local display device also displays additional information, including synthetic device metadata (e.g., synthetic device ID, device type, or manufacturer), alerts, notifications, and feeds, and other text. Exemplary display devices include a monitor, for example an LED monitor or touchscreen monitor, a digital numerical display, and LED lights. In some exemplary embodiments, the local display device includes an integrated or separate audio device (not shown) that generates audible alerts or audio representations of synthetic metrics values.

The synthetic metrics display system includes a processor (9400) and associated memory (9800) and a device operating system (9100) that is implemented by the processor. Memory (9800) includes a data store (e.g. 9070) for storing generated data collected by the generated data display system and a collection/generation attributes data store (9820) for storing collection/generation attributes. The processor and display hardware are operably connected to the collection/generation attributes data store, to other data store(s), and to the network interface. Collection/generation attributes include specification of generated data that the synthetic metric display system is configured to collect and display and include for example, a collection schedule, display format (e.g., language, units, colors), and display schedule. In an embodiment, a user enters collection/generation attributes using I/O interface (9600). In another embodiment, the generated data display system receives collection/generation attributes from another network device through the network interface (9200).

The generated data display system (9000) includes a network interface (9200) that is operably connectable to network (1000) for communication between the generated data display system and other devices connected to the network and an input/output (I/O) interface (9600). Referring to FIGS. 2 and 12, the network interface (9200) is operably connectable, via network (1000), to one or more data stores (e.g. 4300, 4370) and to a network interface (2200) of a CRATE processing device. The data store contains generated data published to the data store by one or more additional CRATE processing devices, CRATE processors (2450), network management devices (2080), or ML CRATE processors (3450).

In a first exemplary operation, a generated data display system retrieves generated data as façaded data from a data store. The synthetic metrics display system establishes a network connection, via network interface (9200) and network (1000), in order to access the data store. Processor (9400) accesses the data store to identify characteristics of generated data, e.g., synthetic metrics types and synthetic metrics values, stored therein. The processor retrieves collection/generation attributes from the collection/generation data store (9820) and determines whether one or more of the synthetic metric types and values identified from the data store are associated with the collection/generation attributes. If so, the processor retrieves the associated synthetic metric types and values from a first data store and stores them in a data store (9070) of the generated data display system.

In a second exemplary operation, a generated data display system retrieves façaded data from a façaded interface of CRATE processing device (2000). Network interface (2200) is configured according to façaded interface specification (6170) to provide the façaded interface. The generated data display system establishes a network connection, via network interface (9200) and network (1000), with network interface (2200) to query generated data available from the façaded interface. Processor (9400) determines synthetic metrics types and synthetic metrics values that are available from the façaded interface. The processor retrieves collection/generation attributes from the collection/generation data store (9820) and determines whether one or more of the synthetic metric types and values available from the façaded interface are associated with the collection/generation attributes. If so, the processor retrieves the associated generated data from the façaded interface and stores them in a data store (9070) of the generated data display system.

The processor configures display hardware (9500) to retrieve generated data stored in a data store (9070) and to control local display (9550) to display the retrieved generated data. In an exemplary embodiment, the processor configures the display hardware according to a display format and display schedule specified in one or more collection/generation attributes.

5.4 Exemplary Operating Method

Figure 13:
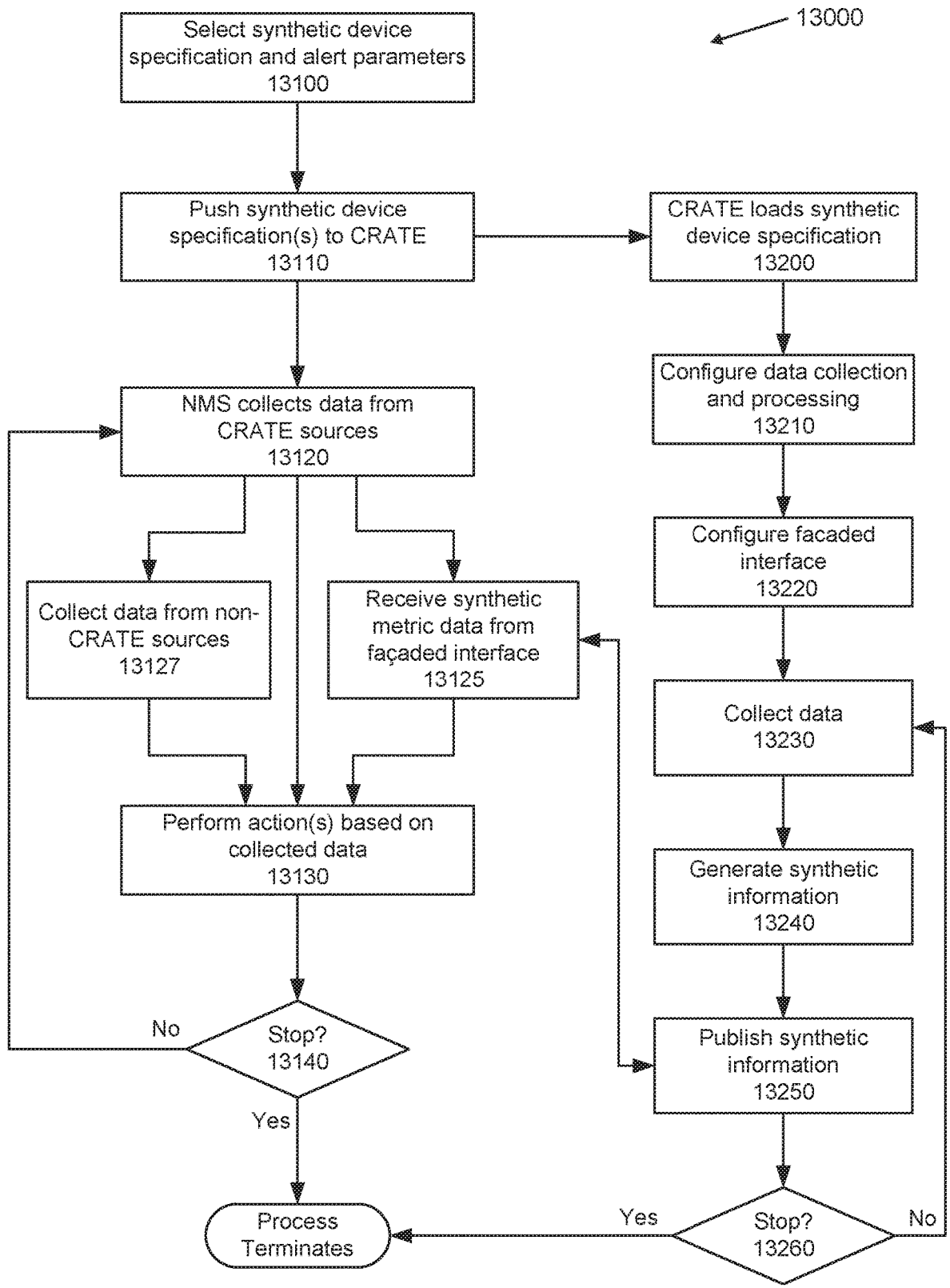
FIG. 13 depicts a flowchart illustrating an exemplary method for operating a CRATE processing device in accordance with the illustrative technology herein.

Referring to FIG. 13, a flow chart of an exemplary method (13000) for configuration, by a CRATE configuration entity, and operation of a CRATE processing device is provided, in accordance with aspects of the illustrative technology disclosed herein. In relation to operating method (13000), a CRATE processing device is any of a CRATE processor (2450), CRATE processing device (2000), a network management device (2080, 2081) that includes a CRATE processor, and a ML CRATE processor (3450). A CRATE configuration entity is defined as a person (who performs manual configuration), an NMS, NMS component, or a remote terminal such as a synthetic metrics display system (which performs automated external configuration), or a CRATE processing device (which performs internal automated configuration). In an exemplary embodiment, a CRATE configuration entity performs automated configuration by processing a current and planned target destination to determine one or more aspects, e.g., output language and units, of a façaded interface. CRATE configuration entities include network administrators, a CRATE processing device (2000), a same or different CRATE processor (2450), a CRATE-enabled NMD (2080, 2081), an NMD (2080) that does not include a CRATE processor, a ML CRATE processor (3450), a generated data display system (9000) and a machine-learning based network management system such as a self-organized network (SON) or cognitive network management system.

5.4.1 Selection of Synthetic Metrics Specification

At step (13100) a CRATE configuration entity selects, from synthetic specification data store (3090), a synthetic device specification that includes, or references, one or more synthetic metrics specifications, and (in some exemplary embodiments) alert parameters, for configuring a CRATE processor to obtain external information used as collected data, process the collected data to create and publish generated data to one or more publishing interfaces. A CRATE configuration entity determines that a need exists for additional generated data that is not available from an already configured CRATE processing device. The CRATE configuration entity selects one or more synthetic device specifications to configure a CRATE processing device to provide the required generated data.

At step (13110), the CRATE configuration entity makes the selected synthetic device specification(s) available to an unconfigured CRATE processing device, either by providing the synthetic device specification directly or by causing the unconfigured CRATE processing device to load the selected synthetic device specification(s) from an internal or external data store (e.g., from synthetic specification data store (3090) or network data store (4300) In another exemplary embodiment, a CRATE configuration entity stores a new synthetic device specification to an already configured CRATE processing device, which is then reconfigured according to the new synthetic device specification. In a still further embodiment, an already configured CRATE processing device is configured with a new synthetic device specification while continuing to process another, previously instantiated, synthetic device specification.

In an alternative embodiment, a CRATE processing device recognizes that one or more available data sources correspond to inputs of a particular synthetic device specification and selects the particular synthetic device specification to use to configure or reconfigure the CRATE processing device to process the one or more available data sources.

5.4.2 CRATE Processing Device Configuration
5.4.2.1 Data Collection and Synthetic Metric Generation Configuration At step (13200), configuration or reconfiguration of a CRATE processing device begins when the CRATE processing device loads, parses, and implements a synthetic device specification. The CRATE processing device receives a synthetic device specification (6050) from a CRATE configuration entity or retrieves a synthetic device specification from network data store (4300), synthetic specification data store (3090) or from data store (2810). The CRATE processing device instantiates the synthetic device specification and retrieves a data source/collection method specification (6150) and synthetic metrics specification (6100), comprising synthetic metrics specification rules (6160), from the synthetic device specification. In an alternative embodiment, the synthetic device specification does not include a synthetic metrics specification but instead references one or more synthetic metrics specifications. In this alternative embodiment, the CRATE processing device retrieves one or more synthetic metrics specifications from a data store, e.g., from synthetic specification data store (3090).

At step (13210), the CRATE processing device configures collection of collected data according to a data source/collection method specification of the synthetic device specification. The CRATE processing device determines one or more data sources from which to collect data for use in creating generated data. Exemplary data sources include a network device (e.g. switch (4510) or router (4520)) from which monitored data is collected via NMD-based or network collector plugins (2730) or remote collectors (3510), another NMD, non-network data sources, third party data sources (4200), and data stores (e.g. 4300, 3070) containing metric values (e.g. collected metric values, synthetic metric values, or historical collected and synthetic metric values) published to the data stores by the same or one or more additional CRATE processing devices.

After selecting the data sources, the CRATE processing device configures one or more interfaces for communication with the selected data sources. In some embodiments, a CRATE processing device configures plug ins (2730) on collector (2720), including instantiating new plugins as needed, corresponding to data collected directly by the CRATE processor.

The CRATE processing device determines collection schedules based on a synthetic device specification and configures a polling timing function to generate periodic polling alerts. In some embodiments, the CRATE processing device configures one or more additional or alternative collected data collection methods including configuring subscriptions to one or more feeds or alerting services. The CRATE processing device configures one or more storage locations (e.g. in data store (2810) or in temporary memory) for storage of data collected from data sources according to a data store specification (6055).

An exemplary CRATE processing device loads, from a synthetic metrics specification, one or more algorithms encoded therein for processing collected data to generate synthetic metric values. A machine learning (ML) CRATE processor (3450) loads one or more trained ML models from model store (5521) into a ML model execution module (5538).

5.4.2.2 Façaded Interface and Publishing Configuration

At step (13220), the CRATE processing device configures one or more façaded interfaces according to one or more façaded device information specifications (6173) that the CRATE processing device extracts from the synthetic device specification and façaded interface definitions ((6171-6172) and (6174-6177)) that the CRATE processing device extracts from the façaded interface specification (6170). Each façaded interface is represented as a type or class of simulated software or hardware device for publishing generated data. If the synthetic device specification includes a synthetic device-based façade, the CRATE processing device dynamically defines a publishing interface (2620) and corresponding dynamically defined interface (including any interface of the system) represent a virtualized synthetic hardware and/or software device and associates at least part of the generated data with the dynamically defined interface to configure a device-based façaded interface.

Figure 14:
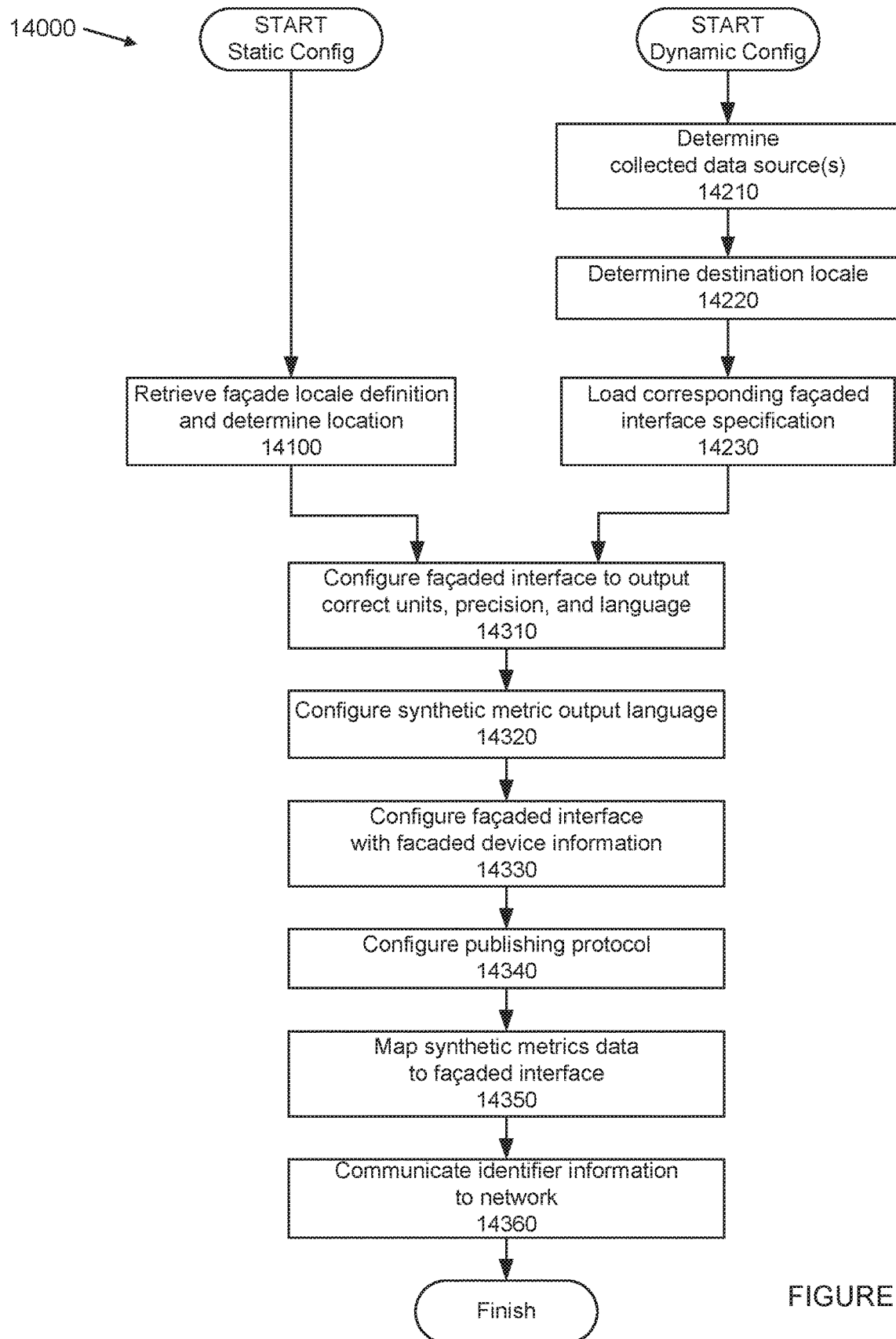
FIG. 14 depicts a flowchart illustrating an exemplary method for configuring a façaded interface of a CRATE processing device in accordance with the illustrative technology herein.

FIG. 14 is a detailed flow chart of an exemplary method (14000) for configuration, by a CRATE processing device, of aspects of a façaded interface as depicted in step (13220) of FIG. 13. A CRATE processing device retrieves a façaded device information specification (6173) from a synthetic device specification and façaded interface specification (6170) from a corresponding synthetic metrics specification retrieved or loaded in step (13200) of method (13000). The CRATE processing device determines, from the retrieved specifications, parameters for configured aspects of a façaded interface. Configured aspects of a façaded interface include one or more of façaded device information (e.g., device ID and type of a synthetic connected device presented by the interface), generated data types and values presented by the façaded interface, a publishing protocol used by the façaded interface to publish generated data, output language (e.g., English, Spanish, or Japanese) for alerts and feeds, output synthetic metric value units (e.g., Pascals (Pa), psi, atm, or torr), and output synthetic metric precision. Aspects of a façaded interface including output units and language are configured statically or dynamically.

At step (14100), when performing static configuration, a CRATE processing device retrieves a synthetic façade locale definition (6175) from a façaded interface specification and uses the synthetic façade locale definition to determine a location for which generated data presented by the façaded interface is to be formatted. The CRATE processing device retrieves, from the publication specification, a definition of synthetic metric units (6176) corresponding to the locale and unit precision of synthetic metrics values to be output by a configured façaded interface. The CRATE processing device retrieves, from the publication specification, a definition of a language (6177) corresponding to the locale to be used when presenting generated data by a configured façaded interface. For example, the CRATE processing device determines that a definition of synthetic metric units corresponding to the locale of a particular façaded interface requires that the particular façaded interface display synthetic metric values in imperial units and that a definition of a language associated with the locale requires the particular façaded interface to display English language text. The CRATE processing device continues to step (14310) to configure the façaded interface using the determined output units, precision, and language.

In an alternative embodiment a CRATE processing device dynamically configures a façaded interface by first determining one or more sources of collected data at step (14210) and then, at step (41220), determining a locale of a destination of generated data based on the location of a CRATE configuration entity or of a locale of a destination specified by a CRATE configuration entity. In a first exemplary embodiment, a CRATE processing device determines a locale of a destination by processing a received communication to extract a source country code, or other location-identifying information, encoded in the received communication. In a second exemplary embodiment, a CRATE processing device determines a source IP address of a communication from a CRATE configuration entity and determines a locale corresponding to the CRATE configuration entity based on the source IP address; for example by querying a DNS service or other service that provides location information corresponding to IP addresses or resolved FQDNs associated with IP addresses.

At step (14230), the CRATE processing device selects and loads, from a data store (e.g. 3090 or 4300) a façaded interface specification (6170) corresponding to the locale determined in step (14220). The CRATE processing device parses, from the selected and loaded façaded interface specification, a definition of synthetic metric units (6176) and a definition of language (6177) associated with the locale determined in step (14220). The CRATE processing device uses the definitions of synthetic metric units and language to select generated data language and/or synthetic metric values output units and precision corresponding to the destination location determined in step (14220). In an embodiment, the CRATE processing device determines that a first destination is located in France. The CRATE processing device determines, from definitions of synthetic metric units and language corresponding to a locale of France, that a façaded interface corresponding to the first destination should display text in French and should display synthetic metric values using SI units, for example pressure should be displayed in Pa. The CRATE processing device determines that a second destination is located in the United Kingdom and determines, from definitions of synthetic metric units and language corresponding to a locale of the United Kingdom, that a façaded interface corresponding to the second destination should display text in English and pressure in psi.

At step (14310), the CRATE processing device configures the façaded interface to output synthetic metrics values with units and precision selected in either of steps (14100) or (14230). At step (14320), the CRATE processing device configures the façaded interface to display generated data output using the language selected in either of steps (14100) or (14230). In a first exemplary embodiment, the CRATE processing device configures one or more algorithms used by a CRATE processor to generate synthetic metric values with units and precision corresponding to the units and precision of the façaded interface. In a second exemplary embodiment, the CRATE processing device configures a façaded interface, for example a publish interface (2620), to convert synthetic metric values generated by a CRATE processor to synthetic metric values having units and precision of the façaded interface. In some exemplary embodiments the CRATE processing device retrieves one or more synthetic metric conversion formulas from a definition of synthetic metric units (6176) and configures the CRATE processor or publish interface with the one or more conversion formulas. In a similar manner, the CRATE processing device configures a CRATE processor to output generated data that includes text in the language specified for a façaded interface or configures the façaded interface to convert text received, by the façaded interface from a CRATE processor, to the language specified for a façaded interface. In an exemplary embodiment, the CRATE processor retrieves, from a definition of a language (6177), a specification of a language translation service, for example an identification of a language translation API, and configures the CRATE processor or façaded interface with the specification of the language translation service.

At step (14330), the CRATE processing device retrieves, from the synthetic device specification (6050), information encoded in façaded device information specification (6173) and in a synthetic metrics specification (6100) and configures a façaded interface with the information. The façaded device information identifies a device that is presented as a virtualized device by the façaded interface. Exemplary façaded device information includes a device type (e.g., network router, mail server, or temperature sensor), a device manufacturer, device identifier (e.g., MAC address, UUID, serial number), and output data available from the façaded device (i.e. generated data that an external device retrieves by querying the façaded interface or by subscribing to a feed published by the façaded interface).

At step (14340), the CRATE processing device retrieves, from a façaded interface specification (6170), a façaded interface network protocol definition (6172) and configures the façaded interface with a publishing protocol specified by the network protocol definition. In an exemplary embodiment, the CRATE processing device configures the façaded interface to reference a well-known protocol specified by the network protocol definition or to reference a dynamic application corresponding to the specified publishing protocol. If the CRATE processing device configures the façaded interface to reference an XML-based API, the CRATE processing device retrieves a DTD/XML schema referenced by the façaded interface network protocol definition and further configures the façaded interface with the DTD/XML schema. In an embodiment, the CRATE processing device associates identifier information corresponding to a façaded interface or to a synthetic device represented as a façaded interface, e.g. device ID, network ID, and location, with the publishing interface. In one embodiment, the CRATE processing device associates a façaded interface and associated synthetic device with an identifier that includes Application ID+protocol (TCP/UDP)+port number and maps the identifier to a particular publishing interface.

At step (14350), the CRATE processing device configures the mapping of generated data, e.g., metric values, to presentation aspects of a façaded interface. In an exemplary embodiment, the CRATE processing device maps a source of particular generated data, e.g. a CRATE processor that creates the particular generated data, to a particular publish interface (2620) by adding, to a template/interface binding table, an entry that includes a templateID corresponding to the an instantiated synthetic metrics specification corresponding to the particular generated data and an interfaceID corresponding to the particular publish interface.

At step (14360), the CRATE processing device communicates, or otherwise makes available, to other connected devices, identifier information of façaded interfaces, corresponding façaded device information including data available from the façaded interfaces, publishing interfaces, network protocols, and, in some embodiments, PPI that identifies data predicted to be, but not yet, available from one or more façaded interfaces. In an embodiment, the CRATE processing device publishes this information to a network routing table or DNS service.

In some embodiments, the CRATE processing device configures a façaded interface to "push" synthetic metrics data to other connected devices including NMDs and remote collectors. If the synthetic metrics specification includes a feed-based façade, the CRATE processing device configures a feed-based façaded interface to publish a generated data feed generated by the CRATE processing device. In an exemplary embodiment, the CRATE processing device sets up a feed-based façaded interface that is represented as a pseudo-SNMP agent or synthetic RSS publish interface to publish corresponding alerts, events, and notifications. The CRATE processing device configures a publishing schedule for pseudo-SNMP and synthetic RSS feeds and in some embodiments configures subscription interfaces to allow other connected devices to subscribe to the synthetic SNMP and RSS feeds.

The CRATE processing device processes one or more data store specifications (6055) to configure storage locations for generated data, and in some embodiments collected data, in one or more data stores (e.g. 2810, 3070).

Returning to FIG. 13, upon completion of step (13220), a CRATE processing device is configured for collection of collected data and for generation and publication of generated data.

5.4.3 Synthetic Metric Data Creation and Publishing 5.4.3.1 Collection of Collected Data Continuing with the process flow of FIG. 13, the configured CRATE processing device begins an iterative process (steps (13230) through (13260)) that includes collecting collected data, creating generated data, and publishing the generated data.

At step (13230), the CRATE processing device begins collecting data including, for example, "real time" monitored data collected directly by the CRATE processing device or by a collection architecture associated with the CRATE processing device, collected metric data or synthetic metric data generated by a different CRATE processing device and collected from the different CRATE processing device or from a data store, and historical data collected from a data store. The CRATE processing device establishes a communication session with each data source via a configured interface. The CRATE processing device causes each collector plug-in corresponding to a data source to begin collecting data from the data source, and initiates any required collection timing function.

The CRATE processing device collects data from each data source according to a collection schedule specified by the synthetic metrics specification. Collection schedules include: periodic collection, at intervals based on one or more polling timing functions; periodic collection when a data source "pushes" data to a collector, or communicates an alert, event, or notification; continuous collection from sources that include continuous feeds; and single instance collection. The CRATE processing device uses single instance collection for collected data that is not likely to change, for example collected data that enumerates source maximum memory or processing capacity or a stationary data source location or elevation.

In some embodiments, the CRATE processing device begins listening for alerts, events, and notifications on one or more feeds. In an exemplary embodiment the CRATE processing device subscribes to and monitors one or more information feeds, e.g., one or more RSS feeds.

In an embodiment, the CRATE processing device queries one or more data stores, for example network data store (4300) or third party data source (4200), for collected data, e.g., historical monitored metrics data or historical synthetic metrics, as specified by the synthetic metrics specification.

An exemplary CRATE processing device is configured to collect and process collected data obtained from one or more sources including sources that provide data having differing time precision or time intervals between data points, sources that provide data having differing metric value units or metric value precision, and combinations of sources that provide data having combinations of differing time and value precisions and units. In an exemplary embodiment, the CRATE processing device stores collected data in data store (2810).

5.4.3.2 Generated data Creation

At step (13240), the CRATE processing device creates generated data using the collected data.

The CRATE processing device processes the collected data obtained at step (13230) according to one or more synthetic metrics specification rules (6160) included in the synthetic metrics specification. In an embodiment, the CRATE processing device uses one or more data processing algorithms specified or included in a synthetic metrics specification to create generated data. A ML CRATE processor (3450) uses one or more trained ML models to create generated data.

In a first exemplary embodiment, the CRATE processing device creates synthetic metric values using data collected from two or more sources that report data with differing time precision. The CRATE processing device uses synthetic specification rules (6160) included in a synthetic metrics specification to normalize disparate collected data reporting time intervals and reporting time precision. The CRATE processing device combines the normalized collected data to generate synthetic metric values with a unified time precision. The synthetic metric values represent a type of metric that is the same as collected data, for example the synthetic metric values represent an average vCPU usage generated by normalizing and aggregating collected metric values from two or more vCPU reporting sources. Or the synthetic metric values represent a different type of metric, for example an inferred physical CPU usage generated by the CRATE processor based on collected metric values.

In a second exemplary embodiment, the CRATE processing device creates synthetic metric values using collected data from two or more sources that report collected metric values having differing value precision. The CRATE processing device uses synthetic specification rules (6160) to normalize disparate collected data reporting value units and reporting value precision. The CRATE processing device combines the normalized collected data to generate synthetic metric values, of the same or a different type than collected metric values, with a unified value precision.

In a third exemplary embodiment, the CRATE processing device creates synthetic metric values using collected data from input sources that report data with differing time and/or value precision. The CRATE processing device normalizes the collected data to a unified time and value precision and uses the normalized collected data to generate synthetic metric data. In an embodiment, the CRATE processing device normalizes network traffic collected data from one or more network switches and/or routers and uses the normalized collected data to create generated data representing network throughput.

In a fourth exemplary embodiment, the CRATE processing device obtains collected data from one or more sources and processes the collected data to generate a computed metric value. The CRATE processor compares the computed metric value to one or more permitted values encoded in a synthetic metrics specification and creates a generated data output based on the comparison. In an alternative embodiment the CRATE processing device obtains a threshold value from a source as collected data. For example, the CRATE processing device retrieves a total CPU capacity of a server from a collector plugin that collects data from the server.

In a particular exemplary embodiment, the CRATE processing device compares the computed metric value to a threshold value and creates a first synthetic metric value (e.g., "1") if the computed metric value is greater than the threshold value. The CRATE processing device creates a second synthetic metric value (e.g., "0") if the computed metric value is less than the threshold value.

In another particular exemplary embodiment the CRATE processing device determines a computed metric value representing a current usage of a resource, for example CPU usage or available input power, and compares the current usage to a threshold value representing total capacity of the resource to generate a synthetic metric value representing percent current usage of total capacity; for example 50% of CPU capacity or 85% of available power.

In a fifth exemplary embodiment, the CRATE processing device compares a computed metric to a threshold, retrieved from a synthetic metrics specification or from a data source, and generates an alert or notification based on the comparison. In an exemplary embodiment, the CRATE processor creates a computed metric value representing current CPU usage of a computing cluster, compares the computed metric value to a value representing total CPU capacity, and generates an alert if current CPU usage is greater than threshold value, for example greater than 80% of total capacity.

In a sixth exemplary embodiment, the CRATE processing device aggregates collected data of two or more data types or collected data received from two or more data sources into a unified stream of generated data. In a particular exemplary embodiment the CRATE processing device creates aggregated data that includes historical collected metrics values retrieved from a data store, monitored metrics values collected by the CRATE processing device, and projected data metrics values generated by the CRATE processing device.

In a seventh exemplary embodiment, the CRATE processing device creates synthetic metric values that include replacement values for missing collected or generated data, for example replacement values for monitored metric values that were predicted to be available in PPI but that the CRATE processing device is unable to collect or other collected metric values that the CRATE processing device is unable to collect or generate, e.g. due to a loss of a connection with a data source or a failure of a dynamic application to successfully collect or process data. In some exemplary embodiments, the CRATE processing device implements an inferred value derivation rule (6165) to generate estimated replacement values based on collected data from an indirect source. In other exemplary embodiments, the CRATE processing device uses a combination rule (6164) to generate interpolated replacement values or replacement values that comprise one or more of a ratio, weighted average, or best fit. In still further embodiments, the CRATE processing device creates projected replacement values using trained ML models or dynamic applications that implement trained ML models specified by one or more machine learning rules (6199) or simply replaces missing collected or synthetic metric values with historical metric values that were collected under similar conditions or circumstances, for example an average temperature for a particular date and time based on regional historical climatology-based temperature values.

5.4.3.3 Generated data and Prospective Publishing Information Publishing

At step (13250), the CRATE processing device publishes the generated data. Exemplary generated data includes synthetic metric values as well as alerts, events, and notifications generated by a CRATE processing device.

The CRATE processing device publishes generated data according to a synthetic metrics reporting/update frequency specification (6140) and façaded interface specification (6170). The CRATE processing device initiates a publishing timing function and publishes one or more types of generated data. The CRATE processing device publishes the generated data according to one or more publishing schedules specified by one or more synthetic metrics specifications. Exemplary publishing schedules include: publish periodically at intervals measured by the publishing timing function; publish continuously as generated data is generated; publish periodically when a threshold amount of generated data has been generated; publish when generated data including an alert, notification, or event is generated. The CRATE processing device publishes each generated synthetic metric value, alert, notification, or event to a corresponding dynamically defined interface, thereby presenting a façaded interface. To implement the publishing schedule, the CRATE processor configures a publishing timing function to communicate a publishing alert the synthetic metric engine when a publishing interval has elapsed. When the synthetic metrics engine receives an alert from the publishing timing function, it publishes the most recently calculated and/or collected metric values.

In some embodiments, a CRATE processing device saves some or all generated data to one or more data stores (e.g., 2810, 4300), where it is accessible to other NMS components. The CRATE processing device labels the saved generated data with an identifier of a corresponding façade interface, synthetic device, synthetic feed, and/or publishing interface.

The CRATE processing device continues to obtain collected data, create generated data, and publish the generated data until it is interrupted at step (13260). The CRATE processing device makes a stop decision if it receives a new synthetic device specification, in which case it returns to step (13200) to begin re-configuration using the new specification. In an alternative exemplary embodiment, the CRATE processing device continues processing an already instantiated synthetic device specification and initiates a new instance of method (13000) to process the new synthetic device specification. The CRATE processing device makes a stop decision upon receiving a termination communication from a CRATE configuration entity or other NMS device, based on collection and reporting schedule, or when collected data becomes unavailable from one or more sources, for example when the CRATE processing device has not been able to collect data from one or more sources for a threshold amount of time. The CRATE processing device makes a stop decision if the generated data it is producing is no longer needed (e.g., if the CRATE processing device receives a notification that a monitoring or reporting task that needed the CRATE data is no longer being performed).

5.4.4 Generated Data Data Product Consumption by NMS

Continuing with FIG. 13, a component of a network management system (NMS) (a NMS entity) and other non-NMS entities including, for example, generated data display system (9000), ingest, process, and use generated data received from a first CRATE processing device, as illustrated in process steps (13120) through (13140). In some embodiments, process steps (13120) through (13140) are performed asynchronously with regard to CRATE process device process steps (13200) through (13260).

At step (13120), an NMS entity collects data from a processing device, including one or more of a CRATE processing device (2000), a CRATE processor (2450), a CRATE-enabled NMD (2080, 2081), a non-CRATE enabled NMD, a ML CRATE processor (3450), and a machine-learning based network management system.

In some embodiments, at step (13125), an NMS entity receives generated data from a facade interface (in steps 13210-13260, described above).

In some embodiments, at step (13127) the NMS entity receives collected data from one or more additional data sources including for example, one or more of another CRATE-enabled or non-CRATE NMD, a collector plugin, collectors, an outside data source, and a data store that includes collected or synthetic metric data.

At step (13130) the NMS entity performs one or more actions based on generated data alone or in combination with collected data from additional data sources. A network management device separate from the CRATE processing device displays synthetic metric values or other generated data received from the CRATE processing device on a publishing interface of the NMD. An NMS entity compares a synthetic metric value received from the CRATE processing device to a threshold value or to a metric value collected from an additional data source and generates an alert based on the comparison. In an exemplary embodiment the NMS entity receives a synthetic temperature metric value from a CRATE processing device. The synthetic temperature metric represents an average of temperature measurement values collected by the CRATE processing device from multiple temperature sensors in a computing data center. The NMS entity generates an alert if the synthetic temperature metric value is greater than a threshold value. In another exemplary embodiment, the NMS entity compares the synthetic metric temperature value to an outside temperature value collected from an outside temperature sensor and generates an alert based on the comparison.

At step (13140) the NMS entity determines if a stop condition has been reached and, if not, returns to step (13120) to continue collecting data. Otherwise, the process terminates. In an embodiment the NMS entity terminates the process if it fails to receive data from the CRATE processing device and/or from one or more additional data sources. The NMS entity terminates an instance of method (13000) if it determines that a configured CRATE processing device should be re-configured with a new synthetic metrics specification, in which case the NMS entity initiates a new instance of the method at step (13100).

5.5 Exemplary Implementations of Synthetic Metrics

FIGS. 15, 16, 17, and 18 illustrate information flows in exemplary, illustrative, implementations of synthetic metrics specification processing by a CRATE processor (2450, 3450) component of a network management device (2080).

5.5.1 Direct Source

Figure 15:
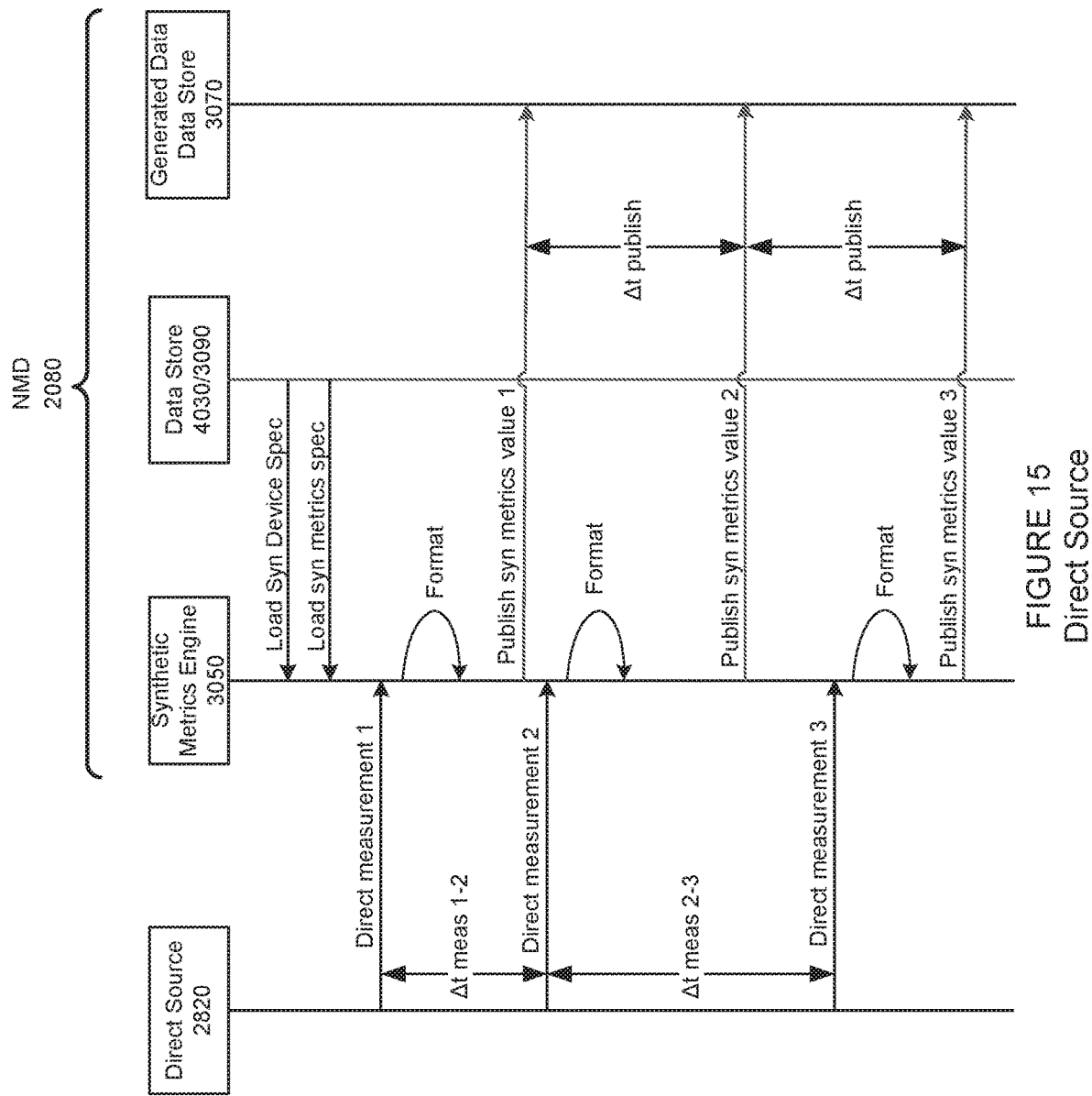
FIG. 15 depicts an exemplary synthetic metrics specification process flow including a direct source, in accordance with the illustrative technology herein.

FIG. 15 illustrates exemplary data flows and processing steps corresponding to a CRATE processor's instantiating and executing a synthetic device specification that specifies generating and reporting synthetic metric values based on direct source monitored metric values.

The CRATE processor instantiates the synthetic device specification. The CRATE processor loads the synthetic device specification and corresponding synthetic metrics specification(s) from the network data store (4300) and/or synthetic specification data store (3090), configures collection of monitored metric data, processing of collected data to produce synthetic metrics values, and storage and publishing of the synthetic metrics values.

The CRATE processor reads the synthetic device specification and determines that the synthetic metrics data source/collection methods specification (6150) specifies a direct source (2820). For example, the synthetic device specification specifies that the CRATE processor should retrieve collected data from a SNMP collector plug. More specifically, the synthetic device specification specifies, as direct source collected data, CPU usage information retrieved from an SNMP agent running on a particular network appliance (e.g., running on a particular switch, router, or virtual hosting system host device). In a particular example, the synthetic device specification specifies that collected data should be retrieved from an SNMP agent that measures CPU usage of the host device of virtual hosting system (1400).

The CRATE processor configures a collection interface to communicate with the data source, and establishes a polling schedule to periodically receive monitored metrics data from the data source. The CRATE processor configures a polling timing function that alerts the synthetic metrics engine to poll the direct source for monitored metrics values when a configured polling interval has elapsed.

The CRATE processor reads the synthetic metrics specification to determine how monitored metrics values are to be processed in order to produce synthetic metrics values. For example, the CRATE processor determines that one or more scaling and formatting rules (6162) specify that monitored metrics values should be transformed from a collected metrics values format to a particular synthetic metric values format. In a particular example, a scaling and formatting rule specifies that CPU usage data should be output as %/hour.

The CRATE processor determines, based on a synthetic metrics reporting/update frequency specification (6140) and façaded interface specification (6170), a publishing schedule for synthetic metrics values, and configures an output data interface (i.e. publish interface (2620), or other interface of the system), for publishing synthetic metrics values to an external data store and/or as a façaded interface.

The CRATE processor configures the publishing schedule as specified by the synthetic metrics reporting/update frequency specification, e.g. at repeating publishing intervals.

The CRATE processor executes the synthetic device specification by initiating polling of the direct source and initiating operation of the polling timing function and the publishing timing function. When the CRATE processor receives an alert from the polling timing function, it polls the direct source for monitored metrics values. The CRATE processor formats received monitored metrics values in accordance with the scaling and formatting rules to generate synthetic metrics values, and publishes the synthetic metrics values according to the publishing schedule to a location or interface specified by the façaded interface specification. In some exemplary implementations, the CRATE processor publishes synthetic metrics values directly to a publishing interface instead of or in addition to publishing to a data store.

5.5.2 Indirect Source

Figure 16:
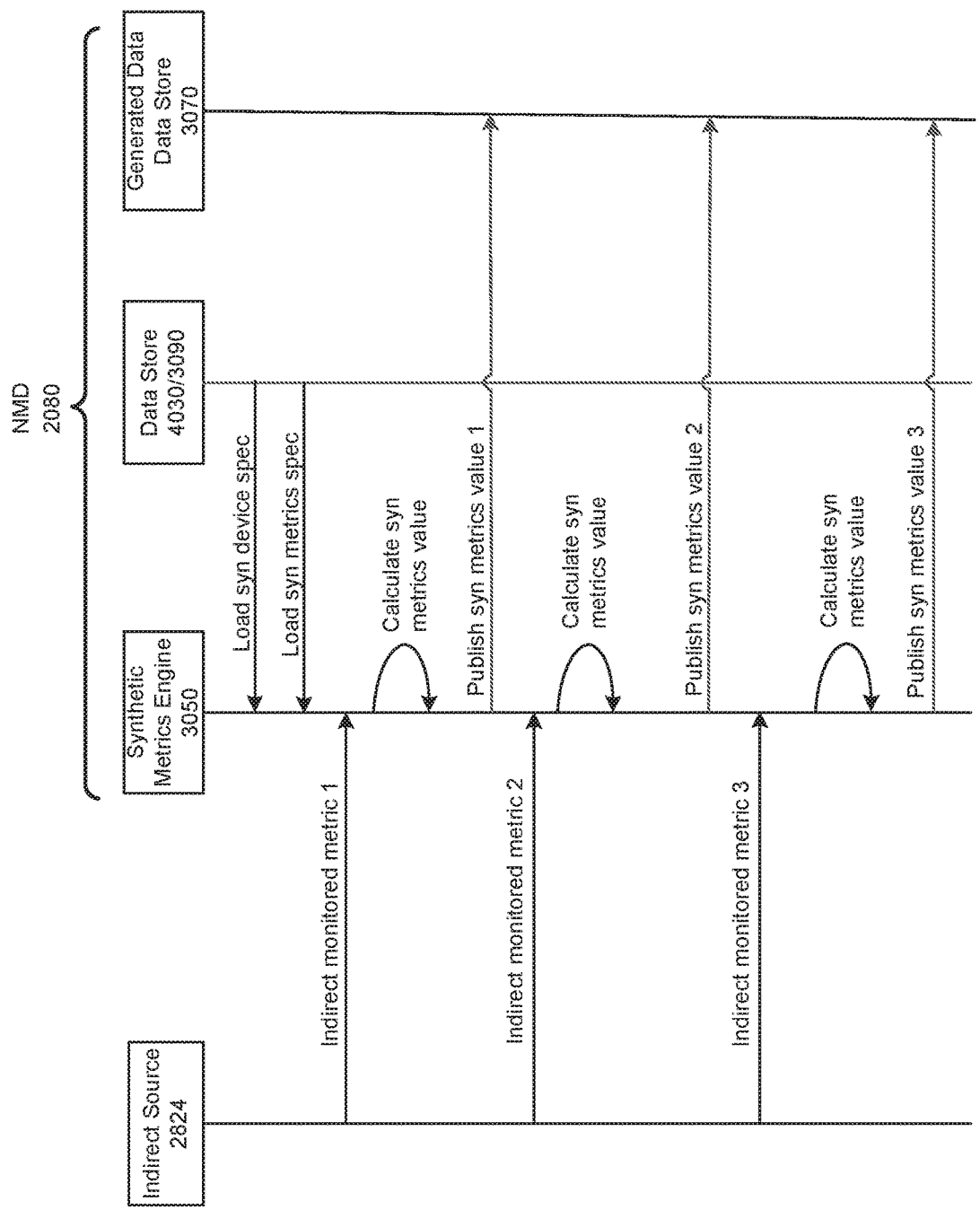
FIG. 16 depicts an exemplary synthetic metrics specification process flow including an indirect source, in accordance with the illustrative technology herein.

FIG. 16 depicts exemplary data and processing flows related to instantiation and execution of a synthetic device specification that includes a specification that at least one synthetic metric value is generated using a synthetic metrics specification to process data collected from an indirect source. The synthetic device specification specifies an indirect source as a data source for generating synthetic metric values to be reported as metrics generated by the synthetic device.

In a first exemplary embodiment, the synthetic device specification includes a synthetic metrics specification and the CRATE processor instantiates the synthetic metrics specification. In a second exemplary embodiment, the synthetic device specification references a synthetic metrics specification that the CRATE processor loads separately from the synthetic device specification data store (3090). The synthetic device specification further specifies that synthetic metrics values generated by execution of the synthetic metrics specification should be reported as metrics generated by the synthetic device, e.g., as usage metrics of a synthetic device that is a virtualized representation of a hypervisor CPU. As in the process depicted in FIG. 15, the CRATE processor instantiates the synthetic device and synthetic metrics specifications. The CRATE processor loads the specifications from the synthetic specification data store (3090) and determines a data source for generating synthetic metrics values. In the exemplary implementation depicted in FIG. 16, the synthetic device data source/collection method specification specifies that an indirect source (2824) provides collected data. For example, in one exemplary implementation, the synthetic metrics data source/collection method specification specifies that hypervisor CPU usage data is used as indirect source monitored metrics values for generating virtual CPU (vCPU) usage synthetic metrics values for one or more virtual machines. In a particular example, FIG. 1 depicts the components of a virtual hosting system (1400), to be used with an example non-limiting CRATE processor. The synthetic metrics specification specifies that vCPU usage by virtual machine (1430a) is calculated based on hypervisor (1420) usage of host CPU (1410). The CRATE processor determines a data source for the hypervisor's host CPU usage, for example a collector plug-in that ingests and processes usage reported by a WMI component of a Windows operating system operating on a virtual hosting system (1400) host machine.

The CRATE processor configures a collection interface to communicate with the indirect source (2824) as described herein, and configures an output data interface to publish synthetic metrics values generated by the CRATE processor as described herein. The CRATE processor configures a polling schedule and a publishing schedule by configuring a polling timing function and a publishing timing function based on the synthetic metrics specification.

The CRATE processor executes the synthetic device specification by initiating the polling and publishing timing functions and begins receiving monitored metrics values from the indirect source. When the CRATE processor receives an alert from the polling timing function, it polls the indirect source for monitored metrics values. The CRATE processor reads the synthetic metrics specification for an inferred synthetic metrics specification rule (6165) that specifies how a synthetic metrics value is inferred from one or more indirect monitored metrics value(s). For example, the inferred synthetic metrics specification rule specifies a relationship between hypervisor CPU usage and VM vCPU usage. The CRATE processor uses the inferred synthetic metrics rule to calculate a synthetic metrics value from each indirect monitored metrics value received. In an exemplary implementation, the CRATE processor formats the inferred synthetic metrics value according to a scaling and formatting rule (6162). The CRATE processor publishes inferred synthetic metrics values according to a publishing schedule as specified in the synthetic metrics' façaded interface specification.

5.5.3 Indirect Source with Blending

Figure 17:
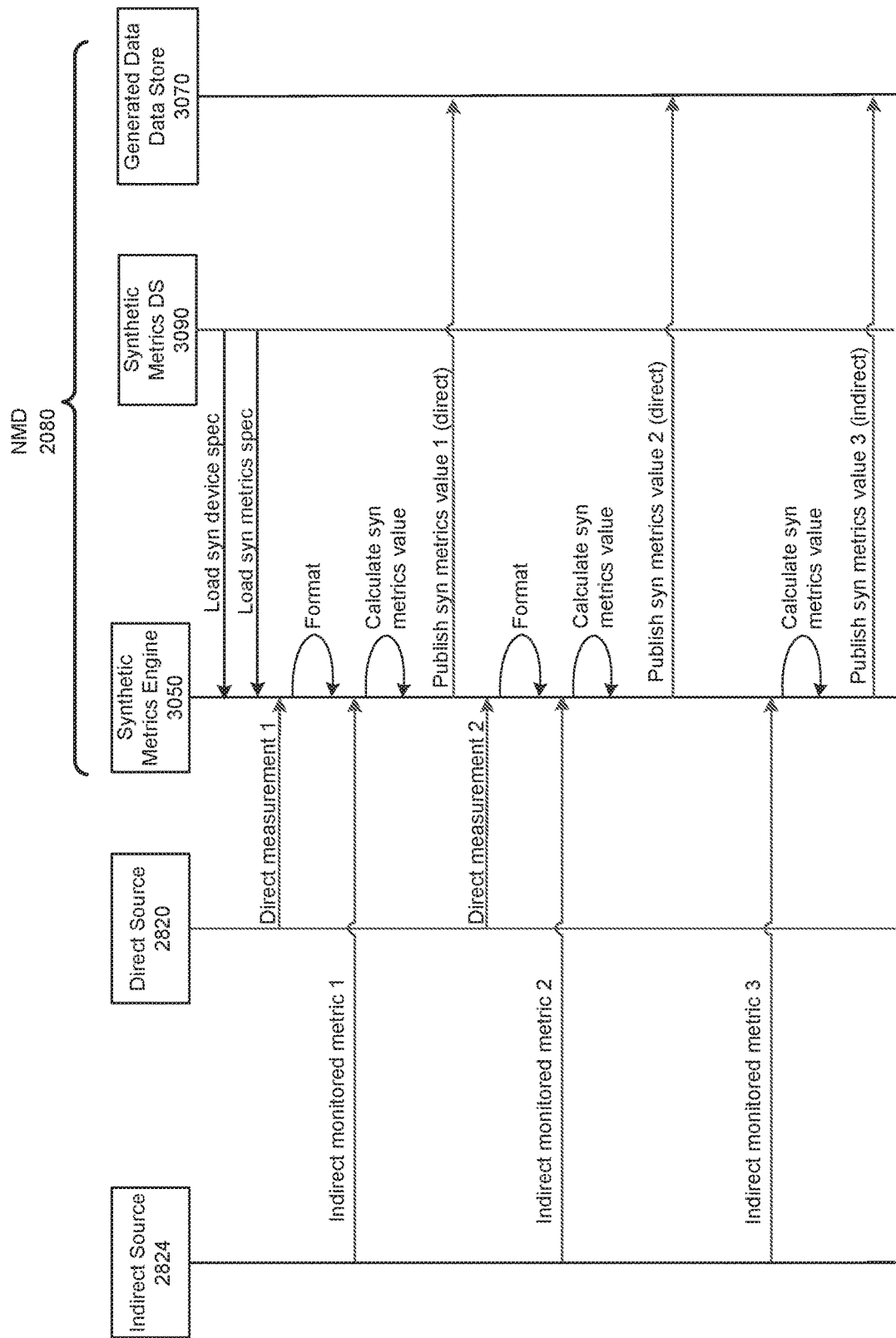
FIG. 17 depicts an exemplary synthetic metrics specification process flow including a direct and an indirect source with blending, in accordance with the illustrative technology herein.

FIG. 17 depicts exemplary data and processing flows for instantiation and execution of a synthetic device specification that specifies generation of synthetic metrics values using a synthetic device specification that includes a blended synthetic metrics specification. The synthetic device specification specifies one or more data sources and the blended synthetic metrics specification specifies blending of monitored metrics values from both sources.

The CRATE processor initiates instantiation of the synthetic device specification by loading the synthetic device specification and corresponding synthetic metrics specification from the synthetic specification data store and/or network data store. The CRATE processor determines data sources from the synthetic metrics data source/collection method specification and configures collection of data from those sources. For example, in one exemplary implementation the CRATE processor configures collection of direct measurement monitored metrics data for virtual machine vCPU usage from a WMI component of Windows OS operating on a VM or from a SNMP agent operating on the VM. In a particular example, referring to FIG. 1, a direct data source (2820) is a WMI collector plug-in that processes data received from a WMI component of virtual machine (1430a). The CRATE processor configures collection of indirect measurement monitored metrics data from a source that measures hypervisor host machine CPU usage. In a particular example, indirect data source (2024) is an SNMP collector plug-in that processes data received from an SNMP agent operating on the host machine of virtual hosting system (1400). The CRATE processor configures connection interface(s) to communicate with data source(s). The CRATE processor configures a collection schedule for the indirect and direct data sources. The CRATE processor configures a polling timing function to generate an indirect source polling alert when an indirect source polling interval has elapsed. The CRATE processor configures the (same or different) timing function to generate a direct source polling alert when a direct source polling interval has elapsed.

The CRATE processor configures an output data interface to publish synthetic metrics values generated by the CRATE processing as described herein. The CRATE processor configures a publishing schedule as specified by the reporting update/frequency specification of the synthetic metrics specification.

The CRATE processor initiates execution of the synthetic metrics specification by initiating the polling and publishing timing functions and beginning collection of monitored metrics data from direct and indirect data sources. When the synthetic metrics engine receives a direct source polling alert it polls the direct source for monitored metrics values and when it receives an indirect source polling alter it polls the indirect source for monitored metrics values.

The CRATE processor reads the synthetic metrics specification selection rules (6161) and combination rules (6164) that specify selection or combination of monitored metrics values from direct and indirect data sources for generating synthetic metrics values. In one exemplary implementation, an exemplary selection rule specifies that a monitored metrics value from a direct source should be reported as a synthetic metrics value if the direct source data is available. The exemplary selection rule further specifies that a synthetic metrics value that is inferred from monitored metrics values from an indirect source should only be reported if monitored metrics values from a direct source are not available. In a particular example, a selection rule specifies that direct vCPU usage monitored metrics values reported by a WMI component of a VM OS should be published as synthetic metrics values unless the direct vCPU monitored metrics values are not available. The selection rule further specifies that if a direct vCPU usage monitored metrics value is not available, and an indirect monitored metrics value that is newer than the last published vCPU synthetic metrics value is available, that a value inferred from a hypervisor CPU usage monitored metrics value should be published.

The CRATE processor uses a scaling and formatting rule (6162) to process collected data; for example, to convert vCPU usage from %/minute to %/hour. The CRATE processor uses an inferred value derivation rule (6165) to infer synthetic metrics values from indirect monitored metrics values, for example to infer vCPU usage values from hypervisor host system CPU usage. The CRATE processor creates metric values related to inferred vCPU usage in units specified by the scaling and formatting rule.

The CRATE processor publishes synthetic metrics values as metrics generated by the synthetic device upon each receipt of a publishing alert from the publishing timing function. Upon receipt of an alert, the CRATE processor determines the synthetic metrics values that are available to publish. In the illustrated data flow, at a first and a second receipt of a publishing alert, the CRATE processor determines that a synthetic metric value from a direct source monitored metrics value is available and publishes the direct-source monitored metrics value as synthetic metrics value 1 and synthetic metrics value 2. Upon receipt of a third publishing alert, the CRATE processor determines that there is no recent direct monitored metrics value available to publish as synthetic metrics value 3. The CRATE processor instead publishes, as synthetic metrics value 3, a synthetic metrics value inferred from an indirect monitored value.

5.5.4 Indirect Source with Machine Learning

Figure 18:
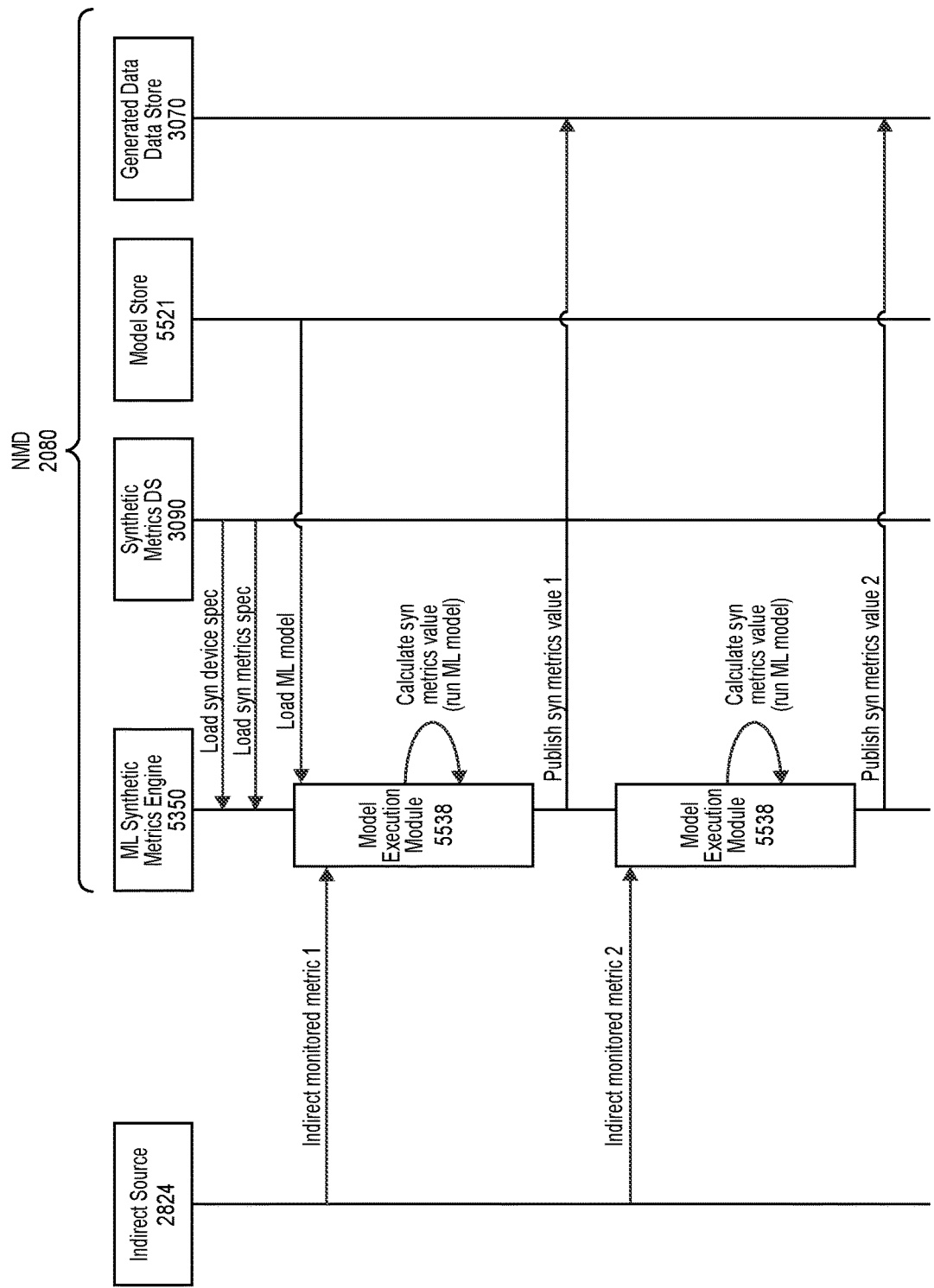
FIG. 18 depicts an exemplary synthetic metrics specification process flow including an indirect source with machine learning, in accordance with the illustrative technology herein.

FIG. 18 depicts exemplary data and process flows related to a CRATE processor with machine learning instantiating and executing a synthetic device specification that specifies at least one synthetic metrics value is generated using a synthetic metrics specification that includes machine learning rules. The ML enabled CRATE processor (3450) instantiates a synthetic metrics specification that comprises one or more machine learning rules (6169). A machine learning rule specifies that the CRATE processor uses one or more machine learning models to generate one or more synthetic metrics values. For example, an exemplary machine learning rule specifies that the CRATE processor uses a machine learning model to generate synthetic metrics values from monitored metrics values collected from an indirect source. In a particular example, a machine learning rule specifies that the ML component of the ML-enabled CRATE processor must use a specific machine learning model to generate virtual machine vCPU usage virtual metric values using monitored metrics values from a source that provides hypervisor host machine CPU usage values. For example, again referring to FIG. 1 re virtual hosting system (1400), the machine learning rule specifies that the ML component of the CRATE processor use a neural network model trained on hypervisor (1420) CPU usage data and virtual machine (1430a, 1430b, 1430n) vCPU usage data to generate synthetic metrics values of virtual machine (1430a) vCPU usage.

The ML component of the CRATE processor queries a model store (5521) for a machine learning model specified by the synthetic metrics specification and loads the machine learning model into the model execution module (5538) of the ML CRATE processor. In some exemplary implementations, the ML component of the CRATE processor also loads, from the ML model validation store (5524), a quality metric associated with the loaded machine learning model.

The CRATE processor determines, based on the synthetic device specification, a source for indirect monitored metrics values, a polling schedule for collecting monitored metrics values, and a publishing schedule for reporting synthetic metrics values. The CRATE processor configures connection interface(s) to communicate with each source. The CRATE processor configures an output data interface to publish synthetic metrics values generated by the CRATE processor as described herein.

The CRATE processor executes the synthetic metric specification by initiating the polling and publishing timing functions and begins collecting monitored metrics values. When the synthetic metrics engine receives a polling alert, it polls the indirect source for monitored metrics values. The ML component of the CRATE processor receives indirect monitored metrics values from the indirect source (2824), for example measurement values of hypervisor (1420) host machine CPU (1410) usage. When the ML component of the CRATE processor receives indirect monitored metrics values, it causes the model execution module to execute the loaded ML model to generate synthetic metrics values as model output data using the indirect monitored metrics values as inputs. The CRATE processor formats the generated synthetic metrics values according to one or more scaling and formatting rules (6162). When the synthetic metrics engine receives the publishing alert, it publishes the most recently calculated synthetic metrics value as metric value generated by the synthetic device.

5.5.5 Combinations of Sources and Rules

It will be recognized by one skilled in the art that synthetic device specification specifies combinations of sources illustrated in FIGS. 15 through 18 and includes combinations of synthetic metrics specification rules illustrated in these figures. For example, a synthetic device specification includes rules specifying collection of measurement data from zero or more each of direct and indirect sources, rules specifying when measurement values or inferred values should be reported as synthetic metrics values, and machine learning rules that specify processing of collected data from one or more data sources to generate synthetic metrics values, alone or in combination with measured and otherwise inferred synthetic metrics values.

5.5.6 Additional Examples

In a first example, a synthetic metrics specification identifies aggregation criteria, including data types, ranges, and data sources to be aggregated. The CRATE processor also may be previously aware of data sources meeting the aggregation criteria and select data from those sources. The CRATE processor collects and aggregates metrics values data from the identified data sources and produces one or more synthetic metrics values representing aggregate data from those sources. In an example, the collected metrics values are the internal temperature of various processing components in a computer room, and the output aggregate synthetic metrics values are the normalized temperature of each of the components being monitored, and the average temperature of each class of components. This example can be extended to other entity types, such as environmental spaces (e.g. offices, apartments/rooms), motor vehicles, electric motors, engines, rockets, solar panels, cookstoves, fireplaces, humans, animals, plants, other organisms, robots, or any other objects or entities that can be electronically being monitored for the temperature. The resulting synthetic metrics value is monitored by the CRATE processor which generates an alert if it exceeds a predefined threshold value (e.g. above or below). The resulting values are also published for use by a (same or other) CRATE processor, typically within a facaded interface.

In a second example, a second ML CRATE processor processes a synthetic device specification that includes a learning rule that predicts overheating or underheating based upon a correlation between an external air temperature (from a temperature sensor or from an Internet source) and the synthetic metrics value(s) published by the first CRATE processor. The machine learning portions of the second CRATE processor identify conditions (e.g. external temperature about 95 degrees F. for an hour) that are predictive of a future event that would generate an alert. A rule that monitors and alerts upon a time series of collected external temperature values is created, and a new synthetic device specification for predicting device overheating is generated and stored. The new synthetic device specification is typically created in a portable form (e.g. a dynamic application). In this example, the newly create dynamic application is moved to a second data center, where it is then instantiated to monitor device temperatures and to predict computer room overheating at the second data center.

In a second embodiment, a synthetic device specification identifies types of monitored metrics data and metadata or configuration data to be collected, and a CRATE processor uses the specification to collect and merge collected metrics values and its associated configuration data or metadata in order to generate one or more synthetic metrics values based on one or more relationships between the collected metrics values and configuration or metadata. In a first example, the CRATE processor collects a disk size value, which is configuration data or metadata depending on the vendor or the protocol, and collects current disk usage monitored metrics values and outputs a synthetic metrics value of a utilization %. The resulting utilization % synthetic metrics values are published. In a second example, configuration data includes a provisioned IOPS (input/outputs per second) value that customer of a data service is paying for and a CRATE processor collects I/O latency and seek time monitored metrics values. The CRATE processer processes the monitored metrics values to generate a monitored IOPS value in accordance with a specification, and then generates, using the provisioned IOPS value in the specification and the generated IOPS value, a percent of provisioned TOPS synthetic metrics value, which is compared against the provisioned IOPS value.

5.6 Prospective Publishing by CRATE Processing Device(s)

Figure 19:
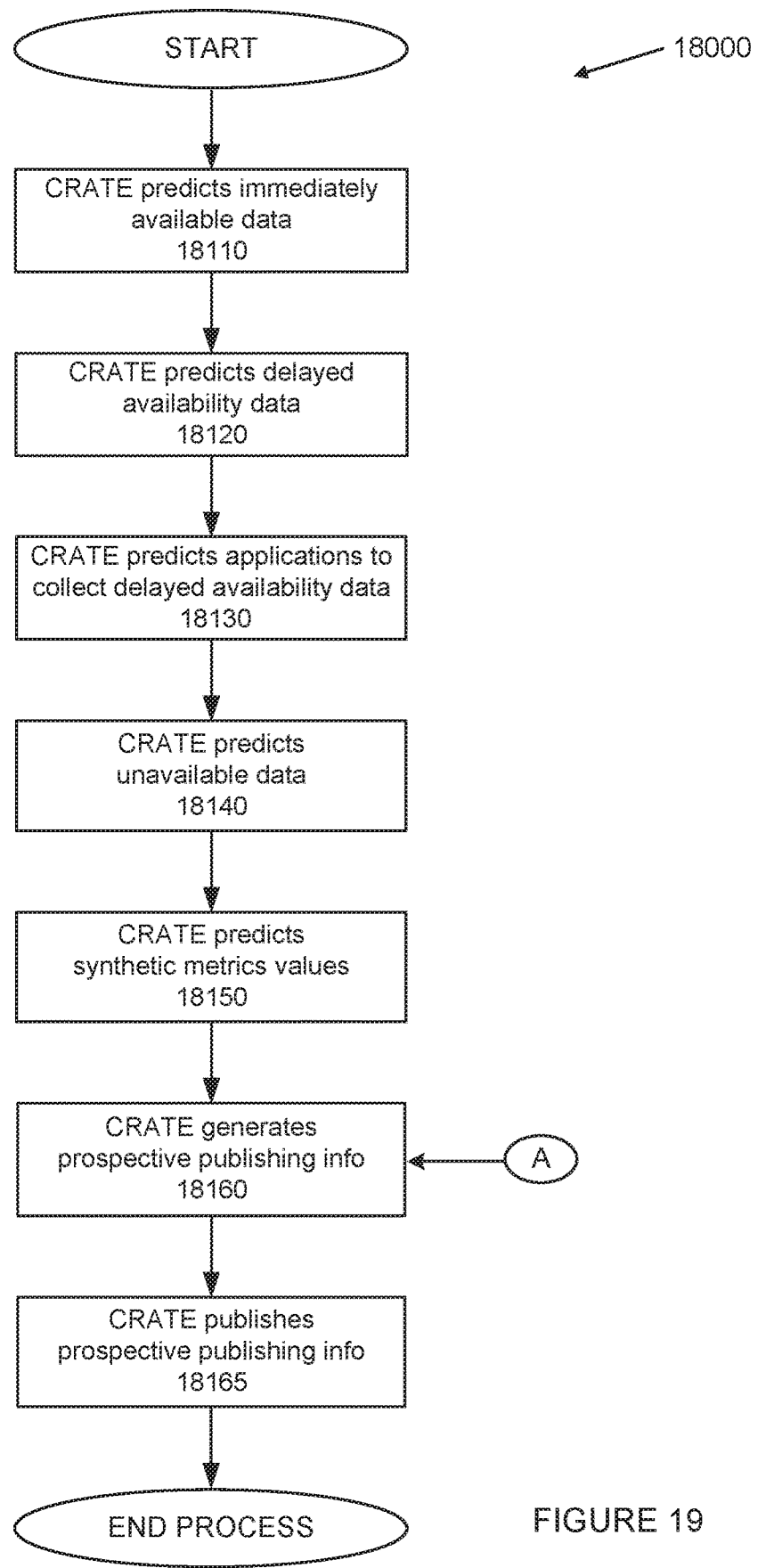
FIG. 19 depicts a flowchart illustrating an exemplary method for determining and publishing prospective publishing information (PPD.

A CRATE processing device in communication with and configured to collect data from one or more data sources, creates, publishes, and updates PPI that includes predictions regarding the published data the CRATE processing device is able to provide to a data consumer. FIG. 19 depicts a flow chart of a method (18000) for determining PPI by one or more CRATE processing devices and publishing the PPI.

In step (18110), the CRATE processing device predicts immediately available data on the basis of, for example, data published by, and/or attributes of (e.g. availability, operating status, data collection status, publishing status) of one or more connected devices, network management systems, network management data stores, and/or available or instantiated dynamic applications used to collect data. The dynamic application(s) may be instantiated and running on one or more of the CRATE processing device, upon other CRATE processing devices, or upon dynamic application-enabled NMS systems. The immediately available PPI is published as defined in one or more specifications.

In step (18120), the CRATE processing device then predicts the availability of delayed availability data, which includes data published by and/or attributes of devices that the CRATE processing device predicts the data collectable at some point in the future. These devices include one or more connected devices that the CRATE processing device is aware of but for which it has not yet configured or activated data collection, devices which are not currently providing data but which are predicted to start providing data in the future, and devices that the CRATE processing device predicts that it will connect with and collect data from at a later time. In one exemplary arrangement, the CRATE processing device predicts that it will be able to collect monitored metrics values from devices whose existence is inferred based on information the CRATE processing device collects or infers from another device or network topology.

In step (18130), the CRATE processing device identifies and predicts collector plug-in dynamic applications that could be instantiated by the CRATE processing device to collect and process delayed availability data. In some arrangements, the CRATE processing device performs a recursive prediction of collector plug-in dynamic applications that could be instantiated, allowing a selection of applications to load. The CRATE processing device the predicts delayed availability data that will be collected from a connected device that is expected or predicted to be in communication with the CRATE processing device at a later time. In one exemplary arrangement, the CRATE processing device identifies that a CISCO router is present in a network and predicts that a SNMP-based CISCO-router collection dynamic application will be able to connect to and collect data from the router at a future time. The CRATE processing device predicts the delayed availability data that will be collectable by the SNMP application, such as information defined in a template, within a registry of dynamic applications customized for a specific device, or other interface definitions such a management interface base (MiB) associated with the CISCO router. These predictions are made available for subsequent publishing.

In step (18140), the CRATE processing device predicts unavailable data, which is data that the CRATE processing device is capable of producing/collecting, but which is not currently available; for example, because a connected device producing the data is not in current communication with the CRATE processing device, for which one or more dynamic applications are not available to collect data from the connection device, for which a connection has been previously tried and failed, or for which a connection was made in the past and is no longer operable. These predictions are made available for subsequent publishing.

In step (18150), the CRATE processing device optionally predicts synthetic metrics values that the CRATE processing device is, or may become, capable of generating based upon forecast processing of immediately available and/or delayed availability data according to one or more synthetic device specification(s) and predicts that it will be able to provide the synthetic metrics values specified by those specification(s). These predictions are made available for subsequent publishing.

In step (18160), the CRATE processing device optionally creates PPI. In an exemplary arrangement, a CRATE processing device predicts that it will be able to provide immediately available data corresponding to a hypervisor that the CRATE processing device is in communication with, and predicts that it will be able to provide delayed availability data from the one or more virtual machines hosted by the hypervisor after the CRATE processing device is configured to collect data from the one or more virtual machines. The CRATE processing device creates and makes available PPI that includes the predicted immediate availability of data collected from the hypervisor and predicted delayed availability of data collected from virtual machines. These predictions are made available for subsequent publishing.

In step (18165), the CRATE processing device publishes, or otherwise makes available, PPI. In various embodiments, the CRATE processing device stores the PPI to one or more of a local PPI data store (FIG. 8, 3095), a network data store (FIG. 8, 4300), and/or publishes the PPI to a façaded interface. In this manner, the CRATE processing device advertises that it is capable of providing certain collected and generated data to one or more data consumers.

These processes may be repeated if the PPI changes over time, when the CRATE processing device determines that previously available data is no longer available or generated, when a new source of data has become available; periodically, e.g. based on a timer or an alert; or in response to a query or request from a data consumer.

Alternatively, as previously discussed, the CRATE processing device replaces missing data values that were predicted to be available in the PPI with estimated data values instead of updating the PPI to indicate that the data values are missing, and provides notice to a data consumer for example by flagging estimated values as estimated or by flagging all data values as one of actual or estimated.

5.7 Providing Facaded Data Based on Prospective Publishing Information

Figure 20:
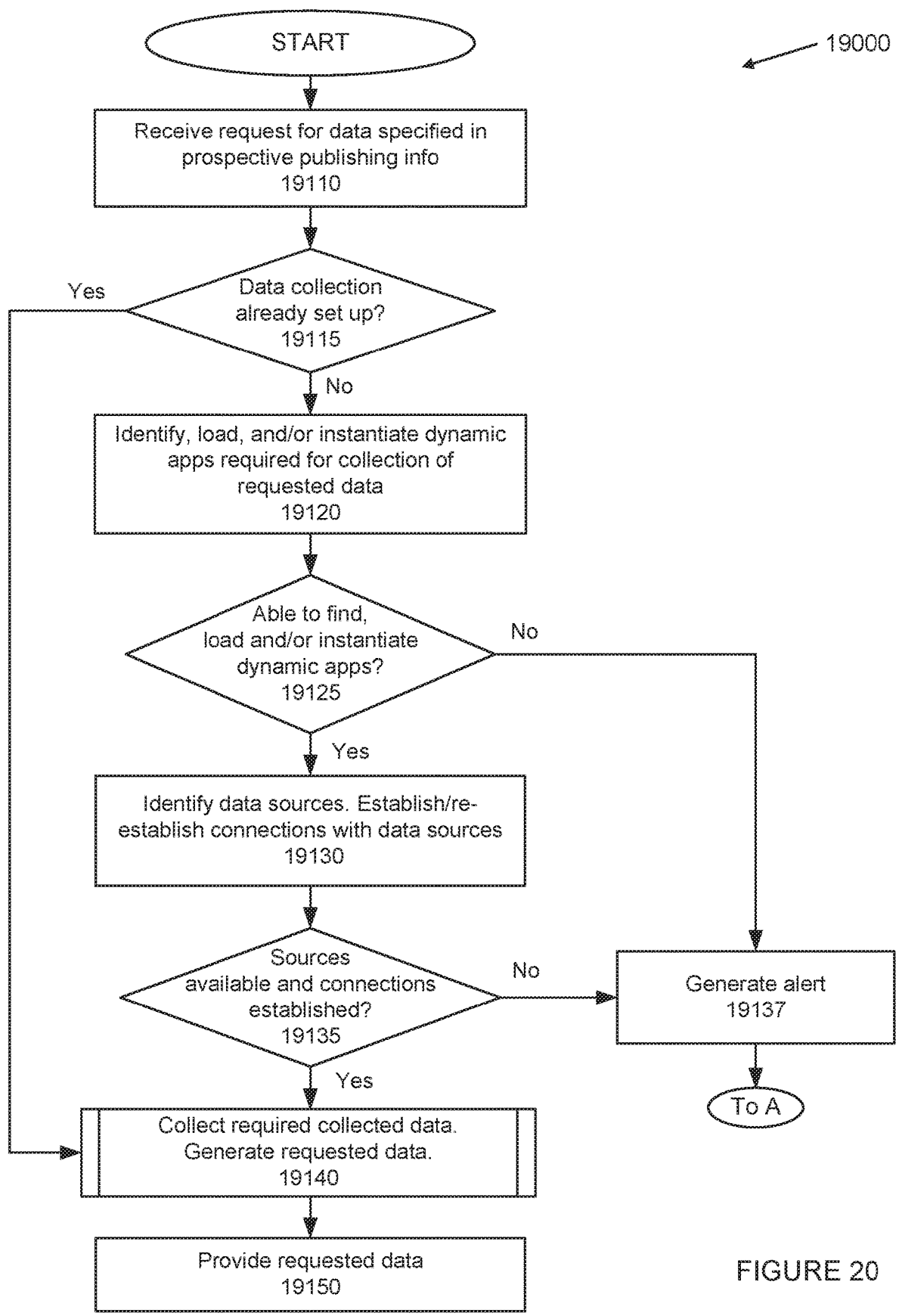
FIG. 20 depicts a flowchart of a process for fulfilling a data request made by a data consumer based on published PPI predictions.

FIG. 20 illustrates an exemplary method that may be implemented by a CRATE processing device in response to receiving a request to provide collected or synthetic metrics values corresponding to data advertised in PPI.

In an exemplary embodiment one or more data consumers (e.g., FIG. 3, 7040*a*, 7040*b*, 7040*c*) receive PPI from one or more CRATE processing devices (e.g., 2000*a*, 2080*b*, 2090*c*) and, in turn, request, from a CRATE processing device, data advertised in the PPI.

At step (19110) a CRATE processing device (e.g. Network Management device (2080*b*)) receives, from a data consumer (e.g. 7040*b*) a request for data included in published PPI. The requested data includes one or more of historical collected metric values, actual, real time, monitored metric values, synthetic metrics values (e.g. projected metric values, inferred or interpolated metric values, or aggregated historical, collected, and projected metric values comprising a unified data stream), or combinations thereof.

At step (19115) the CRATE processing device determines what collected data is required to provide the requested data and whether the required data collection, i.e. whether dynamic applications and connections to data sources are already instantiated so the CRATE processing device can generate the requested data. If so, the CRATE processing device skips to step (19140) to collect and process the requested data.

At step (19120) the CRATE processing device identifies one or more dynamic applications to be used for collection of the required collected data by loading and instantiating a synthetic device specification (6050) that defines the requested synthetic metrics values and parses a data source/collection methods specification (6150) included therein to identify the required data sources and dynamic applications required to collect data from these data sources. If the identified dynamic applications are not already instantiated on the CRATE processing device, the CRATE processing device loads and instantiates them, and establishes connections to the referenced data sources [step (19130)].

If, [in steps (19125) and (19135)], the CRATE processing device determines that it has been unable to load or instantiate dynamic applications, or determines that it has been unable to establish a connection with, or retrieve collected data from, a data source, the CRATE processing device proceeds to step (19137) where it generates an alert indicating the failure(s) and subsequently proceeds to step (A) of process (18000) in order to update the PPI status. In some embodiments, the CRATE processing device repeats step (19120), (19130), or both to re-attempt instantiation of dynamic application(s) and/or connection with data source(s), or attempts to load one or more alternative dynamic applications and/or to establish connections with one or more alternative data sources.

At step (19140) the CRATE processing device performs a data collection and synthetic metrics values generation process, where it receives collected data from one or more data sources and creates, based on the collected data, the requested data, for example, collected monitored metrics values or synthetic metrics values generated based on collected data. In some embodiments, the CRATE processing device continues to obtain collected data and creates additional synthetic metrics values until the requested data has been completely created. The collected and generated data may be made available as it is generated (e.g. a continuously or periodically updated data feed), or after it is completely generated. If, while performing step (19140), the CRATE processing device determines that it is no longer able to receive required collected data from one or more data sources (e.g. if a connection to the source is lost or if the CRATE processing device otherwise stops receiving data from the source), the CRATE processing device, in some embodiments, proceeds to step (19137) to generate an alert.

At step (19150) the CRATE processing device provides the requested data to one or more data consumers, including the data consumer that requested the data, for example by publishing the requested data on a façaded interface.

5.8 Conclusions

It will also be recognized by those skilled in the art that, while the technology has been described above in terms of preferred embodiments, it is not limited thereto. Various features and aspects of the above described technology may be used individually or jointly. Further, although the technology has been described in the context of its implementation in a particular environment, and for particular application examples, those skilled in the art will recognize that its usefulness is not limited thereto and that the present technology can be beneficially utilized in any number of environments and implementations where it is desirable to create and process synthetic metrics values that describe previously unmeasurable aspects of a computing environment. Accordingly, the claims set forth below should be construed in view of the full breadth and spirit of the technology as disclosed herein.

All patents and publications cited herein are incorporated by reference as if expressly set forth.

What is claimed:

1. A method of operating a facaded processing device comprising:
   storing a collection specification, a generation specification and a facading specification in at least one non-transitory memory device; and
   performing, with at least one processor operatively coupled to the non-transitory memory device, operations comprising:
   collecting one or more metric values in accordance with the stored collection specification;
   generating, in accordance with the stored generation specification, one or more synthetic metric values in response to the one or more collected metric values, and
   publishing, in accordance with the facading specification, a façade of a virtualized synthetic device comprising a virtualized construct representing a connected device with at least some of the generated one or more synthetic metric values and/or the one or more collected metric values.

2. The method of operating a facaded processing device of claim 1, wherein generating one or more synthetic metric values comprises combining one or more collected metric values to produce at least one synthetic metric value.

3. The method of operating a facaded processing device of claim 1, wherein generating one or more synthetic metric values comprises combining a collected metric value with a previously generated synthetic metric value.

4. The method of operating a facaded processing device of claim 1, wherein collecting one or more metric values comprises collecting from a further device.

5. The method of claim 4 wherein the further device comprises a network connected device.

6. The method of claim 4 wherein the further device comprises a non-network connected device.

7. The method of operating a facaded processing device of claim 1, further comprising collecting, in accordance with the collection specification, the one or more metric values only once in an operating cycle that publishes the facade.

8. The method of operating a facaded processing device of claim 1, further comprising repeatedly collecting, in accordance with the collection specification, the one or more metric values to produce a set of time series collected values for presentation as part of the published facade.

9. The method of claim 1, wherein the collection specification comprises a processing device configuration specification that configures the at least one processor to collect one or more metric values using a network interface operably connected to a network attached device.

10. The method of claim 1, wherein the collection specification comprises a processing device configuration specification that configures the at least one processor to collect one or more metric values using an interface operably connected to a non-network connected device.

11. The method of claim 1, wherein the stored generation specification specifies the at least one processor operation to generate one or more synthetic metric values based upon at least one collected metric value and a synthetic metric generation specification that is part of the stored generation specification.

12. The method of claim 1 further including loading the non-transitory memory from an external source.

13. The method of claim 1, wherein the facading specification specifies a mapping of one or more generated synthetic metric values to different aspects of the published facade.

14. A system for providing a façade of a virtualized synthetic device comprising a virtualized construct representing a connected device with at least some of the generated one or more synthetic metric values and/or the one or more collected metric values, the system comprising:
   at least one non-transitory memory device configured to store a collection specification, a generation specification and a facading specification; and
   at least one processor operatively coupled to the non-transitory memory device, the at least one processor being configured by the information stored in the at least one non-transitory memory device to perform operations comprising:
   collecting one or more metric values in accordance with the stored collection specification;
   generating, in accordance with the stored generation specification, one or more synthetic metric values in response to the one or more collected metric values, and
   publishing, in accordance with the facading specification, a façade of a virtualized synthetic device comprising a virtualized construct representing a connected device with at least some of the generated one or more synthetic metric values and/or the one or more collected metric values.

15. The system of claim 14, wherein generating one or more synthetic metric values comprises combining one or more collected metric values to produce at least one synthetic metric value.

16. The system of claim 14, wherein generating one or more synthetic metric values comprises combining a collected metric value with a previously generated synthetic metric value.

17. The system of claim 14, wherein collecting one or more metric values comprises collecting from a further device.

18. The system of claim 17 wherein the further device comprises a network connected device.

19. The system of claim 17 wherein the further device comprises a non-network connected device.

20. The system of claim 14, wherein the at least one processor is further configured to collect, in accordance with the collection specification, the one or more metric values only once in an operating cycle that publishes the facade.

21. The system of claim 14, wherein the at least one processor is further configured to repeatedly collect, in accordance with the collection specification, the one or more metric values to produce a set of time series collected values for presentation as part of the published facade.

22. The system of claim 14, wherein the collection specification comprises a processing device configuration specification that configures the at least one processor to collect one or more metric values using a network interface operably connected to a network attached device.

23. The system of claim 14, wherein the collection specification comprises a processing device configuration specification that configures the at least one processor to collect one or more metric values using an interface operably connected to a non-network connected device.

24. The system of claim 14, wherein the stored generation specification specifies the at least one processor operation to generate one or more synthetic metric values based upon at least one collected metric value and a synthetic metric generation specification that is part of the stored generation specification.

25. The system of claim 14 further including loading the non-transitory memory from an external source.

26. The system of claim 14, wherein the facading specification specifies a mapping of one or more generated synthetic metric values to different aspects of the published facade.

* * * * *